(12) United States Patent
Ellis, III

(10) Patent No.: US 7,634,529 B2
(45) Date of Patent: *Dec. 15, 2009

(54) PERSONAL AND SERVER COMPUTERS HAVING MICROCHIPS WITH MULTIPLE PROCESSING UNITS AND INTERNAL FIREWALLS

(76) Inventor: Frampton E. Ellis, III, 2895 S. Abingdon St., Suite B2, Arlington, VA (US) 22206-1331

( * ) Notice: Subject to any disclaimer, the term of this patent is extended or adjusted under 35 U.S.C. 154(b) by 0 days.

This patent is subject to a terminal disclaimer.

(21) Appl. No.: 09/085,755

(22) Filed: May 27, 1998

(65) Prior Publication Data
US 2001/0013049 A1    Aug. 9, 2001

Related U.S. Application Data

(63) Continuation-in-part of application No. PCT/US97/21812, filed on Nov. 28, 1997, which is a continuation-in-part of application No. 08/980,058, filed on Nov. 26, 1997.

(60) Provisional application No. 60/086,948, filed on May 27, 1998, provisional application No. 60/086,516, filed on May 22, 1998, provisional application No. 60/086,588, filed on May 22, 1998, provisional application No. 60/086,366, filed on Dec. 19, 1997, provisional application No. 60/066,415, filed on Nov. 24, 1997, provisional application No. 60/066,313, filed on Nov. 21, 1997, provisional application No. 60/033,871, filed on Dec. 20, 1996, provisional application No. 60/032,207, filed on Dec. 2, 1996, provisional application No. 60/031,855, filed on Nov. 29, 1996.

(51) Int. Cl.
*G06F 15/16* (2006.01)
*G06F 9/00* (2006.01)

(52) U.S. Cl. .......... 709/201; 709/209; 726/11
(58) Field of Classification Search ......... 709/201–202, 709/209, 239, 208, 203, 223–226, 229, 2, 709/3, 11; 707/8; 705/8; 348/3; 726/2, 726/3, 11

See application file for complete search history.

(56) References Cited

U.S. PATENT DOCUMENTS 4,245,306 A * 1/1981 Besemer et al. .............. 709/245

(Continued)

FOREIGN PATENT DOCUMENTS

DE   40 08 3335 A1   9/1991

(Continued)

OTHER PUBLICATIONS

Sullivan et al. "A mew major SETI project based on Project Serendip data and 100,000 personal computers". http://setiathome.ssl.berkeley.edu/woody_paper.html, 1997.*

(Continued)

*Primary Examiner*—Aaron Strange
(74) *Attorney, Agent, or Firm*—DLA Piper LLP US

(57) ABSTRACT

A system comprising a personal computer configured to operate with another computer connected to a network of computers. The personal computer includes a microchip having a microprocessor with a control unit and at least two processing units, the control unit being configured to allow a user of the personal computer to control the two processing units, and the microchip including a power management component. The personal computer includes an internal firewall configured to allow and/or deny access to portions of the microchip both to the user of the personal computer and to a user of the microchip from the network of computers during a shared use of the microchip; and the internal firewall is configured to deny access to portions of the microchip from the network of computers.

73 Claims, 19 Drawing Sheets

U.S. PATENT DOCUMENTS

| | | | |
|---|---|---|---|
| 4,278,837 A | 7/1981 | Best | |
| 4,747,139 A | 5/1988 | Taaffe | |
| 4,827,508 A | 5/1989 | Shear | |
| 4,918,596 A | 4/1990 | Nakano | |
| 4,969,092 A | 11/1990 | Shorter | |
| 5,025,369 A | 6/1991 | Schwartz | |
| 5,031,089 A | 7/1991 | Liu et al. | |
| 5,103,393 A | 4/1992 | Harris et al. | |
| 5,109,329 A | 4/1992 | Strelioff | |
| 5,109,512 A | 4/1992 | Bahr et al. | |
| 5,136,708 A | 8/1992 | Lapourte et al. | |
| 5,155,808 A | 10/1992 | Shimizu | |
| 5,237,507 A | 8/1993 | Chasek | 705/412 |
| 5,260,943 A | 11/1993 | Comroe et al. | |
| 5,283,819 A * | 2/1994 | Glick et al. | 379/93.01 |
| 5,291,494 A | 3/1994 | Bruckert et al. | 371/11.3 |
| 5,341,477 A | 8/1994 | Pitkin et al. | |
| 5,349,682 A | 9/1994 | Rosenberry | |
| 5,357,404 A | 10/1994 | Bright et al. | |
| 5,357,632 A | 10/1994 | Pian et al. | |
| 5,361,362 A | 11/1994 | Benkeser et al. | |
| 5,381,534 A | 1/1995 | Shi | |
| 5,388,211 A | 2/1995 | Hornbuckle | 717/11 |
| 5,392,400 A | 2/1995 | Berkowitz et al. | |
| 5,410,651 A | 4/1995 | Sekizawa et al. | |
| 5,426,741 A | 6/1995 | Butts, Jr. et al. | |
| 5,428,783 A | 6/1995 | Lake | |
| 5,457,797 A | 10/1995 | Butterworth et al. | |
| 5,475,606 A | 12/1995 | Muyshondt et al. | |
| 5,497,465 A | 3/1996 | Chin et al. | |
| 5,515,511 A | 5/1996 | Nguyen et al. | |
| 5,522,070 A | 5/1996 | Sumimoto | |
| 5,535,408 A * | 7/1996 | Hillis | 712/16 |
| 5,546,594 A | 8/1996 | Wazumi | |
| 5,550,984 A | 8/1996 | Gelb | |
| 5,568,375 A | 10/1996 | Rausch | |
| 5,570,270 A | 10/1996 | Naedel et al. | |
| 5,572,643 A * | 11/1996 | Judson | 709/218 |
| 5,586,121 A | 12/1996 | Moura et al. | |
| 5,587,928 A * | 12/1996 | Jones et al. | 709/204 |
| 5,588,003 A | 12/1996 | Ohba et al. | 370/468 |
| 5,590,284 A * | 12/1996 | Crosetto | 712/29 |
| 5,592,376 A * | 1/1997 | Hodroff | 705/14 |
| 5,594,491 A | 1/1997 | Hodge et al. | |
| 5,600,597 A | 2/1997 | Kean et al. | |
| 5,606,615 A | 2/1997 | Lapointe et al. | |
| 5,608,448 A | 3/1997 | Smoral et al. | |
| 5,615,127 A | 3/1997 | Beatty et al. | |
| 5,627,879 A | 5/1997 | Russell et al. | |
| 5,666,484 A | 9/1997 | Orimo et al. | |
| 5,678,028 A | 10/1997 | Bershteyn et al. | |
| 5,680,548 A | 10/1997 | Trugman | |
| 5,696,902 A | 12/1997 | Leclercq et al. | |
| 5,701,507 A | 12/1997 | Bonneau, Jr. et al. | |
| 5,710,884 A | 1/1998 | Dedrick | |
| 5,734,913 A * | 3/1998 | Iwamura et al. | 713/322 |
| 5,748,489 A | 5/1998 | Beatty et al. | |
| 5,754,766 A | 5/1998 | Shaw et al. | |
| 5,758,077 A | 5/1998 | Danahy et al. | |
| 5,758,345 A | 5/1998 | Wang | |
| 5,761,507 A | 6/1998 | Govett | |
| 5,764,889 A | 6/1998 | Ault et al. | |
| 5,774,337 A | 6/1998 | Lee et al. | |
| 5,774,668 A | 6/1998 | Choquier et al. | |
| 5,784,551 A | 7/1998 | De Leva et al. | |
| 5,784,628 A | 7/1998 | Reneris | |
| 5,790,431 A | 8/1998 | Ahrens, Jr. et al. | |
| 5,793,968 A * | 8/1998 | Gregerson et al. | 709/209 |
| 5,794,059 A | 8/1998 | Barker et al. | |
| 5,809,190 A | 9/1998 | Chen | |
| 5,815,665 A | 9/1998 | Teper et al. | |
| 5,815,793 A | 9/1998 | Ferguson | |
| 5,826,014 A | 10/1998 | Coley et al. | 398/187.01 |
| 5,828,833 A | 10/1998 | Belville et al. | 395/187.01 |
| 5,838,436 A | 11/1998 | Hotaling et al. | |
| 5,838,542 A | 11/1998 | Nelson et al. | |
| 5,844,594 A | 12/1998 | Ferguson | |
| 5,845,074 A | 12/1998 | Kobata | |
| 5,850,449 A | 12/1998 | McManis | |
| 5,861,817 A | 1/1999 | Palmer et al. | |
| 5,862,357 A | 1/1999 | Hagersten et al. | |
| 5,864,738 A * | 1/1999 | Kessler et al. | 709/239 |
| 5,872,987 A * | 2/1999 | Wade et al. | 712/3 |
| 5,881,284 A | 3/1999 | Kubo | |
| 5,889,989 A * | 3/1999 | Robertazzi et al. | 718/105 |
| 5,896,499 A | 4/1999 | McKelvey | |
| 5,905,429 A | 5/1999 | Hornstein et al. | |
| 5,909,052 A | 6/1999 | Ohta et al. | |
| 5,909,681 A * | 6/1999 | Passera et al. | 707/8 |
| 5,917,629 A * | 6/1999 | Hortensius et al. | 398/99 |
| 5,930,511 A * | 7/1999 | Hinsley | 395/710 |
| 5,943,421 A | 8/1999 | Garbon | |
| 5,964,832 A | 10/1999 | Kisor | |
| 5,978,829 A * | 11/1999 | Chung et al. | 718/102 |
| 6,052,555 A | 4/2000 | Ferguson | |
| 6,067,082 A * | 5/2000 | Enmei | 345/174 |
| 6,073,209 A | 6/2000 | Bergsten | |
| 6,098,091 A | 8/2000 | Kisor | |
| 6,112,225 A | 8/2000 | Kraft et al. | |
| 6,112,243 A | 8/2000 | Downs et al. | |
| 6,115,698 A | 9/2000 | Tuck et al. | 705/37 |
| 6,167,428 A | 12/2000 | Ellis | |
| 6,208,634 B1 | 3/2001 | Boulos et al. | |
| 6,219,627 B1 | 4/2001 | Bonneau et al. | |
| 6,287,949 B1 | 9/2001 | Mori et al. | |
| 6,440,775 B2 | 8/2002 | Khoury | |
| 6,725,250 B1 | 4/2004 | Ellis, III | |
| 6,732,141 B2 | 5/2004 | Ellis | |
| 6,950,947 B1 | 9/2005 | Purtell et al. | |
| 7,024,449 B1 | 4/2006 | Ellis, III | |

FOREIGN PATENT DOCUMENTS

| | | |
|---|---|---|
| EP | 0 647 052 | 4/1995 |
| EP | 0 853 279 | 7/1998 |
| WO | WO94/01964 | 1/1994 |
| WO | WO95/01060 | 1/1995 |
| WO | WO 98/26366 | 6/1998 |
| WO | WO 99/04561 | 1/1999 |
| WO | WO 99/32972 | 7/1999 |

OTHER PUBLICATIONS

Choi et al. "A Diagnostic Network for Massively Parallel Processing Systems", Department of Computer Engineering, Honglk University, Seoul, Korea. IEEE 1994, pp. 348-353, 1994.*

Boku et al. "The Architecture of Massively Parallel Processor CP-PACS". IEEE 1997, pp. 31-40, 1997.*

Hobbs et al. "A Remote Process Creation and Execution Facility Supporting Parallel Execution on Distributed Systems", School of Computing and Mathematics, Deakin University, Geelong. IEEE 1996 pp. 92-99, 1996.*

Edge: Work-group Computing Report, "PC Vision: Intel unveils plans to bring PCs to vehicles." Oct. 28, 1996.*

Regenold, "A single-chip multiprocessor DSP solution for communications applications;" IEEE, 1994.*

The American Heritage College Dictionary 4th Ed.—defintion of 'firewall'.*

The American Heritage College Dictionary 4th Ed.—defintion of 'firewall'. 2004.*

Fields, Scott, "Hunting for Wasted Computing Power—New Software for Computing Networks Puts Idle PC's to Work," 1993 University of Wisconsin—Madison. Internet: http://www.cs.wise.edu/condor/doc/Wiseldea.html.

Mitzi Waltz, "Make'm Pay: Billing Net Usage," MacWeek, v6 n27 p. 24(2), Jul. 27, 1992 (Dialog fulltext).

"The Economies of Network Billing: Network Billing and Monitoring Systems Can Improve Efficiency and Cut Costs," IBM System User, v14 n11 p. 53(1), Nov. 1993 (Dialog fulltext).

"Let Your Computer Make Money While You Sleep," Newsbyte, Aug. 16, 1996 (Dialog fulltext).

Geppert, L. Solid State [Trend/Development], IEEE Spectrum, v. 33, iss. 1, 1996, pp. 51-55.

Li, Yao, "Free-space Optical Bus-based WDMA Interconnects for Parallel Computation", LEOS '92 Conference Proceedings, Lasers and Electron-Optics Society Annual Meeting, p. 588-589, Nov. 16-19, 1992.

Dickinson et al., "An Integrated Free Space Optical Bus", 1989 IEEE International Conference on Computer Design, VLSI In Computers and Processors, p. 62-65, Oct. 2-4, 1989.

Natarajan et al., "Bi-Directional Optical Backplane Bus for General Purpose Multi-Processor", Journal of Lightwave Technology, vol. 13, No. 6, p. 1031-1040, Jun. 6, 1995.

Zhao et al., "General Purpose Bidirectional Optical Backplane: High Performance Bus for Multiprocessor Systems", Massively Parallel Processing Using Optical Interconnections, 2nd International Conference, p. 188-195, Oct. 23-24, 1995.

Wu et al., "Microprocessor Control Signal Transmission Through Optical Fiber", Conference Record of 1992, IEEE Industry Applications Society Annual Meeting, p. 1747-1750, Oct. 4-9, 1992.

Foster et al., "The Grid: Blueprint for a New Computing Infrastructure", Morgan Kaufman Publishers, Inc., 1998.

Hwang et al., "Scalable Parallel Computing", WCB McGraw-Hill, 1998.

Wilkinson, et al., "Parallel Programming", Prentice Hall, 1998.

Patterson et al., "Computer Architecture: A Quantitative Approach" (2nd Edition), Morgan Kaufmann Publishers, Inc., 1996.

Culler et al., "Parallel Computer Architecture", Morgan Kaufmann Publishers, Inc., 1998.

Hennessy et al., "Computer Organization and Design", Morgan Kauffmann Publishers, Inc., 1998.

Slater, "The Microprocessor Today", IEEE Micro 1996, pp. 32-44.

Steinert-Threlkeld; "New Breed of Chip TI develops a super circuit"; The Sun Baltimore; May 4, 1992.

Dallas Morning News; "LSI holds big plans for tiny chips Versatility of 'system on a chip' creates niche in microelectronics;" Mar. 4, 1996.

Mokhoff; "System-on-a-chip comes to wireless arena;" Electronic Engineering Times; Feb. 12, 1996.

Cindi; "System on a Chip' stars at ISSCC;" Electronic News; Feb. 19, 1996.

Ang; "System-on-a-chip to define next-generation set-top box"; Electronic Engineering Times; Dec. 15, 1995.

Marc; "New family of microprocessor cores from LSI Logic extends customers' system-on-a-chip design capability" Nov. 7, 1994.

Wall Street Journal; "Technology Brief—Advance Micro Devices Inc.: Company unveils Microchip for Hand-Held Computers"; Oct. 18, 1993.

Gelsinger, Patrick et al. "Microprocessors circa 2000," IEEE Spectrum, Oct. 1989, pp. 43-47.

Yu, Albert. "The Future of Microprocessors," IEEE Micro, Dec. 1996, pp. 46-53.

McWilliams. "Dell to Phase Out Computers Using Intel's Itanium," The Wall Street Journal, Online, Sep. 15, 2005.

Office Action issued in copending related U.S. Appl. No. 10/802,049, dated Sep. 17, 2007.

Sakano et al., "A Three-Dimensional Mesh Multiprocessor System Using Board-to-Board Free-Space Optical Interconnects: COSINE-III," IEEE, 1993, pp. 278-283, XP 000463415.

Nowatzyk et al., "Are Crossbars Really Dead? The Case for Optical Multiprocessor Interconnect Systems," Proceedings of the Annual Symposium on Computer Architecture, ACM, vol. 22, Jun. 1995, pp. 106-115, XP 000687800.

Qiao et al., "Time-Division Optical Communications in Multiprocessor Arrays," ACM, 1991, pp. 644-653, XP 000337522.

"Means for Implementing Optical Interconnections for Parallel Processors," IBM Technical Disclosure Bulletin, Apr. 1991, vol. 33, No. 11, pp. 56-58, XP 000110310.

"Ein-Chip-Firewall," Elektroniknet Top News, XP-002164257, date unknown.

Rincon et al., "The Changing Landscape of System-on-a-Chip Design," MicroNews, Third Quarter 1999, www.chips.ibm.com/micronews/vol5_no3/rincon.html, pp. 1-10, vol. 5, No. 3.

Geoffrey C. Fox and Wojtek Furmanski, Petaops and Exaops: Supercomputing on the Web, "IEEE Internet Computing," vol. 1, No. 2 Mar.-Apr. 1997, pp. 38-46.

Kivanc Dincer and Geoffrey C. Fox, Building a World-Wide Virtual Machine Based on Web and HPCC Technologies, "Student Technical Papers," http://www.supercomp.org/sc96/proceedings/SC96PROC/DINCER/INDEX.HTM pp. 1-18, date unknown.

Steven M. Bellovin and William R. Cheswick, Network Firewalls, "IEEE Communications Magazine 1994," pp. 50-57.

Weiyi et al., "Java-to-Go—Itinerative Computing Using Java," Sep. 10, 1996 http://ptolemy.eecs.berkeley.edu/dgm/javatools/java-to-go/.

Office Action issued in related U.S. Appl. No. 09/935,779 mailed Feb. 19, 2008.

David Pescovitz, "Power of the PC", Scientific American, pp. 27-28 (Apr. 2000).

Stephen H. Wildstrom, "The Problem with Firewalls", Business Week, pp. 25 (Mar. 20, 2000).

J. McH., "Build Your Own Supercomputer", Forbes, pp. 228 (Nov. 15, 1999).

Office Action issued in related copending U.S. Appl. No. 09/884,041, mailed Dec. 12, 2007.

Litzkow, et al., "Condor-A Hunter of Idle Workstations", 1988 IEEE, pp. 104-111.

Theimer, et al., "Finding Idle Machines in a Workstation-Based Distributed System", IEEE Transactions on Software Engineering, Nov. 1989, vol. 15, No. 11, pp. 1444-1458.

Brown et al., Special Edition Using Netscape ™ 2 Second Edition, Que Corporation, 1995, Ch. 1-2.

Gilder, "Angst and Awe on the Internet by George Gilder", Forbes ASAP, Dec. 4, 1995.

Tandiary, et al., "Batrun: Utilizing Idle Workstations for Large-Scale Computing", IEEE Parallel & Distributed Computing, Summer 1996, pp. 41-48.

Brisbin, "Shopping for Internet access", MacUser, Dec. 1994, v.10, n12, p. 133(2).

Gilder, George, "The Bandwidth Tidal Wave", Forbes ASAP, Dec. 5, 1994.

N/A, "Special Report—Wonder Chips", Business Week, Jul. 4, 1994.

N/A, "Supercomputers Divide and conquer", The Economist, Dec. 14, 1996.

N/A, "Cyber View World Wide Widgets", Scientific American, May 1997, p. 48.

Gibbs, "Bandwidth, Unlimited", Scientific American, Jan. 1997, p. 41.

Markoff, "A New Standard to Govern PC's With Multiple Chips, Work Stations Mimicking Supercomputers", The New York Times, Oct. 28, 1997.

N/A, "Aliens on your desktop", The Economist, Apr. 18, 1998, p. 78.

Hare et al., "Master the Complexities of Network Security", *Internet Firewalls and Network Security*, Second Edition, pp. 325-350 and 516, date unknown.

McHenry et al., "An FPGA-Based Coprocessor for ATM Firewalls," Field-Programmable Custom Computing Machines 1997, Apr. 16-18, 1997, pp. 30-39, XP-002157218.

Alexandrov et al., "SuperWeb: Research Issues in Java-Based Global Computing," Concurrency, vol. 9, No. 6, Jun. 1997, pp. 535-553.

Baratloo et al., "Charlotte: Metacomputing on the Web," 9th International Conference on Parallel and Distributed Computing Systems (PDCS), 1996, pp. 1-8.

Brecht et al., "ParaWeb: Towards World-Wide Supercomputing," Proceedings of the Seventh AcM SIGOPS European Workshop, Sep. 1996, 8 pages.

Capello et al., "Market-Based Massively Parallel Internet Computing," Proceedings Third Working Conference on Massively Parallel Programming Models, 1998, pp. 118-129.

Fox et al., "Towards Web/Java based High Performance Distributed Computing-an Evolving Virtual Machine," www.npac.syr.edu/projects/webspace/doc/hpdc5/paper, Jun. 10, 1996, 11 pages.

Fox et al., "Towards Web/Java based High Performance Distributed Computing-an Evolving Virtual Machine," as presented at 5$^{th}$ IEEE International Symposium on High Performance Distributed Computing, Aug. 6-9, 1996, 86 pages.

Hayes, "Computing Science: Collective Wisdom," American Scientist, Mar.-Apr. 1998, pp. 1-8.

Waldspurger et al., "Spawn: A Distributed Computational Economy," IEEE Transactions on Software Engineering, vol. 18, No. 2, Feb. 1992, pp. 103-117, XP-002124500.

White, "Covert Distributed Processing with Computer Viruses," Advances in Cryptology, Crypto 89, Springer LNCS, v. 435, pp. 616-619 1989.

Plotkin, "The Digital Compression Facility-A Solution to Today's Compression Needs," 1994 IEEE, pp. 445-449.

Bevinakoppa et al., "Digital Image Compression on a Network of Transputers," Proc. of 5$^{th}$ Australian Transputer & OCCAM User Group Conference, IOS Press, Amsterdam, pp. 25-32, date unknown.

Shen et al., "A Parallel Implementation of an MPEG1 Encoder: Faster than Real-Time!", Proc. Of SPIE Conf. On Digital Video Compression, San Jose, CA, Feb. 1995.

Litzkow et al., "Condor-A Hunter of Idle Workstations," Proc. Of the 8$^{th}$ Int'l. Conf. On Distributed Computing Systems, IEEE, pp. 104-111, Jun. 1998.

Vetter, R. et al., "Issues and Challenges in ATM Networks," Communications of the ACM, Feb. 1995; vol. 38, No. 2, pp. 28-29.

Vetter, R, "ATM Concepts, Architectures, and Protocols," Communications of the ACM, Feb. 1995; vol. 38, No. 2, pp. 30-38, 109.

Kim, B., "ATM Network: Goals and Challenges," Communications of the ACM, Feb. 1995, vol. 38, No. 2, pp. 39-44, 109.

Sachs, M. et al., "LAN and I/O Convergence: A Survey of the Issues," Computer, Dec. 1994, pp. 24-32.

Fox, E., "Advances in Interactive Digital Multimedia Systems," Computer, Oct. 1991, pp. 9-21.

Lindley, C., "JPEG-Like Image Compression, Part I," Dr. Dobb's Journal, Jul. 1995, pp. 50-58, 101-102.

Lindley, C., "JPEG-Like Image Compression, Part 2," Dr. Dobb's Journal, Aug. 1995, pp. 62-66, 102-105.

Ozer, J., "Why MPEG is Hot," PC Magazine, Apr. 11, 1995, pp. 130-131.

Theimer et al., "Finding Idle Machines in a Workstation-Based Distributed System," IEEE Trans. On Software Engineering, vol. 15, No. 11, pp. 1444-1458, Nov. 1989.

Yoshida, J., "MPEG-2 encoders make show of force at NAB," Electronic Engineering Times, Apr. 10, 1995.

Gemmell et al., "Multimedia Storage Servers: A Tutorial," Computer, May 1995, pp. 40-49.

Fogg, C., "Survey of software and hardware VLC architectures," SPIE, vol. 2186, Image and Video Compression (1994), pp. 29-37.

Szabo, B., et al., "Design consideratins for JPEG Video and Synchronized Audio in a Unix Workstation Environment," USENIX-Summer '91, pp. 353-368.

Nass, R., "Hardware-software combo could simplify MPEG real-time video compression," Electronic Design, May 3, 1993, p. 36.

Schroeder, E., "New offerings buoy MPEG as video standard," Desktop Computing, PC Week, May 8, 1995, pp. 1&29.

Yu, Y. et al., "Software Implementation of MPEG-II Video Encoding Using Socket Programming in LAN," SPIE vol. 2187, pp. 229-240, 1994.

Clark, H. et al., "DAWGS-A Distributed Computer Server Utilizing Idle Workstations," Proc. Of the 5$^{th}$ Distributed Memory Computing Conf., IEEE, pp. 732-741, Apr. 1990.

Blumofe, R. et al., "Scheduling Large-Scale Parallel Computations on Networks of Workstations," Proc. Of the 3$^{rd}$ IEEE Int'l Symp on High Performance Distributed Computing, pp. 96-105, Aug. 1994.

Celenk, M. et al., "Parallel Task Execution in LANs and Performance Analysis," Proc. Of the 1995 IEEE 14$^{th}$ Annual Int'l Phoenix Conf. On Computers and Communications, pp. 423-429, Mar. 1995.

Kremien, O., "Buying and Selling Computational Power Over the Network," Proc. Of the 4$^{th}$ Int'l. Conf. On Computer Communications and Networks, IEEE, pp. 616-619, Sep. 1995.

Chen, C. et al., "The DBC: Processing Scientific Data Over the Internet," Proc. Of the 16$^{th}$ Int'l. Conf. On Distributed Computing Systems, pp. 673-679, May 1996.

Shiuan, J. et al., "Client-Server Based Ray-Tracer Using ASTRA: An Asynchronous RPC Mechanism," Computer Communications, vol. 19, No. 5, pp. 445-455, May 1996.

Morris, J., et al., "Fault Tolerant Networks of Workstations," Proc. Of the 3$^{rd}$ Int'l. Conf. On High Performance Computing, IEEE, pp. 271-276, Dec. 1996.

Notice of Allowance issued in U.S. Appl. No. 09/935,779, mailed Jan. 21, 2009.

English language abstract of EP 0 647 052, published Apr. 5, 1995.

Newton's Telecom Dictionary, "Mobile IP", p. 459, Mar. 1998.

Holographic Quantum Computer, http://www.unitelnw.com/holo1/index (May 1999).

Jonathan Fahey, "Screen Grab", Forbes, pp. 52-53, Mar. 5, 2001.

Ronald Gover et al., "TV Guy", Business Week, pp. 66-76, Mar. 12, 2001.

"Distributed Computing", Red Herring, No. 87, pp. 166-202, Dec. 18, 2000.

Om Malik, "Distributed Computing Redefines Computer Networks, Underpinning Innovation, Company Formation, and Investments", Red Herring, No. 86, pp. 95-96 and 105, Dec. 4, 2000.

Alan Zeichick, "P2P Nework Expalined", Red Herring, No. 86, pp. 204 and 206, Dec. 4, 2000.

"Napster is Clouding Grove's Crystal Ball"; Fortune, pp. 271-272, May 29, 2000.

Notice of Alowance issued in U.S. Appl. No. 09/884,041, mailed Mar. 9, 2009.

Notice of Allowance dated May 22, 2008 for U.S. Appl. No. 09/884,041.

Final Office Action issued in U.S. Appl. No. 10/802,049 mailed Jul. 3, 2008.

Notice of Allowance issued in U.S. Appl. No. 09/935,779 mailed Jul. 18, 2008.

Wilkinson, Barry et al., "Parallel Programming: Techniques and Applications Using Networked Workstations and Parallel Computers", Chapter 4, Prentice-Hall, Inc., 1999.

Baker, Lou et. al., "Parallel Programming", Chapter 4, McGraw Hill Companies, Inc., 1996.

Notice of Allowance issued in U.S. Appl. No. 09/884,041, mailed Oct. 9, 2008.

Office Action issued in U.S. Appl. No. 10/663,911, mailed Sep. 26, 2008.

A. Kayssi et al., "FPGA-based Internet Protocol Firewall Chip", Electronics, Circuits and Systems, 2000. ICECS 2000. The 7th IEEE International Conference on vol. 1, pp. 316-319, Dec. 17-20, 2000.

Office Action issued in U.S. Appl. No. 10/663,911, mailed Jun. 26, 2009.

Gordon Force, Sr., "Portable Data Encryption Approaches", WESTCON/'95, Conference Record: Microelectronics Communications Technology Producing Quality Production Mobile and Portable Power emerging Technologies, Nov. 7-9, 1995, pp. 413-419.

A.D. Romig, Jr., "Performance Microsystem Packaging: A Perspective", Microelectron Reliab., vol. 37, No. 10/11, pp. 1771- 1781 (1997).

Office Action issued in U.S. Appl. No. 10/802,049, mailed Jul. 1, 2009.

* cited by examiner

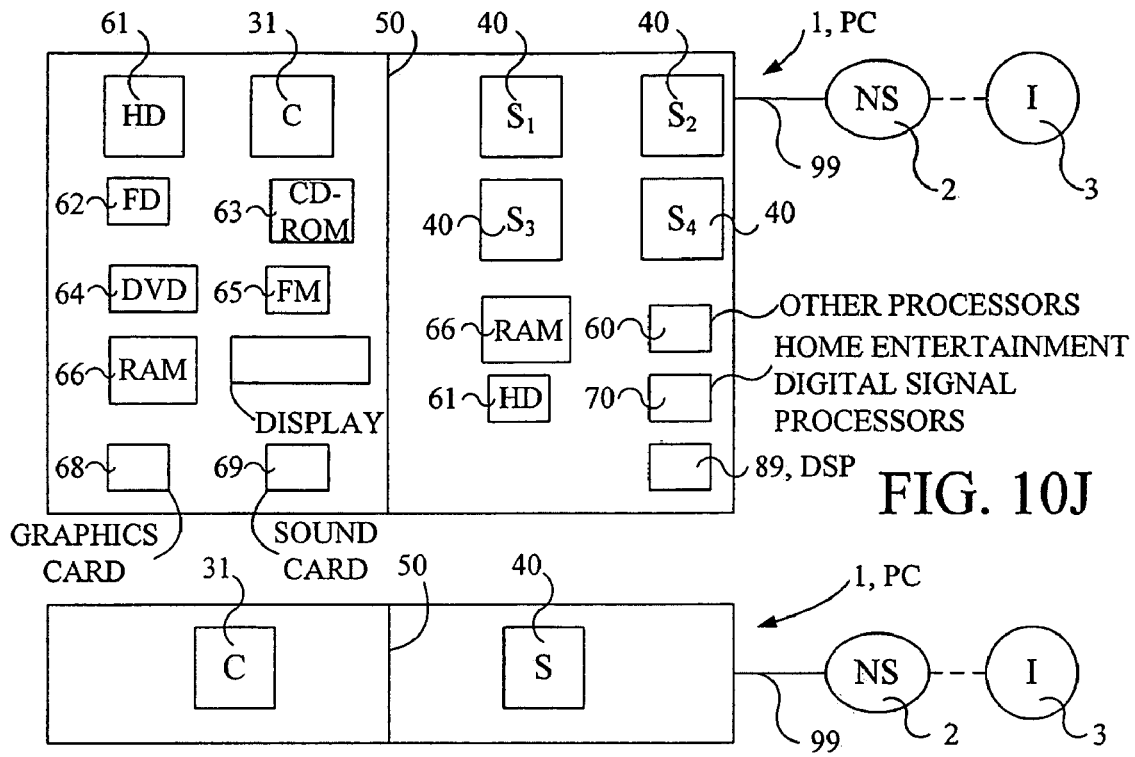
FIG. 10J
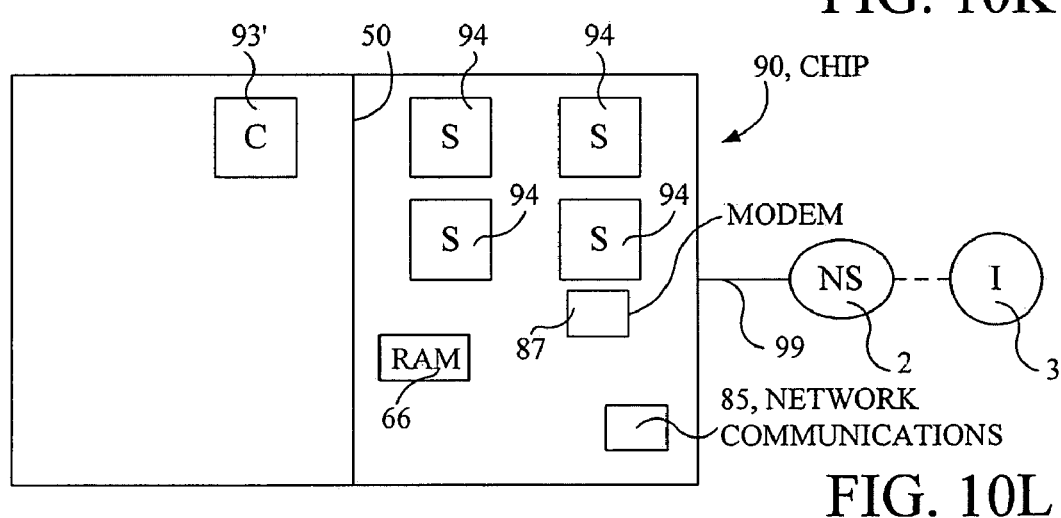
FIG. 10K
FIG. 10L
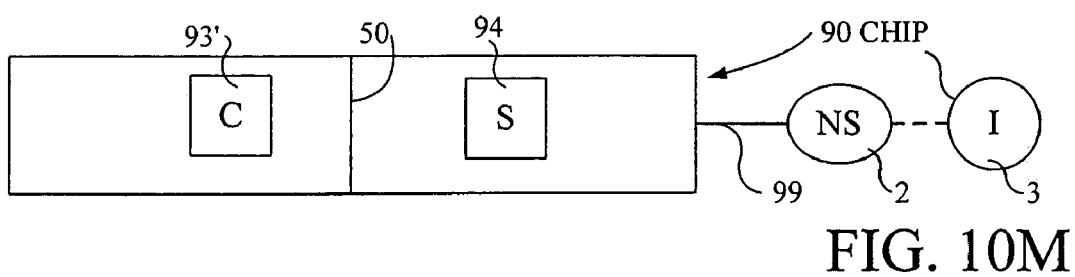
FIG. 10M

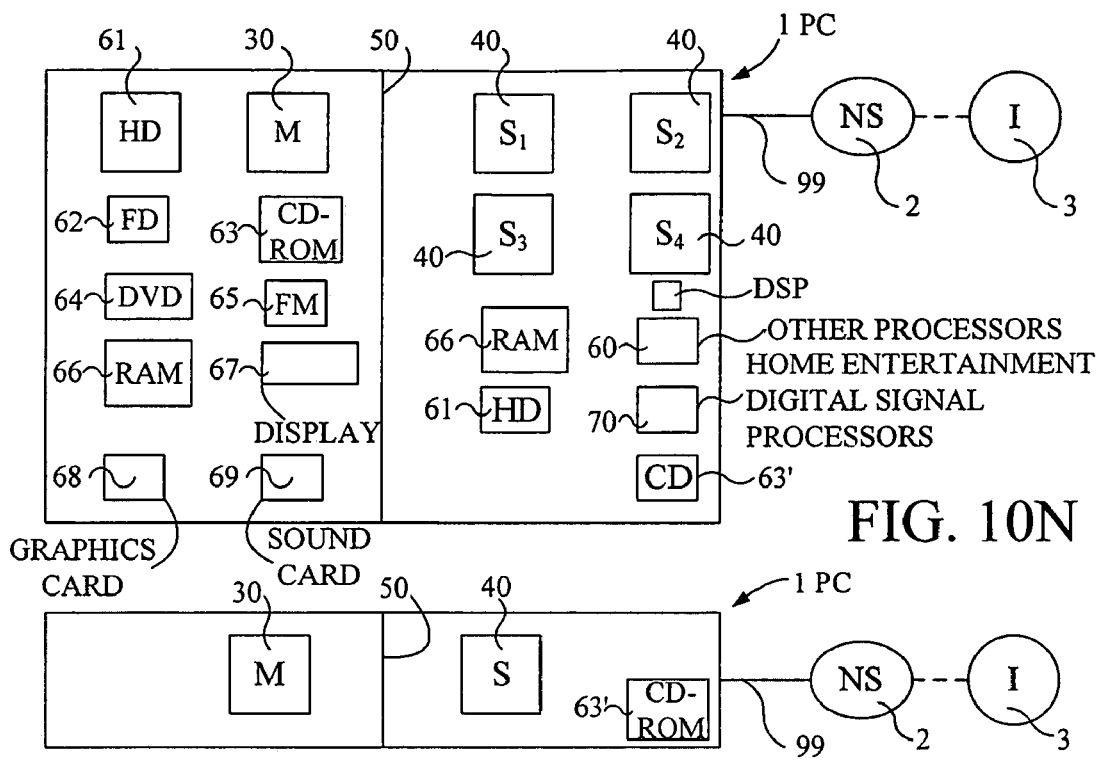
FIG. 10N
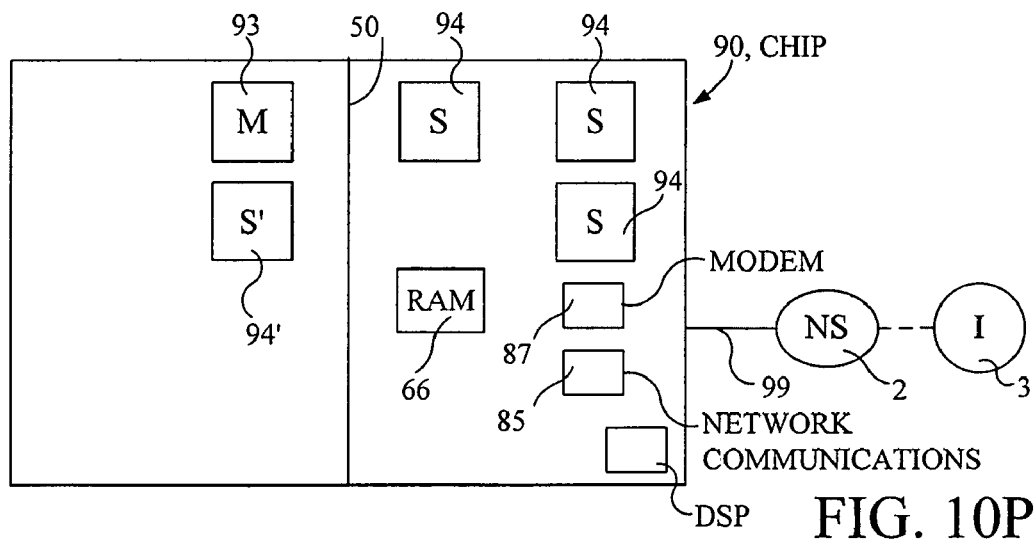
FIG. 10O
FIG. 10P
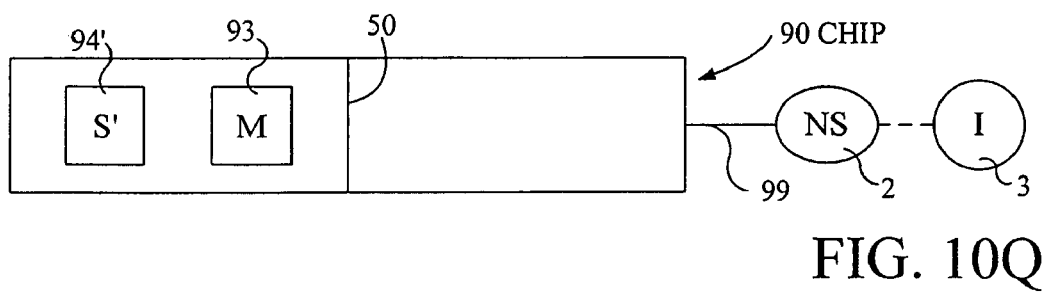
FIG. 10Q

MASTER PC OFFLOADS OPERATIONS TO SLAVE PC 1 WHOSE FUNCTION IS M

UNAVAILABLE $S_{21}$ OFFLOADS RESULTS OF $S_{31}$ & $S_{32}$ TO AVAILABLE $S_{21'}$, WHICH TAKES OVER

LIKE FIG. 16D $S_{21'}$ REPLACES $S_{21}$

FIGS. 16O-Q
ARE SECTIONS
OF FIG. 16F NET
(Left upper)

LIKE FIG. 10C:
"PERSONAL
COMPUTER ON A CHIP"
(FIGS. 16R-16U)

MICROPROCESSOR 90 CAN BE ENTIRE PC 1 ON A SINGLE MICROCHIP

FIG. 16W-X FOLLOWS FIG. 16O-Q & ARE ALSO SECTION OF FIG. 16F NET

LIKE FIG. 10A & B

PERSONAL AND SERVER COMPUTERS HAVING MICROCHIPS WITH MULTIPLE PROCESSING UNITS AND INTERNAL FIREWALLS

This application receives the benefit of U.S. provisional applications 60/086,948, filed May 27, 1998, 60/066,313, filed Nov. 21, 1997, 60/066,415, filed Nov. 24, 1997, 60/086,366, filed Dec. 19, 1997, 60/086,588, filed May 22, 1998, and 60/086,516, filed May 22, 1998. This application is a continuation-in-part of U.S. patent application Ser. No. 08/980,058, filed Nov. 26, 1997, which receives the benefit of provisional application 60/066,415, filed Nov. 24, 1997, provisional application 60/066,313, filed Nov. 21, 1997, provisional application 60/033,871, filed Dec. 20, 1996, provisional application 60/032,207 filed Dec. 2, 1996, and provisional application 60/031,855, filed Nov. 29, 1996. This application is also a continuation-in part of PCT application PCT/US97/21812, filed Nov. 28, 1997 and designating the United States. PCT/US97/21812 receives the benefit of provisional application 60/066,415, filed Nov. 24, 1997, provisional application 60/066,313, filed Nov. 21, 1997, provisional application 60/033,871, filed Dec. 20, 1996, provisional application 60/032,207 filed Dec. 2, 1996, and provisional application 60/031,855, filed Nov. 29, 1996. PCT/US97/21812 is a continuation-in-part of U.S. patent application Ser. No. 08/980,058, whose priority is discussed above.

BACKGROUND OF THE INVENTION

This invention generally relates to one or more computer networks having computers like personal computers or network computers such as servers with microprocessors preferably linked by broadband transmission means and having hardware, software, firmware, and other means such that at least two parallel processing operations occur that involve at least two sets of computers in the network or in networks connected together, a form of metacomputing. More particularly, this invention relates to one or more large networks composed of smaller networks and large numbers of computers connected, like the Internet, wherein more than one separate parallel or massively parallel processing operation involving more than one different set of computers occurs simultaneously. Even more particularly, this invention relates to one or more such networks wherein more than one (or a very large number of) parallel or massively parallel microprocessing processing operations occur separately or in an interrelated fashion; and wherein ongoing network processing linkages can be established between virtually any microprocessors of separate computers connected to the network.

Still more particularly, this invention relates generally to a network structure or architecture that enables the shared used of network microprocessors for parallel processing, including massive parallel processing, and other shared processing such as multitasking, wherein personal computer owners provide microprocessor processing power to a network, preferably for parallel or massively parallel processing or multitasking, in exchange for network linkage to other personal and other computers supplied by network providers such as Internet Service Providers (ISP's), including linkage to other microprocessors for parallel or other processing such as multitasking. The financial basis of the shared use between owners and providers would be whatever terms to which the parties agree, subject to governing laws, regulations, or rules, including payment from either party to the other based on periodic measurement of net use or provision of processing power or preferably involving no payment, with the network system (software, hardware, etc) providing an essentially equivalent usage of computing resources by both users and providers (since any network computer operated by either entity can potentially be both a user and provider of computing resources alternately (or even simultaneously, assuming multitasking), with potentially an override option by a user (exercised on the basis, for example, of user profile or user's credit line or through relatively instant payment).

Finally, this invention relates to a network system architecture including hardware and software that will provide use of the Internet or its future equivalents or successors (and most other networks) without cost to most users of personal computers or most other computers, while also providing those users (and all other users, including of supercomputers) with computer processing performance that will at least double every 18 months through metacomputing means. The metacomputing performance increase provided by this new MetaInternet (or Metanet for short) will be in addition to all other performance increases, such as those already anticipated by Moore's Law.

By way of background, the computer industry has been governed over the last 30 years by Moore's Law, which holds that the circuitry of computer chips has been shrunk substantially each year, yielding a new generation of chips every 18 months with twice as many transistors, so that microprocessor computing power is effectively doubled every year and a half.

The long term trend in computer chip miniaturization is projected to continue unabated over the next few decades. For example, slightly more than a decade ago a 16 kilobit DRAM memory chip (storing 16,000 data bits) was typical; the current standard 16 megabit chip (16,000,000 data bits), introduced in 1993, is a thousand times larger. Industry projections are for 16 gigabit memory chips (16,000,000,000 data bits) to be introduced in 2008 and 64 gigabit chips in 2011, with 16 terabit chips (16,000,000,000,000 data bits) conceivable by the mid-to-late 2020's. This is a thousand-fold increase regularly every fifteen years. Hard drive speed and capacity are also growing at a spectacular rate, even higher than that of semiconductor microchips in recent years.

Similarly regular and enormous improvements are anticipated to continue in microprocessor computing speeds, whether measured in simple clock speed or MIPS (millions of instructions for second) or numbers of transistors per chip. For example, performance has improved by four or five times every three years since Intel launched its X86 family of microprocessors used in the currently dominant "Wintel" standard personal computers. The initial Intel Pentium Pro microprocessor was introduced in 1995 and is a thousand times faster than the first IBM standard PC microprocessor, the Intel 8088, which was introduced in 1979. The fastest of current microprocessors like Digital Equipment Corp.'s Alpha chip is faster than the processor in the original Cray Y-MP supercomputer.

Both microprocessors and software (and firmware and other components) are also evolving from 8 bit and 16 bit systems into 32 bit systems that are becoming the standard today, with some 64 bit systems like the DEC Alpha already introduced and more coming, such as Intel's Merced microprocessor in 1999, with future increases to 128 bit likely some later.

A second major development trend in the past decade or so has been the rise of parallel processing, a computer architecture utilizing more than one CPU microprocessor (often many more, even thousands of relatively simple microprocessors, for massively parallel processing) linked together into a single computer with new operating systems having modifications that allow such an approach. The field of supercomputing has been taken over by this approach, including designs utilizing many identical standard personal computer microprocessors.

Hardware, firmware, software and other components specific to parallel processing are in a relatively early stage of development compared to that for single processor computing, and therefore much further design and development is expected in the future to better maximize the computing capacity made possible by parallel processing. One potential benefit that will likely be available soon is system architecture that does not rely on the multiple microprocessors having to share memory, thereby allowing more independent operation of those microprocessors, each with their own discrete memory, like current personal computers, workstations and most other computer systems architecture; for unconstrained operation, each individual microprocessor must have rapid access to sufficient memory.

Several models of personal computers are now available with more than one microprocessor. It seems inevitable that in the future personal computers, broadly defined to include versions not currently in use, will also employ parallel computing utilizing multiple microprocessors or massively parallel computing with very large numbers of microprocessors. Future designs, such Intel's Merced chip, will have a significant number of parallel processors on a single microprocessor chip.

A form of parallel processing called superscalar processing is also being employed within microprocessor design itself. The current generation of microprocessors such at the Intel Pentium have more than one data path within the microprocessor in which data can be processed, with two to three paths being typical now and as many as eight in 1998 in IBM's new Power 3 microprocessor chip.

The third major development trend is the increasing size of bandwidth, which is a measure of communications power or transmission speed (in terms of units of data per second) between computers connected by a network. Before now, the local area networks and telephone lines typically linking computers including personal computers have operated at speeds much lower than the processing speeds of a personal computer. For example, a typical 1997 Intel Pentium operates at 100 MIPS (millions of instructions per second), whereas the most common current Ethernet connecting PC's is roughly 10 times slower at 10 megabits per second (Mbps), although some Ethernet connections are now 100 Mbps) and telephone lines are very much slower, the highest typical speed in 1998 being about 56 kilobits (reached only during downloads, however).

Now, however, the situation is expected to change dramatically, with bandwidth or transmission speed being anticipated to expand from 5 to 100 times as fast as the rise of microprocessor speeds, due to the use of coaxial cable, wireless, and especially fiber optic cable, instead of old telephone twisted pair lines. Telecommunication providers are now making available fiber connections supporting bandwidth of 40 gigabits and higher.

Technical improvements are expected in the near term which will make it possible to carry over 2 gigahertz (billions of cycles per second) on each of 700 wavelength streams, adding up to more than 1,400 gigahertz on every single fiber thread. Experts currently estimate that the bandwidth of optical fiber has been utilized one million times less fully than the bandwidth of coaxial or twisted pair copper lines. Within a decade, 10,000 wavelength streams per fiber are expected and 20-80 wavelengths on a single fiber is already commercially available.

Other network connection developments such as asynchronous transfer mode (ATM) and digital signal processors, which are improving their price/performance tenfold every two years, are also supporting the rapid increase in bandwidth. The increase in bandwidth reduces the need for switching and switching speed will be greatly enhanced when practical optical switches are introduced in the fairly near future, potentially reducing costs substantially.

The result of this huge bandwidth increase will be extraordinary: within just a few years it will be technically possible to connect virtually any computer to a network at a speed that equals or exceeds the computer's own internal system bus speed, even as that bus speed itself is increasing significantly. The system bus of a computer is its internal network connecting many or most of its internal components such as microprocessor, random access memory (RAM), hard-drive, modem, floppy drive, and CD-ROM; for recent personal computers it has been only about 40 megabits per second, but is up to 133 megabits per second on Intel's Pentium PCI bus in 1995. IBM's 1998 Power3 microprocessor chip has a system bus of 1.6 gigabits per second.

Despite these tremendous improvements anticipated in the future, the unfortunate present reality is that a typical personal computer (PC) is already so fast that its microprocessor is essentially idle during most of the time the PC is in actual use and that operating time itself is but a small fraction of those days the PC is even in any use at all. The reality is that nearly all PC's are essentially idle during roughly all of their useful life. A realistic estimate is that its microprocessor is in an idle state 99.9% of the time (disregarding current unnecessary microprocessor busywork like executing screen saver programs, which have been made essentially obsolete by power-saving CRT monitor technology, which is now standard in the PC industry).

Given the fact that the reliability of PC's is so exceptionally high now, with the mean time to failure of all components typically several hundred thousand hours or more, the huge idle time of PC's represents a total loss; given the high capital and operating costs of PC's, the economic loss is very high. PC idle time does not in effect store a PC, saving it for future use, since the principle limiting factor to continued use of today's PC's is obsolescence, not equipment failure from use.

Moreover, there is growing concern that Moore's Law, which as noted above holds that the constant miniaturization of circuits results in a doubling of computing power every 18 months, cannot continue to hold true much longer. Indeed, Moore's Law may now be nearing its limits for silicon-based devices, perhaps by as early as 2004, and no new technologies have yet emerged that currently seem with reasonable certainty to have the potential for development to a practical level by then, although many recent advances have the potential to maintain Moore's Law.

SUMMARY OF THE INVENTION

However, the confluence of all three of the established major trends summarized above—supercomputer-like personal computers, the spread of parallel processing using personal computer microprocessors (particularly massively parallel processing), and the enormous increase in network communications bandwidth—will make possible in the near future a surprising solution to the hugely excessive idleness problem of personal computers (and to the problematic possible end of Moore's Law), with very high potential economic savings.

The solution is use those mostly idle PC's (or their equivalents or successors) to build a parallel or massively parallel processing computer utilizing a very large network like the Internet or, more specifically, like the World Wide Web (WWW), or their equivalents or eventual successors like the MetaInternet (and including Internet II, which is under development now and which will utilize much broader bandwidth and will coexist with the Internet, the structure of which is in ever constant hardware and software upgrade and including the SuperInternet based on essentially all optical fiber transmission) with extremely broad bandwidth connections and virtually unlimited data transmission speed.

The prime characteristic of the Internet is of course the very large number of computers of all sorts already linked to it, with the future potential for effectively universal connection; it is a network of networks of computers that provides nearly unrestricted access (other than cost) worldwide. The soon-to-be available very broad bandwidth of network communications can be used to link personal computers externally in a manner at least equivalent to the faster internal system buses of the personal computers, so that no external processing constraint will be imposed on linked personal computers by data input or output, or throughput; the speed of the microprocessor itself will be the only processing constraint of the system, other than the internal system bus design.

This will make external parallel processing possible, including massively parallel processing, in a manner paralleling more conventional internal parallel processing, call superscalar processing.

The World Wide Web (or its equivalents or successors) would thereby have the potential to be transformed into a huge virtual massively parallel processing computer or computers, with a unique potential through its established hyperlinks connections to operate in a manner at least somewhat like a human neural network or neural networks, since the speed of transmission in the linkages would be so great that any linkage between two microprocessors would be virtually equivalent to direct, physically close connections between those microprocessors.

With further development, digital signal processor-type microprocessors and/or analogue microprocessors may be particularly advantageous for this approach, either alone or in conjunction with conventional microprocessors and/or those new microprocessors described in this application. Networks with WWW-type hyperlinks incorporating digital signal processor-type microprocessor (or successors or equivalents) could operate separately from networks of conventional microprocessors (or successors or equivalents) or with one or more connections between such differing networks or with relatively complete integration between such differing networks. Simultaneous operation across the same network connection structure should be possible, employing non-interfering transmission links.

Such extremely broad bandwidth networks of computers will enable every PC to be fully utilized or nearly so. Because of the extraordinary extent to which existing PC's are currently idle, at optimal performance this new system will potentially result in a thousand-fold increase in computer power available to each and every PC user (and any other user); and, on demand, almost any desired level of increased power, limited mostly by the increased cost, which however would be relatively far less that possible from any other conceivable computer network configuration. This revolutionary increase is on top of the extremely rapid, but evolutionary increases already occurring in the computer/network industry discussed above.

The metacomputing hardware and software means of the MetaInternet will provide performance increases that will likely at least double every eighteen months based on the doubling of personal computers shared in a typical parallel processing operation by a standard PC user, starting first with at least 2 PC's, then about 4, about 8, about 16, about 32, about 64, about 128, about 256, and about 512. After about fifteen years, each standard PC user will likely be able to use about 1024 personal computers for parallel processing or any other shared computing use, while generally using the Internet or its successors like the MetaInternet for free. At the other end of the performance spectrum, supercomputers will experience a similar performance increase generally, but ultimately the performance increase is limited primarily by cost of adding temporary network linkages to available PC's, so there is definite potential for a quantum leap in supercomputer performance.

Network computer systems as described above offer almost limitless flexibility due to the abundant supply of heretofore idle connected microprocessors. This advantage would allow "tightly coupled" computing problems (which normally are difficult to process in parallel) to be solved without knowing in advance (as is now necessary in relatively massively parallel processing) how many processors are available, what they are and their connection characteristics. A minimum number of equivalent processors (with equivalent other specs) can be easily found nearby in a massive network like the Internet and assigned within the network from those multitudes available nearby. Moreover, the number of microprocessors used can be almost completely flexible, depending on the complexity of the problem, and limited only by cost. The current problem of time delay will be solved largely by the widespread introduction of extremely broad bandwidth connections between computers processing in parallel.

DETAILED DESCRIPTION OF THE PREFERRED EMBODIMENTS

Figure 1:
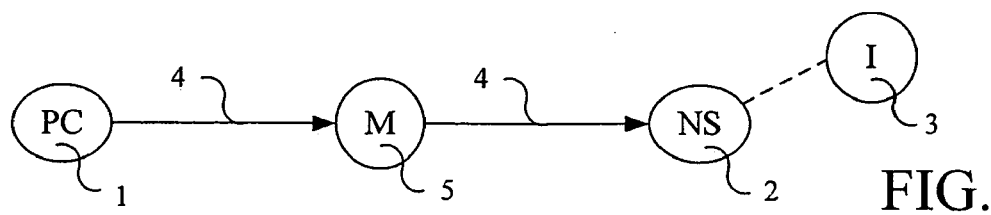
FIG. 1 is a simplified diagram of a section of a computer network, such as the Internet, showing an embodiment of a meter means which measures flow of computing during a shared operation such as parallel processing between a typical PC user and a network provider.

The new network computer will utilize PC's as providers of computing power to the network, not just users of network services. These connections between network and personal computer are enabled by a new form of computer/network financial structure that is rooted on the fact that economic resources being provided the network by PC owners (or leaser) are similar in value to those being provided by the network provider providing connectivity.

Unlike existing one way functional relationships between network providers such as internet service providers (often currently utilizing telecommunications networks for connectivity) and PC users, wherein the network provider provides access to a network like the Internet for a fee (much like cable TV services), this new relationship would recognize that the PC user is also providing the network access to the user's PC for parallel computing use, which has a similar value. The PC thus both provides and uses services on the network, alternatively or potentially even virtually simultaneously in a multitasking mode.

This new network would operate with a structural relationship that would be roughly like that which presently can exist between an electrical power utility and a small independent power generator connected to the utility, wherein electrical power can flow in either between utilitiy and independent direction depending on the operating decisions of both parties and at any particular point in time each party is in either a debt or credit position relative to the other based on the net direction of that flow for a given period, and is billed accordingly. In the increasingly deregulated electrical power industry, electrical power (both its creation and transmission) is becoming a commodity bought and sold in a competitive marketplace that crosses traditional borders. With the structural relationship proposed here for the new network, parallel free market structures should develop over time in a new computer power industry dominated by networks of personal computers in all their current and future forms providing shared processing.

For this new network and its structural relationships, a network provider is defined in the broadest possible way as any entity (corporation or other business, government, not-for-profit, cooperative, consortium, committee, association, community, or other organization or individual) that provides personal computer users (very broadly defined below) with initial and continuing connection hardware and/or software and/or firmware and/or other components and/or services to any network, such as the Internet and Internet II or WWW or their present or future equivalents, coexistors or successors, like the herein proposed MetaInternet, including any of the current types of Internet access providers (ISP's) including telecommunication companies, television cable or broadcast companies, electrical power companies, satellite communications companies, or their present or future equivalents, coexistors or successors. The connection means used in the networks of the network providers, including between personal computers or equivalents or successors, would preferably be very broad bandwidth, by such means as fiber optic cable or wireless for example, but not excluding any other means, including television coaxial cable and telephone twisted pair, as well as associated gateways, bridges, routers, and switches with all associated hardware and/or software and/or firmware and/or other components and their present or future equivalents or successors. The computers used by the providers include any computers, including mainframes, minicomputers, servers, and personal computers, and associated their associated hardware and/or software and/or firmware and/or other components, and their present or future equivalents or successors.

Other levels of network control beyond the network provider will also exist to control any aspect of the network structure and function, any one of which levels may or may not control and interact directly with the PC user. For example, at least one level of network control like the World Wide Web Consortium (W3C) or Internet Society (ISOC) or other ad hoc industry consortia) would establish and ensure compliance with any prescribed network standards and/or protocols and/or industry standard agreements for any hardware and/or software and/or firmware and/or other component connected to the network. Under the consensus control of these consortia/societies, other levels of network control would deal with administration and operation of the network. These other levels of network control might be constituted by any network entity, including those defined immediately above for network providers.

The principal defining characteristic of the network provided being communication connections (including hardware and/or software and/or firmware and/or other component) of any form, including electromagnetic (such as light and radio or microwaves) and electrochemical (and not excluding biochemical or biological), between PC users, with connection (either directly or indirectly) to the largest number of users possible being highly advantageous, such as networks like the Internet (and Internet II and SuperInternet) and WWW and equivalents and successors, like the MetaInternet. Multiple levels of such networks will likely coexist with different technical capabilities, like Internet and Internet II, but would have interconnection and therefore would communicate freely between levels, for such standard network functions as electronic mail.

And a personal computer (PC) user is defined in the broadest possible way as any individual or other entity using a personal computer, which is defined as any computer, digital or analog or neural, particularly including microprocessor-based personal computers having one or more microprocessors (each including one or more parallel processors) in their general current form (hardware and/or software and/or firmware and/or any other component) and their present and future equivalents or successors, such as workstations, network computers, handheld personal digital assistants, personal communicators such as telephones and pagers, wearable computers, digital signal processors, neural-based computers (including PC's), entertainment devices such as televisions, video tape recorders, videocams, compact or digital video disk (CD or DVD) player/recorders, radios and cameras, other household electronic devices, business electronic devices such as printers, copiers, fax machines, automobile or other transportation equipment devices, and other current or successor devices incorporating one or more microprocessors (or functional or structural equivalents), especially those used directly by individuals, utilizing one or more microprocessors, made of inorganic compounds such as silicon and/or other inorganic or organic compounds; current and future forms of mainframe computers, minicomputers, microcomputers, and even supercomputers are also be included. Such personal computers as defined above have owners or leasers, which may or may not be the same as the computer users. Continuous connection of computers to the network, such as the Internet, WWW, or equivalents or successors, is preferred.

Parallel processing is defined as one form of shared processing as involving two or more microprocessors involved in solving the same computational problem or other task. Massively parallel microprocessor processing involves large numbers of microprocessors. In today's technology, massive parallel processing can probably be considered to be about 64 microprocessors (referred to in this context as nodes) and over 7,000 nodes have been successfully tested in an Intel supercomputer design using PC microprocessors (Pentium Pros). It is anticipated that continued software improvements will make possible a much larger number of nodes, very possibly limited only by the number of microprocessors available for use on a given network, even an extraordinarily large one like the Internet or its equivalents and/or successors, like the MetaInternet.

Broadband wavelength or broad bandwidth network transmission is defined here to mean a transmission speed (usually measured in bits per second) that is at least high enough (or roughly at least equivalent to the internal clock speed of the microprocessor or microprocessors times the number of microprocessor channels equaling instructions per second or operations per second or calculations per second) so that the processing input and output of the microprocessor is substantially unrestricted, particularly including at peak processing levels, by the bandwidth of the network connections between microprocessors that are performing some form of parallel processing, particularly including massive parallel processing. Since this definition is dependent on microprocessor speed, it will increase as microprocessor speeds increase. A rough example might be a current 100 MIPS (millions instructions per second) microprocessor, for which a broad bandwidth connection would be greater than 100 megabits per second (Mbps); this is a very rough approximation. However, a preferred connection means referenced above is fiber optic cable, which currently already provides multiple gigabit bandwidth on single fiber thread and will improve significantly in the future, so the preferred general use of fiber optic cable virtually assures broad bandwidth for data transmission that is far greater than microprocessor speed to provide data to be transmitted. The connection means to provide broad bandwidth transmission can be either wired or wireless, with wireless generally preferred for mobile personal computers (or equivalents or successors) and as otherwise indicated below. Wireless connection bandwidth is also increasing rapidly and can be considered to offer essentially the same principal benefit as fiber optic cable: external data transmission speed in a network that far exceeds internal data processing speed in any computer.

The financial basis of the shared use between owners/leasers and providers would be whatever terms to which the parties agree, subject to governing laws, regulations, or rules, including payment from either party to the other based on periodic measurement of net use or provision of processing power.

In one embodiment, as shown in FIG. 1, in order for this network structure to function effectively, there would be a meter device 5 (comprised of hardware and/or software and/ or firmware and/or other component) to measure the flow of computing power between PC 1 user and network 2 provider or server, which might provide connection to the Internet and/or World Wide Web and/or Internet II and/or any present or future equivalent or successor 3, like the MetaInternet. In one embodiment, the PC user should be measured by some net rating of the processing power being made available to the network, such as net score on one or more standard tests measuring speed or other performance characteristics of the overall system speed, such as PC Magazine's benchmark test program, ZD Winstone (potentially including hardware and/or software and/or firmware and/or other component testing) or specific individual scores for particularly important components like the microprocessor (such as MIPS or millions of instructions per second) that may be of application-specific importance, and by the elapsed time such resources were used by the network. In the simplest case, for example, such a meter need measure only the time the PC was made available to the network for processing 4, which can be used to compare with time the PC used the network (which is already normally measured by the provider, as discussed below) to arrive at a net cost; potential locations of such a meter include at a network computer such as a server, at the PC, and at some point on the connection between the two. Throughput of data in any standard terms is another potential measure.

Figure 2:
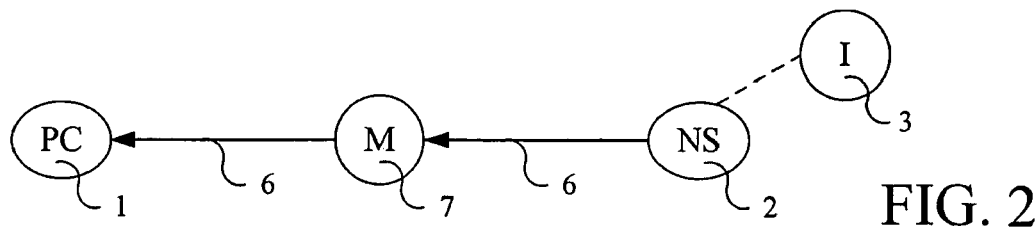
FIG. 2 is a simplified diagram of a section of a computer network, such as the Internet, showing an embodiment of another meter means which measures the flow of network resources, including shared processing, being provided to a typical PC user and a network provider.

In another embodiment, as shown in FIG. 2, there also would be a meter device 7 (comprised of hardware and/or software and/or firmware and/or other component) that measures the amount of network resources 6 that are being used by each individual PC 1 user and their associated cost. This would include, for example, time spent doing conventional downloading of data from sites in the network or broadcast from the network 6. Such metering devices currently exist to support billing by the hour of service or type of service is common in the public industry, by providers such as America Online, Compurserve, and Prodigy. The capability of such existing devices would be enhanced to include a measure of parallel processing resources that are allocated by the Internet Service Provider or equivalent to an individual PC user from other PC users 6, also measuring simply in time. The net difference in time 4 between the results of meter 5 and meter 7 for a given period would provide a reasonable billing basis.

Figure 3:
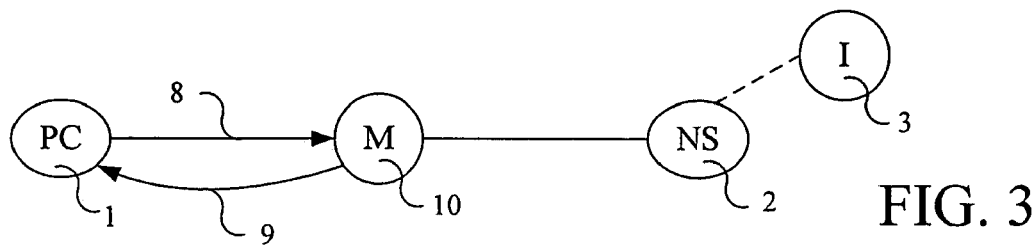
FIG. 3 is a simplified diagram of a section of a computer network, such as the Internet, showing an embodiment of another meter means which, prior to execution, estimates the level of network resources, and their cost, of a shared processing operation requested by a typical PC user from a network provider.

Alternately, as shown in FIG. 3, a meter 10 would also estimate to the individual PC user prospectively the amount of network resources needed to fulfill a processing request from the PC user to the network (provider or other level of network control) and associated projected cost, provide a means of approving the estimate by executing the request, and a real-time readout of the cost as it occurs (alternatively, this meter might be done only to alert 9 the PC user that a given processing request 8 falls outside normal, previously accepted parameters, such as level of cost). To take the example of an unusually deep search request, a priority or time limit and depth of search can be highly useful criteria or limiting parameters that the user can determine or set with the device.

Preferably, the network would involve no payment between users and providers, with the network system (software, hardware, etc) providing an essentially equivalent usage of computing resources by both users and providers (since any network computer operated by either entity can potentially be both a user and provider of computing resources (even simultaneously, assuming multitasking), with potentially an override option by a user (exercised on the basis, for example, of user profile or user's credit line or through relatively instant payment).

Preferably, as shown in FIG. 4, the priority and extent of use of PC and other users can be controlled on a default-to-standard-of-class-usage basis by the network (provider or other) and overridden by the user decision on a basis prescribed by the specific network provider (or by another level of network control). One simple default basis would be to expend up to a PC's or other user's total credit balance with the provider described above and the network provider then to provide further prescribed service on an debt basis up to some set limit for the user; different users might have different limits based on resources and/or credit history.

A specific category of PC user based, for example, on specific microprocessor hardware owned or leased, might have access to a set maximum number of parallel PC's or microprocessors, with smaller or basic users generally having less access and vice versa. Specific categories of users might also have different priorities for the execution of their processing by the network. A very wide range of specific structural forms between user and provider are possible, both conventional and new, based on unique features of the new network computer system of shared processing resources.

Figure 4A:
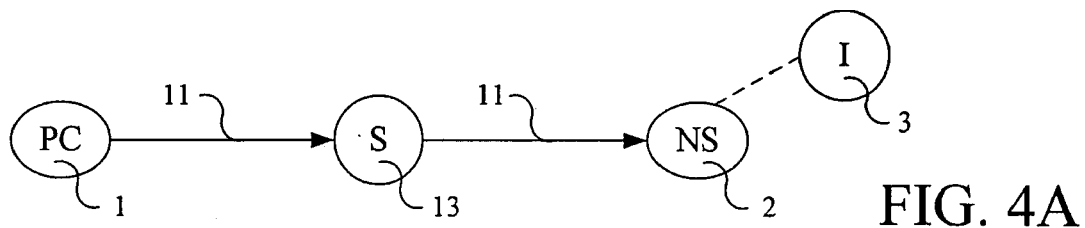
FIG. 4A-4C are simplified diagrams of a section of a computer network, such as the Internet, showing in a sequence of steps an embodiment of a selection means whereby a shared processing request by a PC is matched with a standard preset number of other PC's to execute shared operation.
Figure 4B:
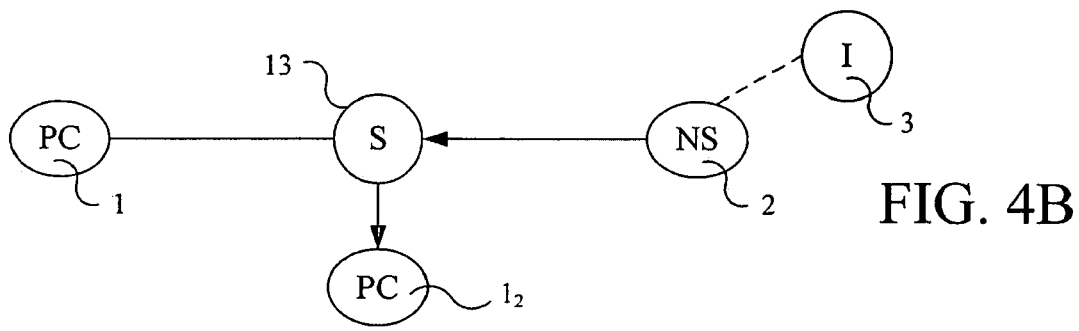
Figure 4C:
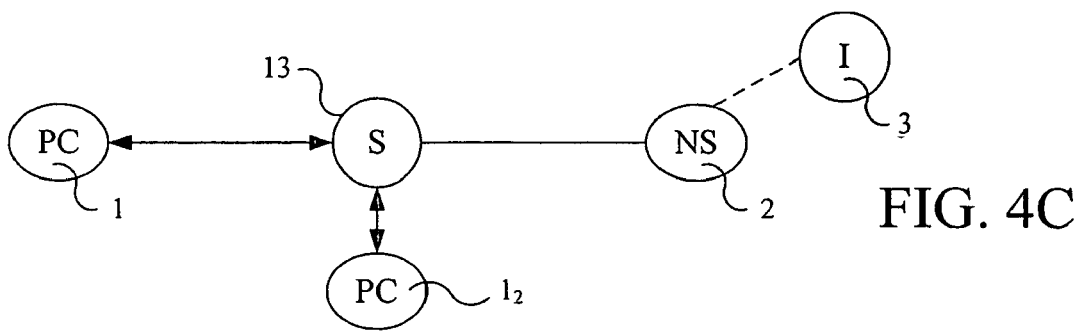

For example, in the simplest case, in an initial system embodiment, as shown in FIG. 4A, a standard PC 1 user request 11 for a use involving parallel processing might be defaulted by system software 13, as shown in FIG. 4B, to the use of only one other essentially identical PC $1_2$ microprocessor for parallel processing or multitasking, as shown in FIG. 4C; larger standard numbers of PC microprocessors, such as about three PC's at the next level, as shown in later FIG. 10G (which could also illustrate a PC 1 user exercising an override option to use a level of services above the default standard of one PC microprocessor, presumably at extra cost), for a total of about four, then about 8, about 16, about 32, about 64 and so on, or virtually any number in between, would be made available as the network system is upgraded over time, as well as the addition of sophisticated override options. Eventually many more PC microprocessors would be made available to the standard PC user (virtually any number), preferably starting at about 128, then about 256, then about 512, then about 1024 and so on over time, as the network and all of its components are gradually upgraded to handle the increasing numbers. System scalability at even the standard user level is essentially unlimited over time.

Preferably, for most standard PC users (including present and future equivalents and successors), connection to the Internet (or present or future equivalents or successors like the MetaInternet) would be at no cost to PC users, since in exchange for such Internet access the PC users would generally make their PC, when idle, available to the network for shared processing. Preferably, then, competition between Internet Service Providers (including present and future equivalents and successors) for PC user customers would be over such factors as the convenience and quality of the access service provided and of shared processing provided at no addition cost to standard PC users, or on such factors as the level of shared processing in terms, for example of number of slave PC's assigned on a standard basis to a master PC. The ISP's would also compete for parallel processing operations, from inside or outside the ISP Networks, to conduct over their networks.

In addition, as shown in FIG. 5, in another embodiment there would be a (hardware and/or software and/or firmware and/or other) controlling device to control access to the user's PC by the network. In its simplest form, such as a manually activated electromechanical switch, the PC user could set this controller device to make the PC available to the network when not in use by the PC user. Alternatively, the PC user could set the controller device to make the PC available to the network whenever in an idle state, however momentary, by making use of multitasking hardware and/or software and/or firmware and/or other component (broadcast or "push" applications from the Internet or other network could still run in the desktop background).

Figure 5A:
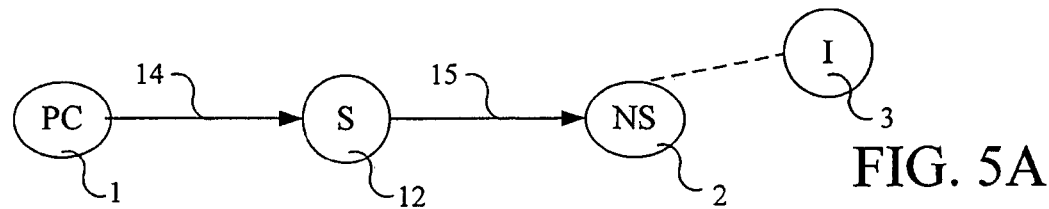
FIG. 5 is a simplified diagram of a section of a computer network, such as the Internet, showing an embodiment of a control means whereby the PC, when idled by its user, is made available to the network for shared processing operations.
Figure 5B:
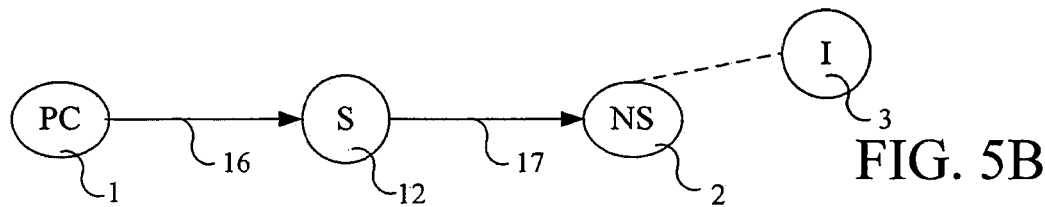

Or, more simply, as shown in FIG. 5A, whenever the state that all user applications are closed and the PC 1 is available to the network 14 (perhaps after a time delay set by the user, like that conventionally used on screensaver software) is detected by a software controller device 12 installed in the PC, the device 12 would signal 15 the network computer such as a server 2 that the PC available to the network, which could then control the PC 1 for parallel processing or multitasking by another PC. Such shared processing can continue until the device 12 detects the an application being opened 16 in the first PC (or at first use of keyboard, for quicker response, in a multitasking environment), when the device 12 would signal 17 the network computer such as a server 2 that the PC is no longer available to the network, as shown in FIG. 5B, so the network would then terminate its use of the first PC.

Figure 6:
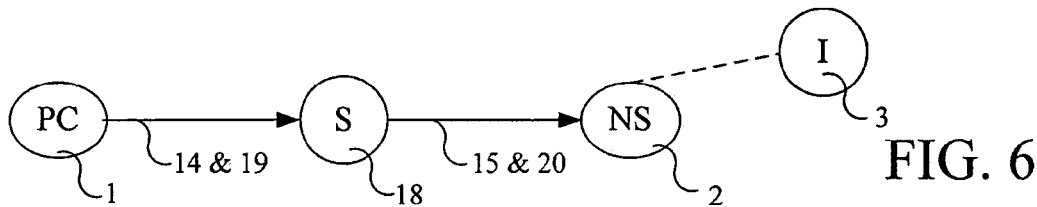
FIG. 6 is a simplified diagram of a section of a computer network, such as the Internet, showing an embodiment of a signal means whereby the PC, when idled by its user, signals its availability to the network for shared processing operations.

In a preferred embodiment, as shown in FIG. 6, there would be a (hardware and/or software and/or firmware and/or other component) signaling device 18 for the PC 1 to indicate or signal 15 to the network the user PC's availability 14 for network use (and whether full use or multitasking only) as well as its specific (hardware/software/firmware/other components) configuration 20 (from a status 19 provided by the PC) in sufficient detail for the network or network computer such as a server 2 to utilize its capability effectively. In one embodiment, the transponder device would be resident in the user PC and broadcast its idle state or other status (upon change or periodically, for example) or respond to a query signal from a network device.

Figure 7:
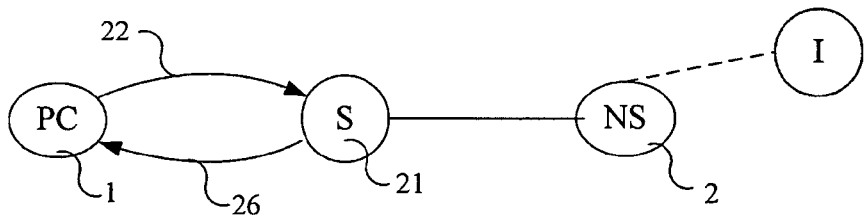
FIG. 7 is a simplified diagram of a section of a computer network, such as the Internet, showing an embodiment of a receiver and/or interrogator means whereby the network receives and/or queries the availability for shared processing status of a PC within the network.

Also, in another embodiment, as shown in FIG. 7, there would be a (hardware/software and/or firmware and/or other component) transponder device 21 resident in a part of the network (such as network computer, switch, router, or another PC, for examples) that receives 22 the PC device status broadcast and/or queries 26 the PC for its status, as shown in FIG. 7.

Figure 8:
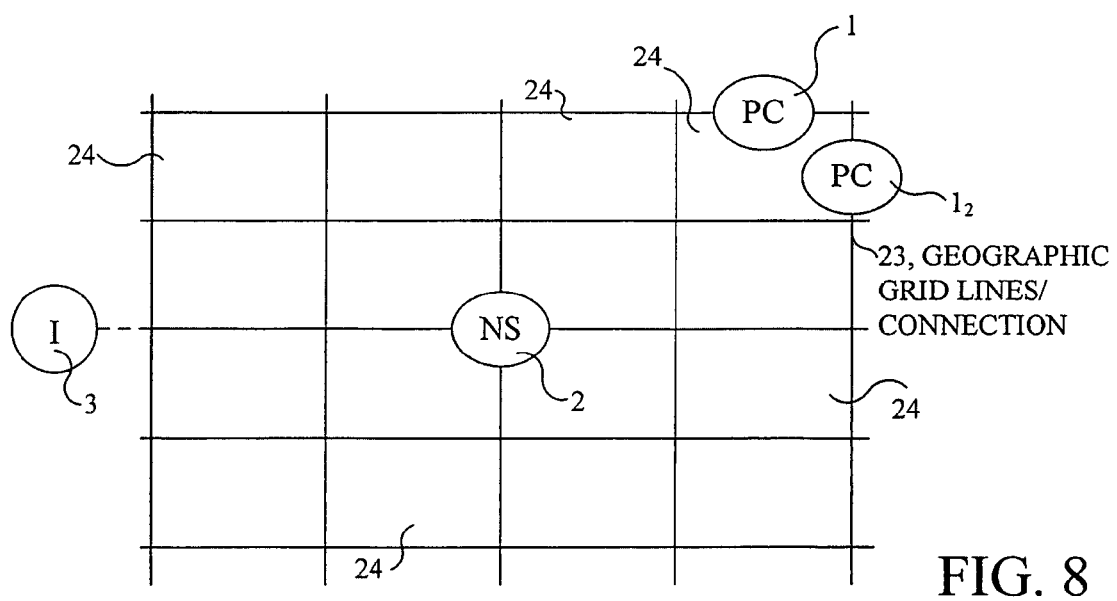
FIG. 8 is a simplified diagram of a section of a computer network, such as the Internet, showing an embodiment of a selection and/or utilization means whereby the network locates available PC's in the network that are located closest to each other for shared processing.

In one embodiment, as shown in FIG. 8, the network would also have resident in a part of its hardware and/or software (and/or firmware and/or other components) a capacity such as to allow it to most effectively select and utilize the available user PC's to perform parallel processing initiated by PC users or the network providers or others. To do so, the network should have the (hardware and/or software and/or firmware and/or other component) capability of locating each PC accurately at the PC's position on the geographic grid lines/connection means 23 so that parallel processing occurs between PC's (PC 1 and PC 1$_2$) as close together as possible, which should not be difficult for PC's at fixed sites with a geographic location, customarily grouped together into cells 24, as shown in FIG. 8, but which requires an active system for any wireless microprocessor to measure its distance from its network relay site, as discussed below in FIG. 14.

Figure 9:
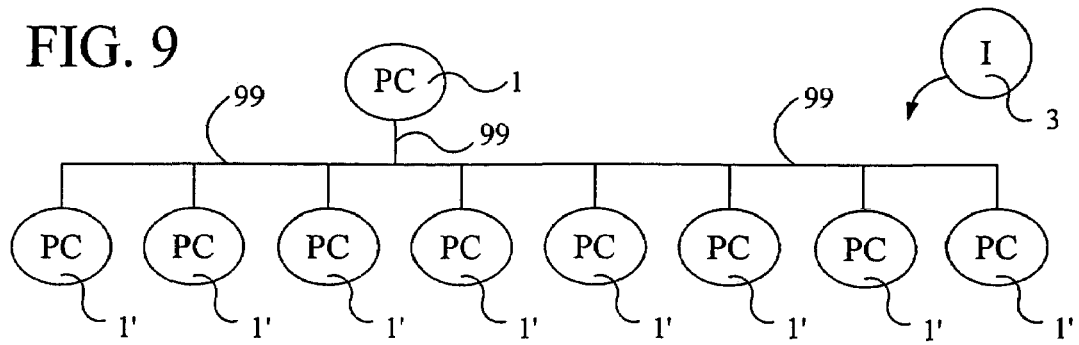
FIG. 9 is a simplified diagram of a section of a computer network, such as the Internet, showing an embodiment of a system architecture for conducting a request imitated by a PC for a search using parallel processing means that utilizes a number of networked PC's.

One of the primary capabilities of the Internet (or Internet II or successor, like the MetaInternet) or WWW network computer would be to facilitate searches by the PC user or other user. As shown in FIG. 9, searches are particularly suitable to multiple processing, since, for example, a typical search would be to find a specific Internet or WWW site with specific information. Such site searches can be broken up geographically, with a different PC processor 1' allocated by the network communicating through a wired means 99 as shown (or wireless connections) to search each area, the overall area being divided into eight separate parts, as shown, which would preferably be about equal, so that the total search would be about ⅛ as long as if one processor did it alone (assuming the PC 1 microprocessor provides control only and not parallel processing, which may be preferable in some case).

As a typical example, a single PC user might need 1,000 minutes of search time to find what is requested, whereas the network computer, using multiple PC processors, might be able to complete the search in 100 minutes using 10 processors, or 10 minutes using 100 processors or 1 minute using 1,000 processors (or even 1 second using 60,000 processors); assuming performance transparency, which should be achievable, at least over time. The network's external parallel processing is completely scalable, with virtually no theoretical limit.

The above examples also illustrates a tremendous potential benefit of network parallel processing. The same amount of network resources, 60,000 processor seconds, was expended in each of the equivalent examples. But by using relatively large multiples of processors, the network can provide the user with relatively immediate response with no difference in cost (or relatively little difference)—a major benefit. In effect, each PC user linked to the network providing external parallel processing becomes, in effect, a virtual supercomputer! As discussed below, supercomputers would experience a similar quantum leap in performance by employing a thousand-fold (or more) increase in microprocessors above current levels.

Such power will likely be required for any effective searches in the World Wide Web (WWW). WWW is currently growing at a rate such that it is doubling every year, so that searching for information within the WWW will become geometrically more difficult in future years, particularly a decade hence, and it is already a very significant difficulty to find WWW sites of relevance to any given search and then to review and analyze the contents of the site.

So the capability to search with massive parallel processing will be required to be effective and will dramatically enhance the capabilities of scientific, technological and medical researchers.

Such enhanced capabilities for searching (and analysis) will also fundamentally alter the relationship of buyers and sellers of any items and/or services. For the buyer, massive parallel network processing will make it possible to find the best price, worldwide, for any product or the most highly rated product or service (for performance, reliability, etc.) within a category or the best combination of price/performance or the highest rated product for a given price point and so on. The best price for the product can include best price for shipping within specific delivery time parameters acceptable to the buyer.

For the seller, such parallel processing will drastically enhance the search, worldwide, for customers potentially interested in a given product or service, providing very specific targets for advertisement. Sellers, even producers, will be able to know their customers directly and interact with them directly for feedback on specific products and services to better assess customer satisfaction and survey for new product development.

Similarly, the vastly increased capability provided by the system's shared parallel processing will produce major improvements in complex simulations like modeling worldwide and local weather systems over time, as well as design and testing of any structure or product, from airliners and skyscrapers, to new drugs and to the use of much more sophisticated artificial intelligence (AI) in medical treatment and in sorting through and organizing for PC users the voluminous input of electronic data from "push" technologies. Improvements in games would also be evident, especially in terms of realistic simulation and interactivity.

As is clear from the examples, the Internet or WWW network computer system like the MetaInternet would potentially put into the hands of the PC user an extraordinary new level of computer power vastly greater than the most powerful supercomputer existing today. The world's total of microchips is already about 350 billion, of which about 15 billion are microprocessors of some kind (most are fairly simple "appliance" type running wrist watches, Televisions, cameras, cars, telephones, etc). Assuming growth at its current rates, in a decade the Internet/Internet II/WWW could easily have a billion individual PC users, each providing a average total of at least 10 highly sophisticated microprocessors (assuming PC's with at least 4 microprocessors (or more, such as 16 microprocessors or 32, for example) and associated other handheld, home entertainment, and business devices with microprocessors or digital processing capability, like a digital signal processor or successor devices). That would be a global computer a decade from now made of at least 10 billion microprocessors, interconnected by electromagnetic wave means at speeds approaching the speed of light.

In addition, if the exceptionally numerous "appliance" microprocessors noted above, especially those that operate now intermittently like personal computers, are designed to the same basic consensus industry standard as parallel microprocessors for PC's (or equivalents or successors) or for PC "systems on a chip" discussed later in FIG. 10A-H, and if also connected by broad bandwidth means such as fiber optic cable or equivalent wireless, then the number of parallel processors potentially available would increase roughly about 10 times, for a net potential "standard" computing performance of up to 10,000 times current performance within fifteen years, exclusive of Moore's Law routine increases. Moreover, if all currently intermittently operating microprocessors followed the same basic design standards, then although the cost per microprocessor would rise somewhat, especially initially, the net cost of computing for all users would fall drastically due to the general performance increase due to the use of otherwise idle "appliance" microprocessors. Overall system costs will therefore compel such microprocessors, which are currently specialty devices known as application-specific integrated circuits (ASICs), virtually all to become general microprocessors (like PC's), with software and firmware providing most of their distinguishing functionality.

To put this in context, a typical supercomputer today utilizing the latest PC microprocessors has less than a hundred. Using network linkage to all external parallel processing, a peak maximum of perhaps 1 billion microprocessors could be made available for a network supercomputer user, providing it with the power 10,000,000 times greater than would be available using today's internal parallel processing supercomputers (assuming the same microprocessor technology). Because of it's virtually limitless scalability mentioned above, resources made available by the network to the supercomputer user or PC user would be capable of varying significantly during any computing function, so that peak computing loads would be met with effectively whatever level of resources are necessary.

In summary, regarding monitoring the net provision of power between PC and network, FIGS. 1-9 show embodiments of a system for a network of computers, including personal computers, comprising: means for network services including browsing functions, as well as shared computer processing such as parallel processing, to be provided to the personal computers within the network; at least two personal computers; means for at least one of the personal computers, when idled by a personal user, to be made available temporarily to provide the shared computer processing services to the network; and means for monitoring on a net basis the provision of the services to each the personal computer or to the personal computer user. In addition, FIGS. 1-9 show embodiments including where the system is scalar in that the system imposes no limit to the number of the personal computers, including at least 1024 personal computers; the system is scalar in that the system imposes no limit to the number of personal computers participating in a single shared computer processing operation, including at least 256 personal computers; the network is connected to the Internet and its equivalents and successors, so that the personal computers include at least a million personal computers; the network is connected to the World Wide Web and its successors; the network includes at least one network server that participates in the shared computer processing.; the monitoring means includes a meter device to measure the flow of computing power between the personal computers and the network; the monitoring means includes a means by which the personal user of the personal computer is provided with a prospective estimate of cost for the network to execute an operation requested by the personal user prior to execution of the operation by the network; the system has a control means by which to permit and to deny access to the personal computers by the network for shared computer processing; access to the personal computers by the network is limited to those times when the personal computers are idle; and the personal computers having at least one microprocessor and communicating with the network through a connection means having a speed of data transmission that is at least greater than a peak data processing speed of the microprocessor.

Also, relative to maintaining a standard cost, FIGS. 1-9 show embodiments of a system for a network of computers, including personal computers, comprising: means for network services including browsing functions, as well as shared computer processing such as parallel processing, to be provided to the personal computers within the network; at least two personal computers; means for at least one of the personal computers, when idled by a personal user, to be made available temporarily to provide the shared computer processing services to the network; and means for maintaining a standard cost basis for the provision of the services to each personal computer or to the personal computer user. In addition, FIGS. 1-9 show embodiments including where the system is scalar in that the system imposes no limit to the number of personal computers, including at least 1,024 personal computers; the system is scalar in that the system imposes no limit to the number of the personal computers participating in a single shared computer processing operation, including at least 256 personal computers; the network is connected to the Internet and its equivalents and successors, so that the personal computers include at least a million personal computers; the standard cost is fixed; the fixed standard cost is zero; the means for maintaining a standard cost basis includes the use of making available a standard number of personal computers for shared processing by personal computers;the network is connected to the World Wide Web and its successors; the personal user can override the means for maintaining a standard cost basis so that the personal user can obtain additional network services; the system has a control means by which to permit and to deny access to the personal computers by the network for shared computer processing; the personal computers having at least one microprocessor and communicating with the network through a connection means having a speed of data transmission that is at least greater than a peak data processing speed of the microprocessor.

Browsing functions generally include functions like those standard functions provided by current Internet browsers, such as Microsoft Explorer 3.0 or 4.0 and Netscape Navigator 3.0 or 4.0, including at least searching World Wide Web or Internet sites, exchanging E-Mail worldwide, and worldwide conferencing; an intranet network uses the same browser software, but might not include access to the Internet or WWW. Shared processing includes at least parallel processing and multitasking processing involving more than two personal computers, as defined above. The network system is entirely scalar, with any number of PC microprocessors potentially possible.

As shown in FIGS. 10A-10F, to deal with operational and security issues, it may be especially useful for individual PC users to have one microprocessor or equivalent device that is designated, permanently or temporarily, to be a master 30 controlling device (comprised of hardware and/or software and/of firmware and/or other component) that remains unaccessible (preferably using a hardware and/or software and/or firmware and/or other component firewall 50) directly by the network but which controls the functions of the other, slave microprocessors 40 when is not utilizing them.

Figure 10A:
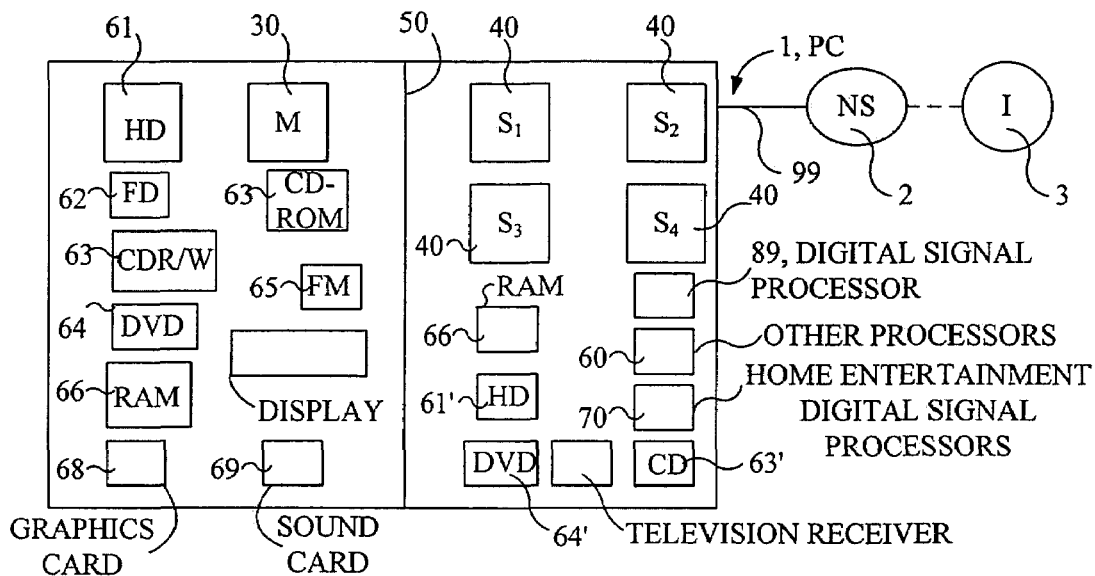
FIGS. 10A-10I are simplified diagrams of a section of a computer network, such as the Internet, showing an embodiment of a system architecture utilizing a firewall to separate that part of a networked PC (including a system reduced in size to a microchip) that is accessible to the network for shared processing from a part that is kept accessible only to the PC user; also showing the alternating role that preferably each PC in the network can play as either a master or slave in a shared processing operation involving one or more slave PC's in the network; showing a home or business network system; in addition, showing PC and PC microchips controlled by a controller (including remote) with limited or no processing capability; and showing PC and PC microchips in which a firewall 50 is can be reconfigured by a PC user.

For example, as shown in FIGS. 10A, a typical PC 1 might have four or five microprocessors (even on a single microprocessor chip), with one master 30 and three or four slaves 40, depending on whether the master 30 is a controller exclusively (through different design of any component part), requiring four slave microprocessors 40 preferably; or the master microprocessor 30 has the same or equivalent microprocessing capability as a slave 40 and multiprocesses in parallel with the slave microprocessors 40, thereby requiring only three slave microprocessors 40, preferably. The number of PC slave microprocessors 40 can be increased to virtually any other number, such as at least about eight, about 16, about 32, about 64, about 128, about 256, about 512, about 1024, and so on (these specific multiples are preferred, but not required; the PC master microprocessors 30 can also be increased). Also included is at least one preferred firewall 50 between master 30 and slave 40 microprocessors. As shown in preceding FIGS. 1-9, the PC 1 in FIG. 10A is preferably connected to a network computer 2 and to the Internet or WWW or present or future equivalent or successor 3, like the MetaInternet.

Other typical PC hardware components such as hard drive 61, floppy drive 62, compact disk-read only memory (CD-ROM) 63, digital video disk (DVD) 64, Flash memory 65, random access memory (RAM) 66, video or other display 67, graphics card 68, and sound card 69, as well as digital signal processor or processors, together with the software and/or firmware stored on or for them, can be located on either side of the preferred firewall 50, but such devices as the display 67, graphics card 68 and sound card 69 and those devices that both read and write and have non-volatile memory (retain data without power and generally have to be written over to erase), such as hard drive 61, Flash memory 65, floppy drive 62, read/write CD-ROM 63' or DVD 64 are preferred to be located on the PC user side of the firewall 50, where the master microprocessor is also located, as shown in FIG. 10A, for security reasons primarily; their location can be flexible, with that capability controlled such as by password-authorized access.

Alternately, any or these devices that are duplicative (or for other exceptional needs) like a second hard drive 61' can be located on the network side of the firewall 50. RAM 66 or equivalent or successor memory, which typically is volatile (data is lost when power is interrupted), should generally be located on the network side of the firewall 50, however some can be located with the master microprocessor to facilitate its independent use.

Read-only memory devices such as most current CD drives (CD-ROM's) 63' or DVD's (DVD-ROM) 64' can be safely located on the network side of the firewall 50, since the data on those drives cannot be altered by network users; preemptive control of use would preferably remain with the PC user in terms of interrupting network use.

Figure 10B:
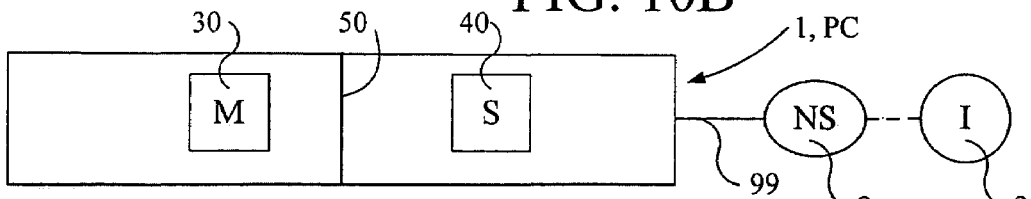
Figure 10C:
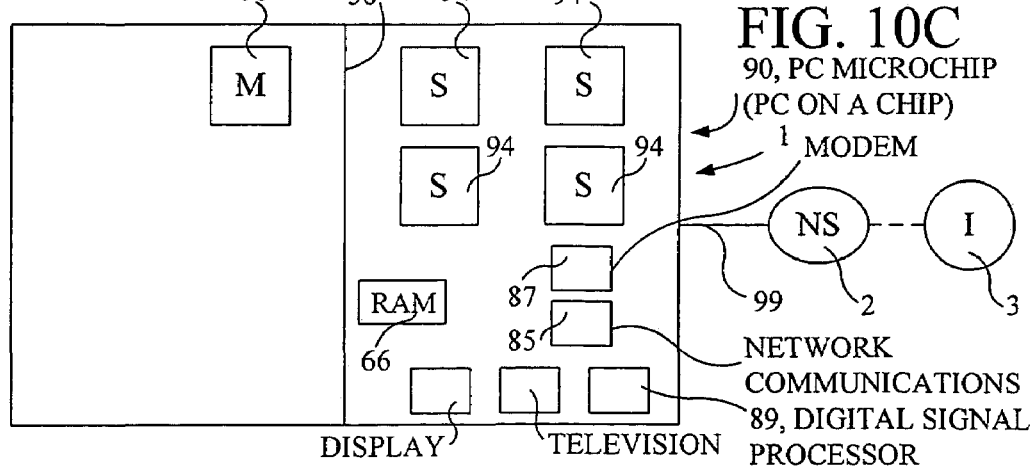
Figure 10D:
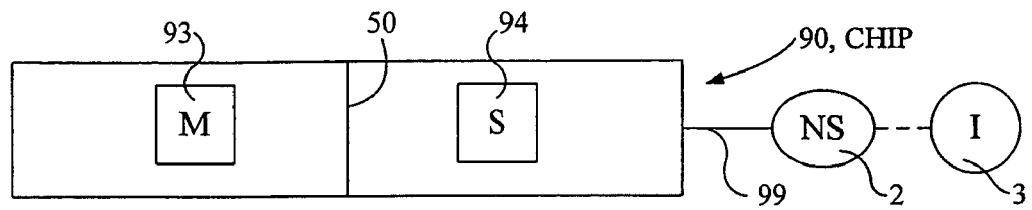
Figure 10E:
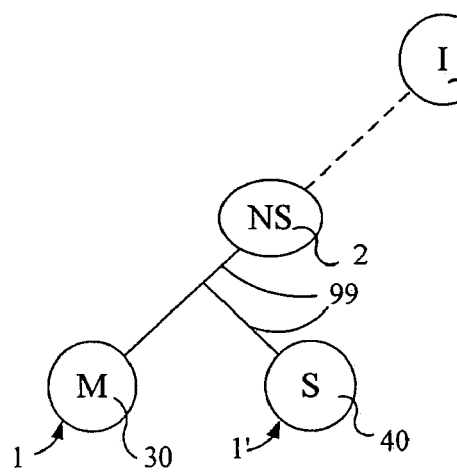
Figure 10F:
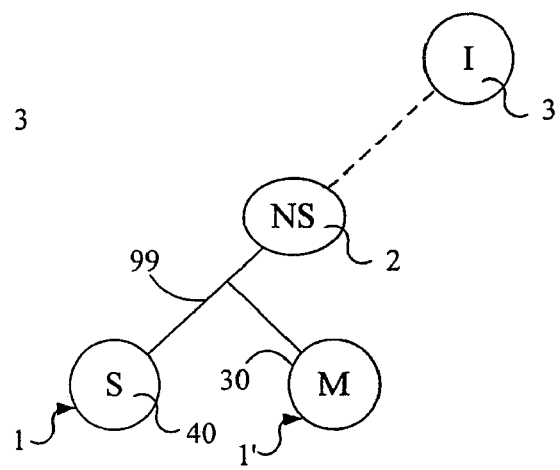
Figure 10G:
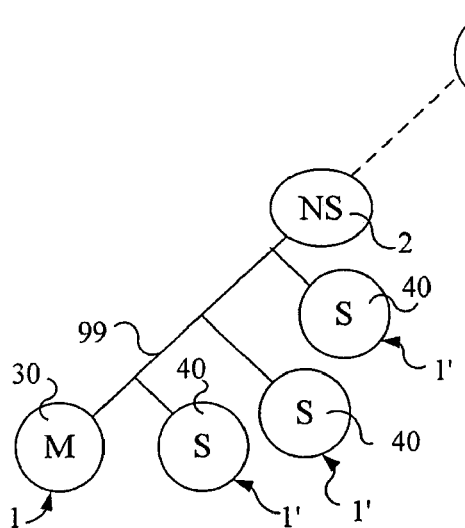
Figure 10H:
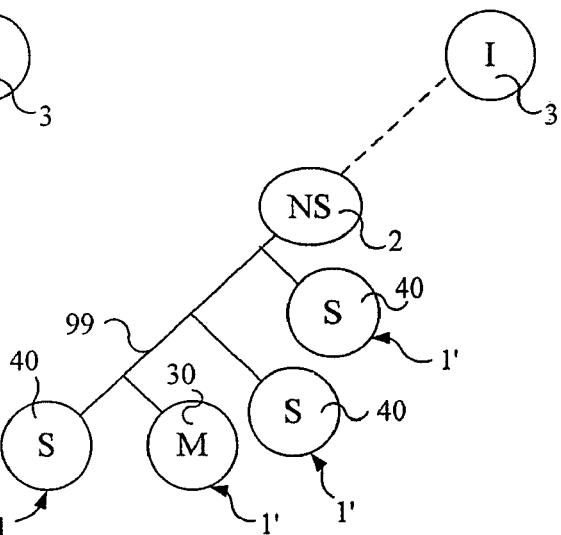
Figure 10I:
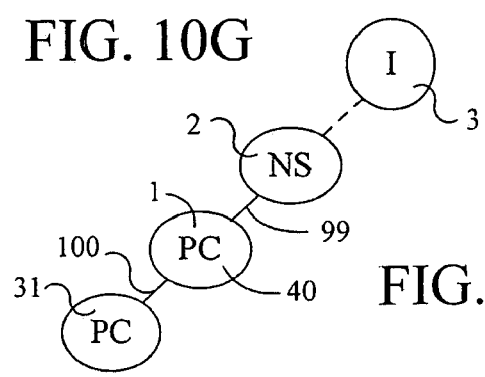

However, at least a portion of RAM is can be kept on the Master 30 microprocessor side of the firewall 50, so that the PC user can use retain the ability to use a core of user PC 1 processing capability entirely separate from any network processing; if this capability is not desired, then the master 30 microprocessor can be moved to the network side of the firewall 50 and replaced with a simpler controller on the PC 1 user side, like the master remote controller 31 discussed below and shown in FIG. 10I.

And the master microprocessor 30 might also control the use of several or all other processors 60 owned or leased by the PC user, such as home entertainment digital signal processors 70, especially if the design standards of such microprocessors in the future conforms to the requirements of network parallel processing as described above. In this general approach, the PC master processor would use the slave microprocessors or, if idle (or working on low priority, deferable processing), make them available to the network provider or others to use. Preferably, wireless connections 100 would be extensively used in home or business network systems, including use of a master remote controller 31 without (or with) microprocessing capability, with preferably broad bandwidth connections such as fiber optic cable connecting directly to at least one component such as a PC 1, shown in a slave configuration, of the home or business personal network system; that preferred connection would link the home system to the network 2 such as the Internet 3, as shown in FIG. 10I. A business system would include preferably fiber optic links to most or all personal computers PC 1 and other devices with microprocessors, such as printers, copiers, scanners, fax machines, telephone and video conferencing equipment; wireless links can be used also.

A PC 1 user can remotely access his networked PC 1 by using another networked master microprocessor 30 on another PC 1 and using a password or other access control means for entry to his own PC 1 master microprocessor 30 and files, as is common now in Internet and other access. Alternately, a remote user can simply carry his own files and his own master microprocessor or use another networked master microprocessor temporarily as his own.

In the simplest multi-microprocessor configuration, as shown in FIG. 10B, the PC 1 would have a single master microprocessor 30 and a single slave microprocessor 40, preferably separated by a firewall 50, with both processors used in parallel or multitasking processing or with only the slave 40 so used, and preferably connected to a network computer 2 and Internet 3 (and successors like the MetaInternet). Virtually any number of slave microprocessors 40 is possible. The other non-microprocessor components shown in FIG. 10A above might also be included in this simple FIG. 10B configuration.

Preferably, as shown in FIG. 10C, single chip microprocessors 90 can integrate most or all of the other necessary computer components (or their present or future equivalents or successors), like a PC's memory (RAM 66, graphics, sound, power management, network communications 85, and video processing, possibly including modem 87, flash bios, digital signal processor or processors, and other components or present or future equivalents or successors) and internal bus, on a single chip 90 (silicon, plastic, or other), known in the industry as a "system on a chip". Such a PC micro chip 90 would preferably have the same architecture as that of the PC 1 shown above in FIG. 10A: namely, a master control and/or processing unit 93 and one or more slave processing units 94 (for parallel or multitasking processing by either the PC 1 or the Network 2), preferably separated by a firewall 50 and preferably connected to a network computer 3 and the Internet 3 and successors like the MetaInternet.

Existing PC components with mechanical components like hard drive 61, floppy drive or other drive configured to have a removable diskette 62, CD-ROM 63 and DVD 64, which are mass storage devices with mechanical features that will likely not become an integral part of a PC "system of a chip" would preferably, of course, still be capable of connection to a single PC micro chip 90 and control by a single PC master unit 93.

In the simplest multi-processor case, as shown in FIG. 10D, the chip 90 would have a single master unit 93 and at least one slave unit 94 (with the master having a controlling function only or a processing function also), preferably separated by a firewall 50 and preferably connected to a network or network server 2 and the Internet 3 (and successors like the MetaInternet). The other non-microprocessor components shown in FIG. 10A above might also be included in this simple FIG. 10D configuration.

As noted in the second paragraph of the introduction to the background of the invention, in the preferred network invention, any computer can potentially be both a user and provider, alternatively—a dual mode operating capability. Consequently, any PC 1 within the network 2, preferably connected to the Internet 3 (and successors like the MetaInternet), can be temporarily a master PC 30 at one time initiating a parallel or multitasking processing request to the network 2 for execution by at least one slave PC 40, as shown in FIG. 10E. At another time the same PC 1 can become a slave PC 40 that executes a parallel or multitasking processing request by another PC 1' that has temporarily assumed the function of master 30, as shown in FIG. 10F. The simplest approach to achieving this alternation is for both master and slave versions of the parallel processing software to be loaded in each or every PC 1 that is to share in the parallel processing, so each PC 1 has the necessary software means, together with minor operational modifications, such as adding a switching means by which a signaled request for parallel processing initiated by one PC 1 user using master software is transmitted to at least a second PC 1, triggering its slave software to respond by initiating parallel processing.

As shown in FIGS. 10G and 10H, which are parallel to FIGS. 10E and 10F, the number of PC slave processors 40 can be increased to any virtually other number, such as at least about 4, as shown; the design of the processing system is completely scalar, so that further increases can occur to about eight slave microprocessors 40, about 16, about 32, about 64, about 128, about 256, about 512, about 1024, and so on (these multiples indicated are preferred, not required); the PC master microprocessors 30 can also be increased.

As noted above relative to FIG. 10I, a PC 1 can function as a slave PC 40 and be controlled by a master controller 31, which can be remote and which may have limited or no microprocessing capability. As shown in FIG. 10J and 10K, such a master controller 31 would be located on the PC user side of the firewall 50, under the control of the PC user, while the microprocessors 40 would reside on the network side of the firewall 50. The master controller 31 preferably would receive input from the PC user by any user/PC 1 interface means such as keyboard, microphone, videocam or future hardware and/or software and/or firmware or other equivalent or successor interface means (as would a master processor 40) that provides input to a PC 1 or microprocessor 30 originating from a user's hand, voice, eye, nerve or nerves, or other body part; in addition, remote access might also be enabled by a hardware and/or software and/or firmware and/or other means with suitable security such as password controlled access. Similarly, as shown in FIGS. 10L and 10M, relative to a PC "system on a chip" a master controller unit 93' (which could be capable of being accessed by the PC user through a remote controller 31) with only a controlling capability would be located on the PC user side of the firewall 50, under the control of the PC user, while the slave processor units 94 would reside on the network side of the firewall 50.

FIGS. 10N and 10O show PC 1 with a firewall 50 that is configurable through either hardware and/or software and/or firmware and/or other means; software configuration would be easiest and most typical, but active motherboard configuration is possible and may present some security advantages; manual switches could of course be used potentially. FIG. 10N shows a CD-ROM 63' that has been placed by a PC user on the network side of a firewall 50 from a previous position on the PC user side of a firewall 50, which was shown in FIG. 10A. Preferably, the settings of a firewall 50 would default to those that would most safely protect the PC 1 from uncontrolled access by network users, but with capability for the relatively sophisticated PC user to override such default settings, but with proper safeguards to protect the unsophisticated user from inadvertently doing so; configuration of a firewall 50 might also be actively controlled by a network administrator in a local network like that of a business, where a PC user may not be owner or leaser of the PC being used.

Similarly, FIGS. 10P and 10Q show a PC "system of a chip" 90 with a firewall 50 that is configurable through either hardware and/or software and/or firmware and/or other means; software configuration would be easiest and most typical. Active configuration of the integrated circuits of the PC microchip 90 is also possible and may present some speed and security advantages. Such direct configuration of the circuits of the microchip 90 to establish or change in its firewall 50 could be provided by the use of field-programmable gate arrays (or FPGA's) or their future equivalents or successors; in FIG. 10P, for example, slave processing unit 94' has been moved to the PC user side of a firewall 50 from a network side position shown in FIGS. 10C and 10L. Similarly, FIG. 10Q shows the same active configuration of chip circuit using FPGA's for the simplest form of multiprocessing microchip 90 with a single slave unit 94', transferring its position to the PC user's side of a firewall 50 from a network side shown in FIGS. 10M and 10D.

In summary, relative to the use of master/slave computers, FIGS. 10A-10I show embodiments of a system for a network of computers, including personal computers, comprising: at least two personal computers; means for at least one personal computer, when directed by its personal user, to function temporarily as a master personal computer to initiate and control the execution of a computer processing operation shared with at least one other personal computer in the network; means for at least one other personal computer, when idled by its personal user, to be made available to function temporarily as at least one slave personal computer to participate in the execution of a shared computer processing operation controlled by the master personal computer; and means for the personal computers to alternate as directed between functioning as a master and functioning as a slave in the shared computer processing operations. In addition, FIGS.

10A-10I show embodiments including wherein the system is scalar in that the system imposes no limit to the number of personal computers; the system includes at least 256 said personal computers; the system is scalar in that the system imposes no limit to the number of personal computers participating in a single shared computer processing operation, including at least 256 said personal computers; the system is scalar in that the system imposes no limit to the number of personal computers participating in a single shared computer processing operation, including at least 256 said personal computers; the network is connected to the Internet and its equivalents and successors, so that personal computers include at least a million personal computers; the shared computer processing is parallel processing; the network is connected to the World Wide Web and its successors; a means for network services, including browsing and broadcast functions, as well as shared computer processing such as parallel processing, are provided to said personal computers within said network; the network includes at least one network server that participates in the shared computer processing; the personal computers include a transponder means so that a master personal computer can determine the closest available slave personal computers; the closest available slave personal computer is compatible with the master personal computer to execute said shared computer processing operation; the personal computers having at least one microprocessor and communicating with the network through a connection means having a speed of data transmission that is at least greater than a peak data processing speed of the microprocessor; and a local network PC 1 being controlled remotely by a microprocessor controller 31.

The preferred use of the firewall 50, as described above in FIGS. 10A-10I, provides a solution to an important security problem by preferably completely isolating host PC's 1 that are providing slave microprocessors to the network for parallel or other shared processing functions from any capability to access or retain information about any element about that shared processing. In addition, of course, the firewall 50 provides security for the host PC against intrusion by outside hackers; by reducing the need for encryption and authentication, the use of firewalls 50 will provide a relative increase in computing speed and efficiency. In addition to computers such as personal computers, the firewall 50 described above could be used in any device with "appliance"-type microprocessors, such as telephones, televisions or cars, as discussed above.

In summary, regarding the use of firewalls, FIGS. 10A-10I show embodiments of a system architecture for computers, including personal computers, to function within a network of computers, comprising: a computer with at least two microprocessors and having a connection means with a network of computers; the architecture for the computers including a firewall means for personal computers to limit access by the network to only a portion of the hardware, software, firmware, and other components of the personal computers; the firewall means will not permit access by the network to at least a one microprocessor having a means to function as a master microprocessor to initiate and control the execution of a computer processing operation shared with at least one other microprocessor having a means to function as a slave microprocessor; and the firewall means permitting access by the network to the slave microprocessor. In addition, the system architecture explicitly includes embodiments of, for example, the computer is a personal computer; the personal computer is a microchip; the computer have a control means by which to permit and to deny access to the computer by the network for shared computer processing; the system is scalar in that the system imposes no limit to the number of personal computers, including at least 256 said personal computers; the network is connected to the Internet and its equivalents and successors, so that the personal computers include at least a million personal computers; the system is scalar in that the system imposes no limit to the number of personal computers participating in a single shared computer processing operation, including at least 256 said personal computers; the personal computers having at least one microprocessor and communicating with the network through a connection means having a speed of data transmission that is at least greater than a peak data processing speed of the microprocessor.

In summary, regarding the use of controllers with firewalls, FIGS. 10J-10M show embodiments of a system architecture for computers, including personal computers, to function within a network of computers, comprising: a computer with at least a controller and a microprocessor and having a connection means with a network of computers; the architecture for the computers including a firewall means for personal computers to limit access by the network to only a portion of the hardware, software, firmware, and other components of the personal computers; the firewall means will not permit access by the network to at least a one controller having a means to initiate and control the execution of a computer processing operation shared with at least one microprocessor having a means to function as a slave microprocessor; and the firewall means permitting access by the network to the slave microprocessor. In addition, the system architecture explicitly includes embodiments of, for example, the computer is a personal computer; the personal computer is a microchip; the computer have a control means by which to permit and to deny access to the computer by the network for shared computer processing; the system is scalar in that the system imposes no limit to the number of personal computers, including at least 256 said personal computers; the network is connected to the Internet and its equivalents and successors, so that the personal computers include at least a million personal computers; the system is scalar in that the system imposes no limit to the number of personal computers participating in a single shared computer processing operation, including at least 256 said personal computers; the personal computers having at least one microprocessor and communicating with the network through a connection means having a speed of data transmission that is at least greater than a peak data processing speed of the microprocessor; and the controller being capable of remote use.

In summary, regarding the use of firewalls that can be actively configured, FIGS. 10N-10Q show embodiments of a system architecture for computers, including personal computers, to function within a network of computers, comprising: a computer with at least two microprocessors and having a connection means with a network of computers; the architecture for the computers including a firewall means for personal computers to limit access by the network to only a portion of the hardware, software, firmware, and other components of the personal computers; the firewall means will not permit access by the network to at least a one microprocessor having a means to function as a master microprocessor to initiate and control the execution of a computer processing operation shared with at least one other microprocessor having a means to function as a slave microprocessor; the firewall means permitting access by the network to the slave microprocessor; the configuration of the firewall being capable of change by a user or authorized local network administrator; the change in firewall configuration of a microchip PC is made at least in part using field-programmable gate arrays or equivalents or successors. In addition, the system architecture explicitly includes embodiments of, for example, the computer is a personal computer; the personal computer is a microchip; the computer have a control means by which to permit and to deny access to the computer by the network for shared computer processing; the system is scalar in that the system imposes no limit to the number of personal computers, including at least 256 said personal computers; the network is connected to the Internet and its equivalents and successors, so that the personal computers include at least a million personal computers; the system is scalar in that the system imposes no limit to the number of personal computers participating in a single shared computer processing operation, including at least 256 said personal computers; the personal computers having at least one microprocessor and communicating with the network through a connection means having a speed of data transmission that is at least greater than a peak data processing speed of the microprocessor.

It is presently contemplated that PC 1 microprocessors noted above be designed to the same basic consensus industry standard as parallel microprocessors for PC's (or equivalents or successors) as in FIGS. 10A-10B or for PC "systems on a chip" discussed in FIGS. 10C-10D. Although the cost per microprocessor might rise somewhat initially, the net cost of computing for all users would fall drastically almost instantly due to the significant general performance increase created by the new capability to use of heretofore idle "appliance" microprocessors. The high potential for very substantial benefit to all users should provide a powerful force to reach consensus on important industry hardware, software, and other standards on a continuing basis for such basic parallel network processing designs utilizing the Internet 3 and successor. It is presently contemplated that such basic industry standards be adopted at the outset and for use of only the least number of shared microprocessors initially. As design improvements incorporating greater complexity and more shared microprocessors are phased in gradually overtime on a step by step basis, then conversion to a MetaInternet architecture at all component levels should be relatively easy and inexpensive (whereas an attempt at sudden, massive conversion would be hugely difficult and prohibitively expensive). The scalability of the MetaInternet system architecture (both vertically and horizontally) as described herein makes this sensible incremental approach possible.

By 1998, manufacturing technology improvements will allow as many as 20 million transistors to fit on a single chip (with circuits as thin as 0.25 microns) and, in the next cycle, 50 million transistors using 0.18 micron circuits. Preferably, that entire computer on a chip would be linked, preferably directly, by fiber optic or other broad bandwidth connection means to the network so that the limiting factor on data throughput in the network system, or any part, is only the speed of the linked microprocessors themselves, not the transmission speed of the linkage. Such direct fiber optic linkage will obviate the need for an increasingly unweldy number of microchip connectiion prongs, which is currently in the one to two hundred range in the Intel Pentium series and will reach over a thousand prongs in the 1998 IBM Power3 microprocessor. One or more digital signal processors 89 located on a microprocessor, together with numerous channels and/or signal multiplexing of the fiber optic signal can substitute for a vast multitude of microchip connection prongs.

For computers that are not reduced to a single chip, it is also preferred that the internal system bus or buses of any such PC's have a transmission speed that is at least high enough that the all processing operations of the PC microprocessor or microprocessors is unrestricted (and other PC components like RAM) and that the microprocessor chip or chips are directly linked by fiber optic or other broad bandwidth connection, as with the system chip described above, so that the limiting factor on data throughput in the network system, or any part, is only the speed of the linked microprocessors themselves, not the transmission speed of the linkage.

The individual user PC's can be connected to the Internet (via an Intranet)/Internet II/WWW or successor, like the MetaInternet (or other) network by any electromagnetic means, with the speed of fiber optic cable being preferred, but hybrid systems using fiber optic cable for trunk lines and coaxial cable to individual users may be more cost effective initially, but much less preferred unless cable can be made (through hardware and/or software and/or firmware and/or other component means) to provide sufficiently broad bandwidth connections to provide unrestricted throughput by connected microprocessors. Given the speed and bandwidth of transmission of fiber optic or equivalent connections, conventional network architecture and structures should be acceptable for good system performance, making possible a virtual complete interconnection network between users.

However, the best speed for any parallel processing operation should be obtained, all other things being equal, by utilizing the available microprocessors that are physically the closest together. Consequently, as shown previously in FIG. 8, the network needs have the means (through hardware and/or software and/or firmware and/or other component) to provide on a continually ongoing basis the capability for each PC to know the addresses of the nearest available PC's, perhaps sequentially, from closest to farthest, for the area or cell immediately proximate to that PC and then those cells of adjacent areas.

Figure 11:
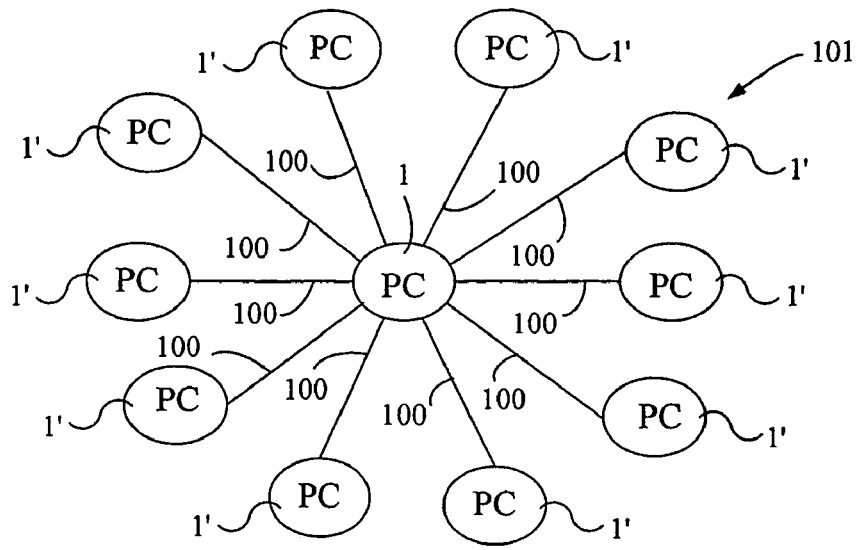
FIG. 11 is a simplified diagram of a section of a computer network, such as the Internet, showing an embodiment of a system architecture for connecting clusters of PC's to each other by wireless means, to create the closest possible (and therefore fastest) connections.

Network architecture that clusters PC's together should therefore be preferred and can be constructed by wired means. However, as shown in FIG. 11, it would probably be very beneficial to construct local network clusters 101 (or cells) of personal computers 1' by wireless 100 means, since physical proximity of any PC 1 to its closest other PC 1' should be easier to access directly that way, as discussed further below. Besides, it is economically preferable for at least several network providers to serve any given geographic area to provide competitive service and prices.

It would be advantagous, then, for those wireless PC connections to be PC resident and capable of communicating by wireless or wired (or mixed) means with all available PC's in the cluster or cell geographic area, both proximal and potentially out to the practical limits of the wireless transmission.

Figure 12:
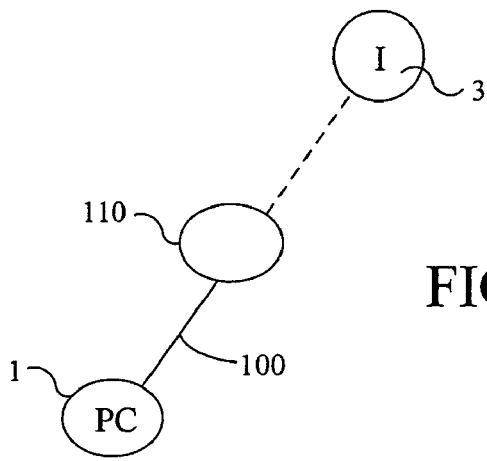
FIG. 12 is a simplified diagram of a section of a computer network, such as the Internet, showing an embodiment of a system architecture for connecting PC's to a satellite by wireless means.

As shown in FIG. 12, wireless PC connections 100 can be made to existing non-PC network components, such as one or more satellites 110, or present or future equivalent or successor components and the wireless transmissions can be conventional radio waves, such as infrared or microwave, or can utilize any other part of the electromagnetic wave spectrum.

Figure 13:
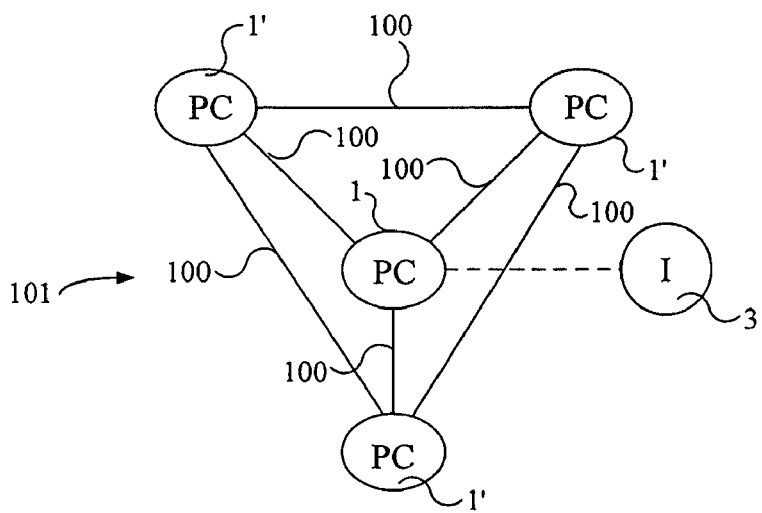
FIG. 13 is a simplified diagram of a section of a computer network, such as the Internet, showing an embodiment of a system architecture providing a cluster of networked PC's with complete interconnectivity by wireless means.

Moreover, as shown in FIG. 13, such a wireless or wired (or mixed) approach would also make it easily possible in the future to develop network clusters 101 of available PC's 1' with complete interconnectivity; i.e., each available PC 1 in the cluster 101 is directly connected (shown wirelessly 100) to every other available PC 1 in the cluster 101, constantly adjusting to individual PC's becoming available or unavailable. Given the speed of some wired broad bandwidth connections, like fiber optic cable, such clusters 101 with complete interconnectivity is certainly a possible embodiment.

Figure 14A:
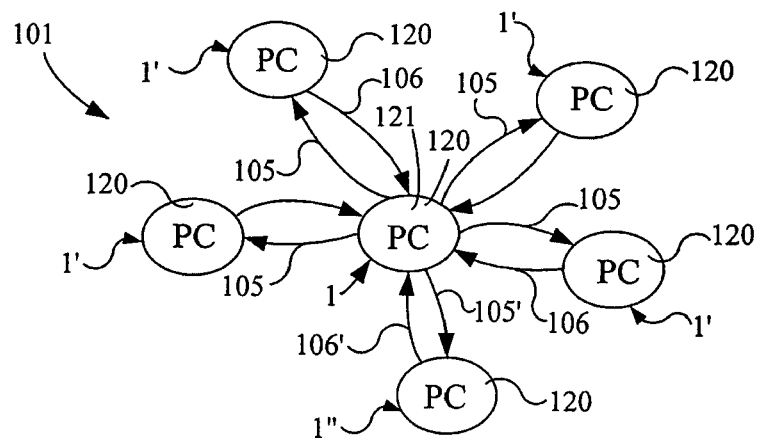
FIG. 14A is a simplified diagram of a section of a computer network, such as the Internet, showing an embodiment of a transponder means whereby a PC can identify one or more of the closest available PC's in a network cluster to designate for shared processing by wireless means.
Figure 14B:
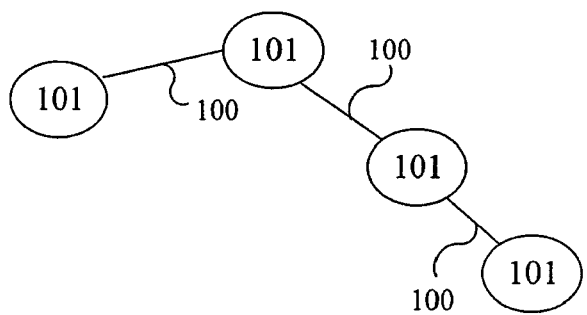
FIG. 14B shows clusters connected wirelessly.

As shown in FIG. 14A-14D, it would be advantagous for such wireless systems to include a wireless device 120 comprised of hardware and/or software and/or firmware and/or other component, like the PC 1 availability device described above preferably resident in the PC, but also with a network-like capability of measuring the distance from each PC 1 in its cluster 101 by that PC's signal transmission by transponder or its functional equivalent and/or other means to the nearest other PC's 1' in the cluster 101. As shown in FIG. 14A, this distance measurement could be accomplished in a conventional manner between transponder devices 120 connected to each PC in the cluster 101; for example, by measuring in effect the time delay from wireless transmission by the transponder device 120 of an interrogating signal 105 to request initiation of shared processing by a master PC 1 to the reception of a wireless transmission response 106 signaling availability to function as a slave PC from each of the idle PC's 1' in the cluster 101 that has received the interrogation signal 105. The first response signal 106' received by the master PC 1 would be from the closest available slave PC 1" (assuming the simplest shared processing case of one slave PC and one master PC), which would be selected for the shared processing operation by the requesting master PC 1, since the closer the shared microprocessor, the faster the speed of the wireless connections 100 would be between sharing PC's (assuming equivalence of the connection means and other components among each of the PC's 1'). The interrogation signal 105 might specify other selection criteria also, for example, for the closest compatible (initially perhaps defined by a functional requirement of the system to be an identical microprocessor) slave PC 1", with the first response signal 106' being selected as above.

This same transponder approach also can be used between PC's 1" connected by a wired 99 (or mixed wired/wireless) means, despite the fact that connection distances would generally be greater (since not line of sight, as is wireless), as shown in FIG. 14A, since the speed of transmission by the preferred broad bandwidth transmission means such as fiber optic cable is so high as to offset that greater distance. From a cost basis, this wired approach might be preferable for such PC's already connected by broad bandwidth transmission means, since additional wireless components like hardware and software would not be necessary. In that case, a functionally equivalent transponder device 120 would preferably be operated in wired clusters 101 in generally the same manner as described above for PC's connected in wireless clusters 101. Networks incorporating PC's 1 connected by both wireless and wired (or mixed) means are anticipated, like the home or business network mentioned in FIG. 10I, with mobile PC's or other computing devices preferably using wireless connections. Depending on distances between PC's and other factors, a local cluster 101 of a network 2 might connect wirelessly between PC's and with the network 2 through transponding means linked to wired broad bandwidth transmission means, as shown in FIG. 14C.

Figure 14D:
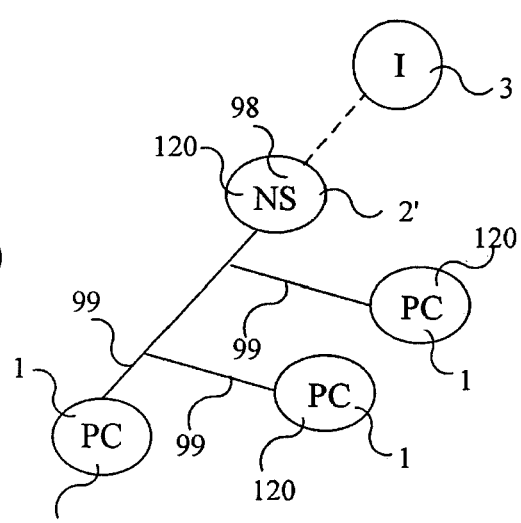
FIG. 14D shows a network client/server wired system with transponders.
Figure 14C:
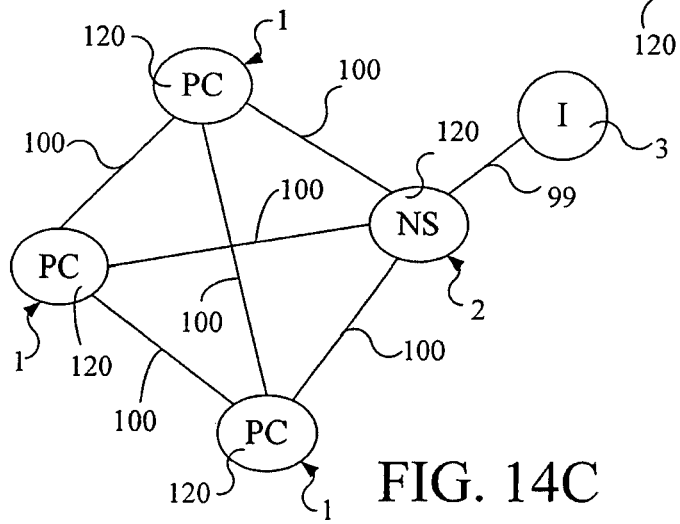
FIG. 14C shows a wireless cluster with transponders and with a network wired connection to Internet.

As shown in FIG. 14D, the same general transponder device means 120 can also be used in a wired 99 network system 2 employing network servers 98 operated, for example, by an ISP, or in any other network system architectures (including client/server or peer to peer) or any other topologies (including ring, bus, and star) either well known now in the art or their future equivalents or successors.

The FIG. 14 approach to establishing local PC clusters 101 for parallel or other shared processing has major advantage in that it avoids using network computers such as servers (and, if wireless, other network components including even connection means), so that the entire local system of PC's within a cluster 101 would operate independently of network servers, routers, etc. Moreover, particularly if connected by wireless means, the size of the cluster 101 could be quite large, being limited generally by PC wireless transmission power, PC wireless reception sensitivity, and local and/or other conditions affecting transmission and reception. Additionally, one cluster 101 could communicate by wireless 100 means with an adjacent or other clusters 101, as shown in FIG. 14B, which could thereby include those beyond its own direct transmission range.

To improve response speed in shared processing involving a significant number of slave PC's 1, a virtual potential parallel processing network for PC's 1 in a cluster 101 would preferably be established before a processing request begins. This would be accomplished by the transponder device 120 in each idle PC 1, a potential slave, broadcasting by transponder 120 its available state when it becomes idle and/or periodically afterwards, so that each potential master PC 1 in the local cluster 101 would be able to maintain relatively constantly its own directory 121 of the idle PC's 1 closest to it that are available to function as slaves. The directory 121 would contain, for example, a list of about the standard use number of slave PC's 1 for the master PC (which initially would probably be just one other PC 1") or a higher number, preferably listed sequentially from the closest available PC to the farthest. The directory of available slave PC's 1 would be preferably updated on a relatively up to date basis, either when a change occurs in the idle state of a potential slave PC in the directory 121 or periodically.

Such ad hoc clusters 101 should be more effective by being less arbitrary geographically, since each individual PC would be effectively in the center of its own ad hoc cluster. Scaling up or down the number of microprocessors required by each PC at any given time would also be more seamless.

The complete interconnection potentially provided by such highly effective ad hoc wireless clusters is also remarkable because such clusters mimics the neural network structure of the human brain, wherein each nerve cell, called a neuron, interconnects in a very complicated way with the neurons around it. By way of comparison, the global network computer described above that is expected in a decade will have at least about 10 times as many PC 's as a human brain has neurons and they will be connected by electromagnetic waves traveling at close to the speed of light, which is about 300,000 times faster than the transmission speed of human neurons (which, however, will be much closer together).

An added note: in the next decade, as individual PC's become much more sophisticated and more network oriented, compatibility issues may recede to unimportance, as all major types of PC's will be able to emulate each other and most software, particularly relative to parallel processing, will no longer be hardware specific. Nearer term it will be important to set compatible hardware, software, firmware, and other component standards to achieve substantial performance advantages for the components of the global network computer.

Until that compatibility is designed into the essential components of network system, the existing incompatibility of current components dramatically increase the difficulty involved in parallel processing across large networks. Programming languages like Java is one approach that will provide a partial means for dealing with this interim problem. In addition, using similar configurations of existing standards, like using PC's with a specific Intel Pentium chip with other identical or nearly identical components is probably the best way in the current technology to eliminate many of the serious existing problems that could easily be designed around in the future by adopting reasonable consensus standards for specification of all system components. The potential gains to all parties with an interest far outweigh the potential costs.

The above described global network computer system has an added benefit of reducing the serious and growing problem of the nearly immediate obsolescence of computer hardware, software, firmware, and other components. Since the preferred system above is the sum of its constituent parts used in parallel processing, each specific PC component becomes less critical. As long as access to the network utilizing sufficient bandwidth is possible, then all other technical inadequacies of the user's own PC will be completely compensated for by the network's access to a multitude of technically able PC's of which the user will have temporary use.

Although the global network computer will clearly cross the geographical boundaries of nations, its operation should not be unduly bounded by inconsistent or arbitrary laws within those states. There will be considerable pressure on all nations to conform to reasonable system architecture and operational standards generally agreed upon, since the penalty of not participating in the global network computer is potentially so high as to not be politically possible anywhere.

Figure 15:
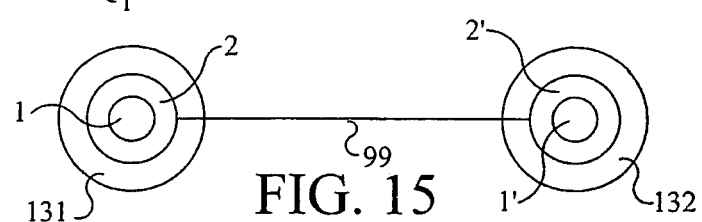
FIG. 15 is a simplified diagram of a section of a computer network, such as the Internet, showing an embodiment of a routing means whereby a PC request for shared processing can be routed within a network using preferably broad bandwidth connection means to another area in a network with one or more idle PC's available.

As shown in FIG. 15, because the largest number of user PC's will be completely idle, or nearly so, during the night, it would be highly effective for the most complicated large scale parallel processing, involving the largest numbers of processors with uninterrupted availability as close together as possible, to be routed by the network to geographic areas of the globe undergoing night and to keep them there even as the Earth rotates by shifting computing resources as the world turns. As shown in the simplest case in FIG. 15, during the day, at least one parallel processing request by at least one PC 1 in a network 2 in the Earth's western hemisphere 131 are transmitted by very broad bandwidth connection wired 99 means such as fiber optic cable to the Earth's eastern hemisphere 132 for execution by at least one PC 1' of a network 2', which is idle during the night and the results are transmitted back by the same means to network 2 and the requesting at least one PC 1. Any number of individual PC's within local networks like that operated by an ISP could be grouped into clusters or cells, as is typical in the practice of network industries. As is common in operating electrical power grids and telecommunications and computer networks, many such processing requests from many PC's and many networks could be so routed for remote processing, with the complexity of the system growing substantially over time in a natural progression.

Figure 16A:
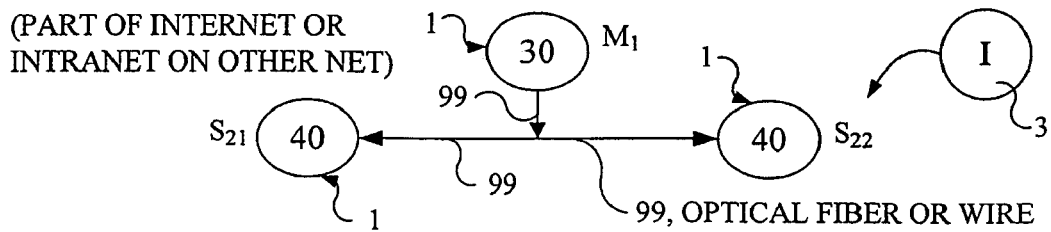
FIGS. 16A-16Z and 16AA show a new hierarchical network architecture for personal computers and/or microprocessors based on subdivision of parallel processing or multi-tasking operations through a number of levels down to a processing level.
Figure 16B:
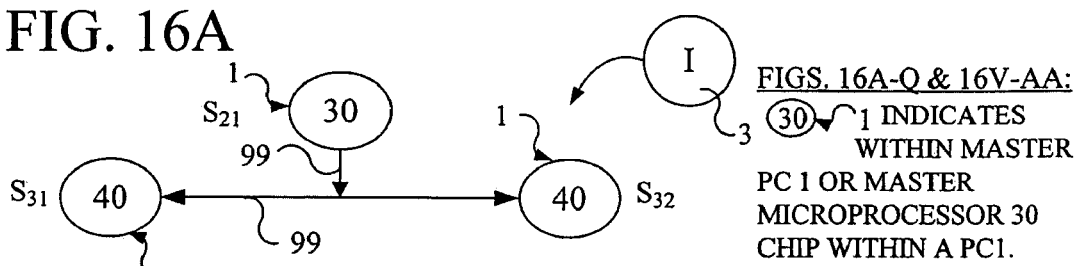
Figure 16C:
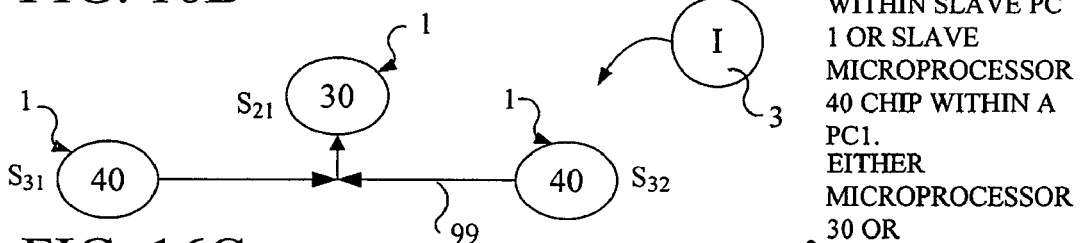
Figure 16D:
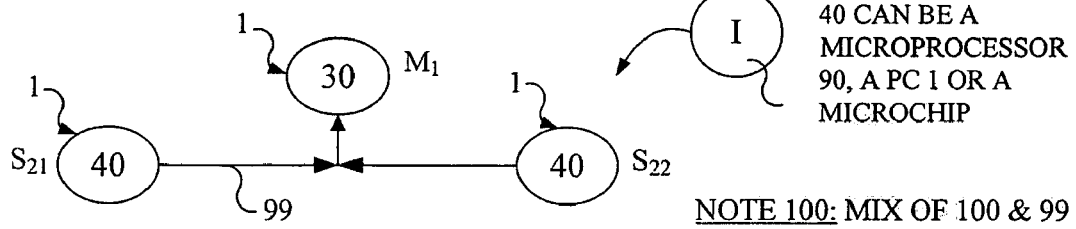
Figure 16E:
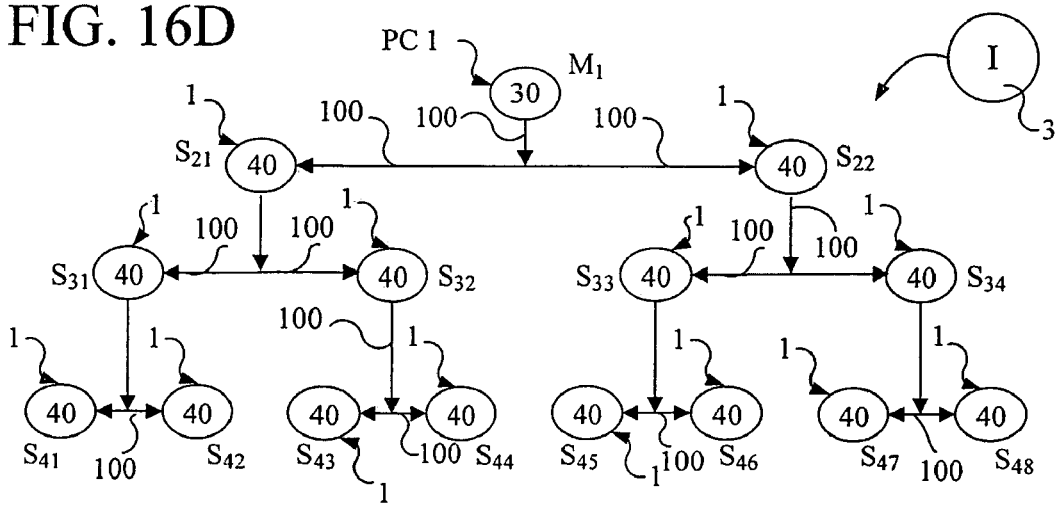
Figure 16F:
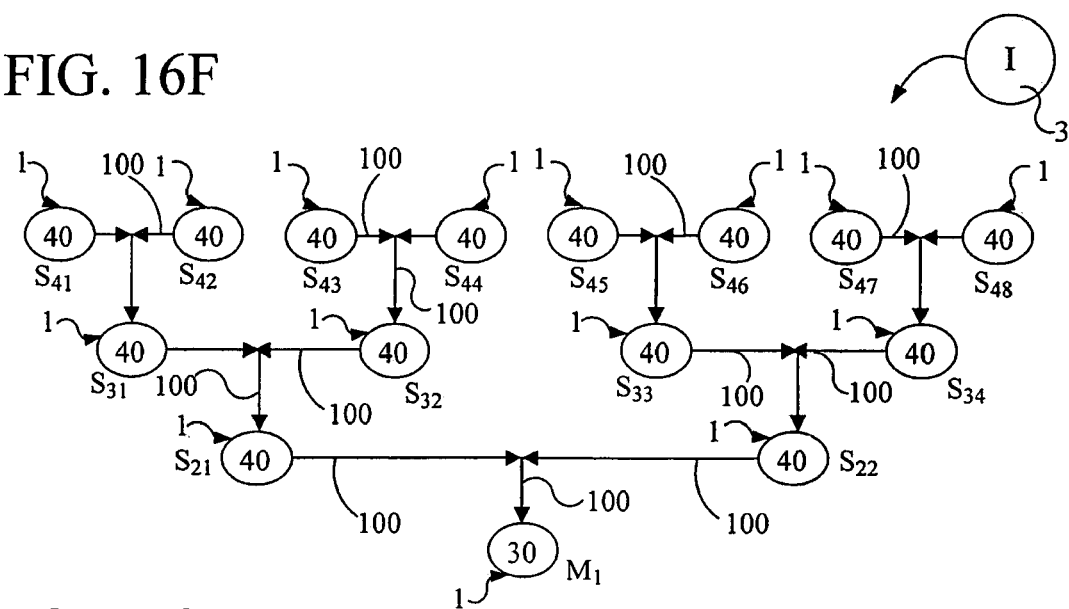
Figure 16G:
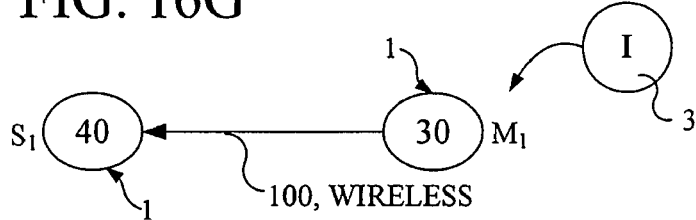
Figure 16H:
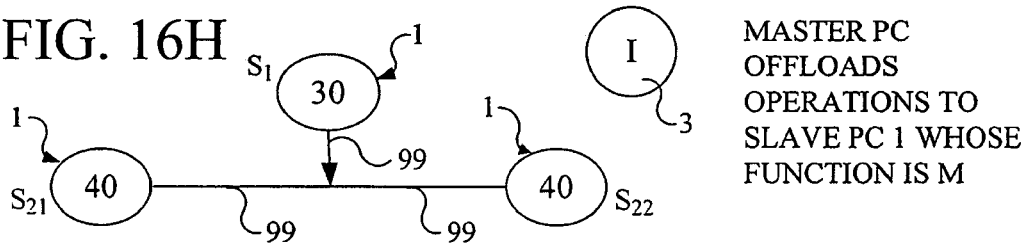
Figure 16I:
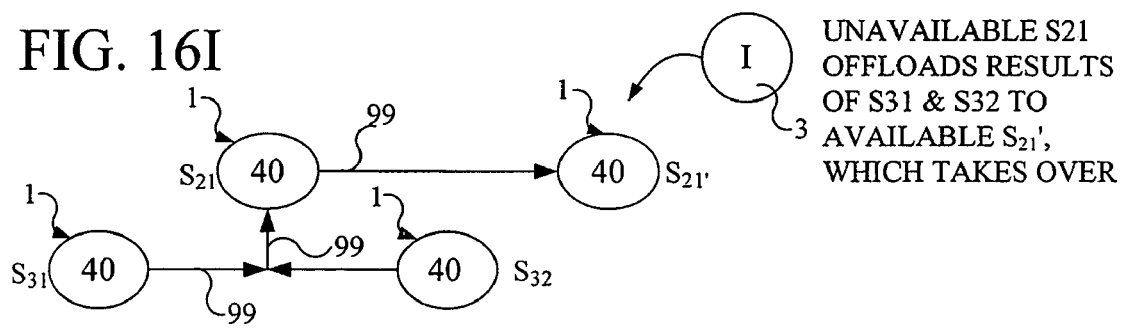
Figure 16J:
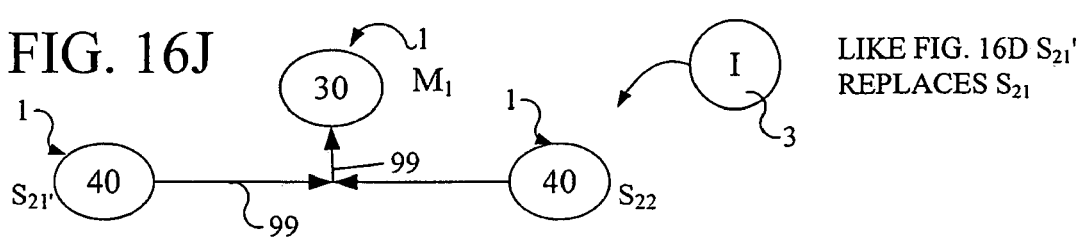
Figure 16K:
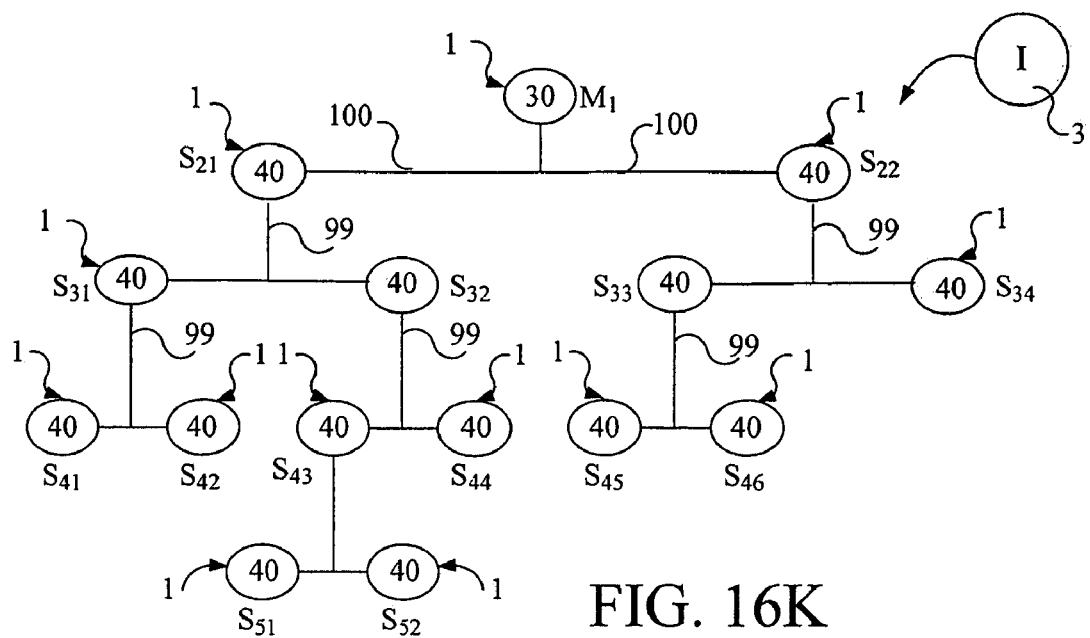
Figure 16L:
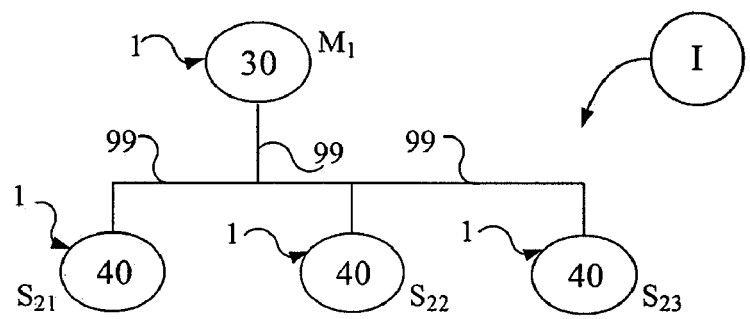
Figure 16M:
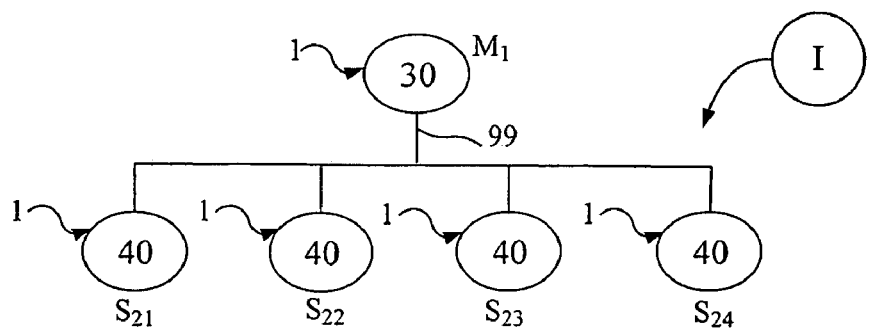
Figure 16N:
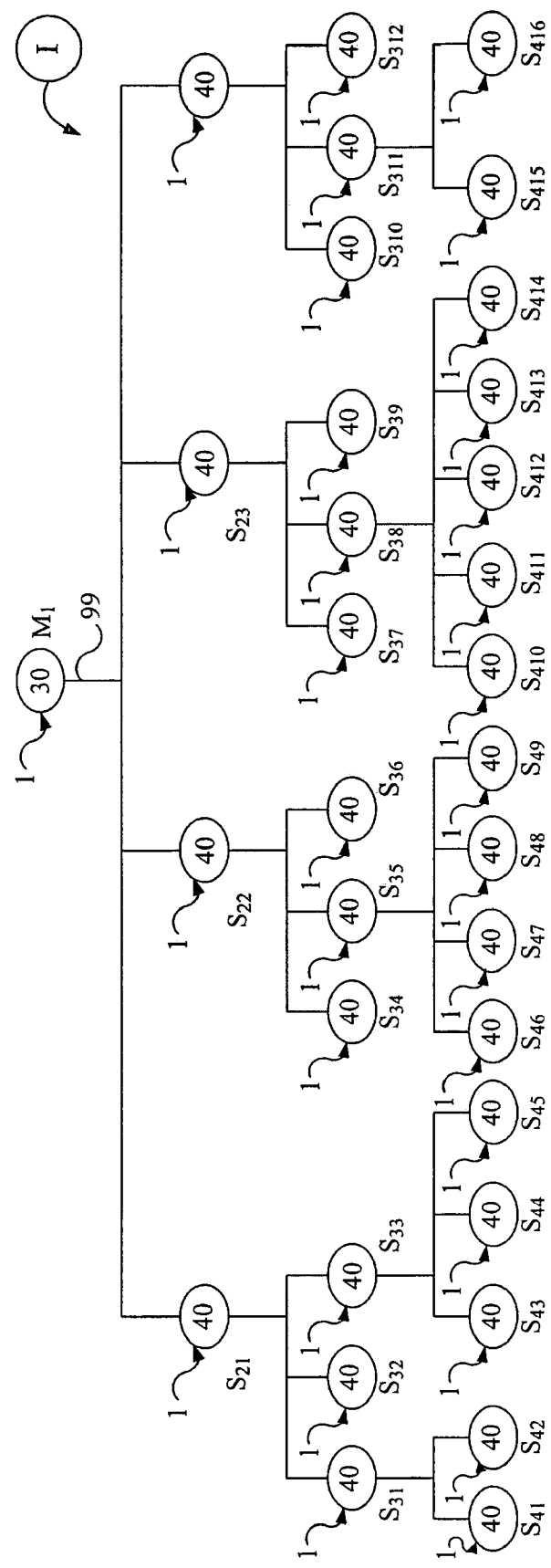
Figure 16O:
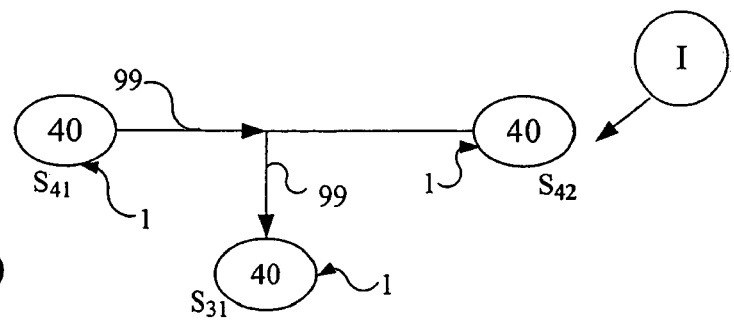
Figure 16P:
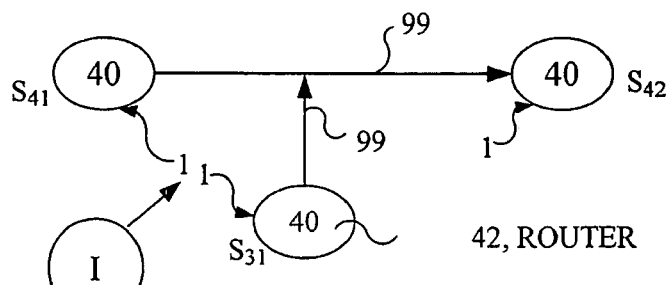
Figure 16Q:
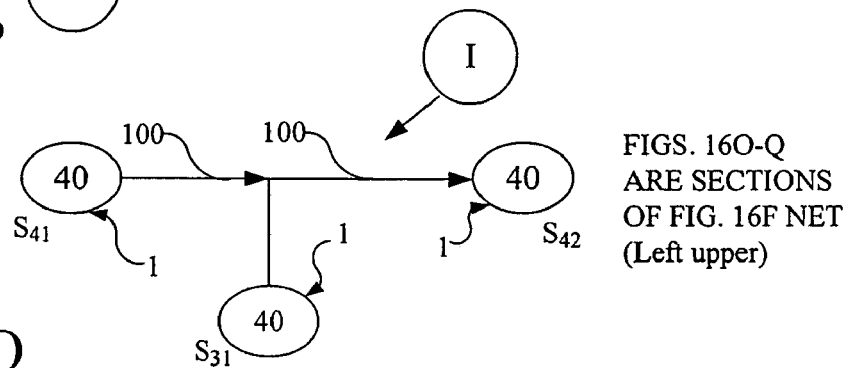
Figure 16R:
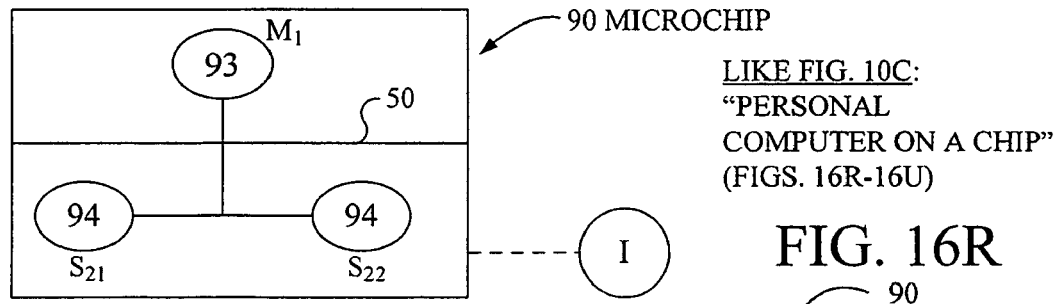
Figure 16S:
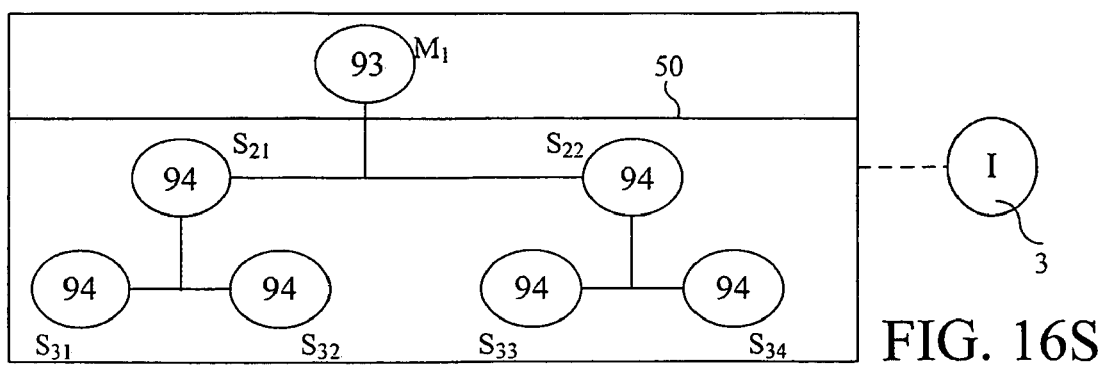
Figure 16T:
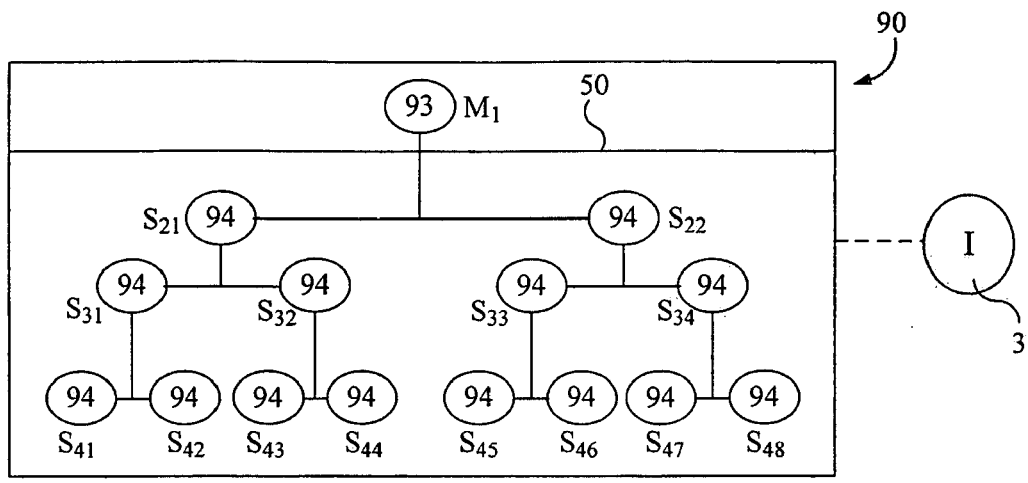
Figure 16U:
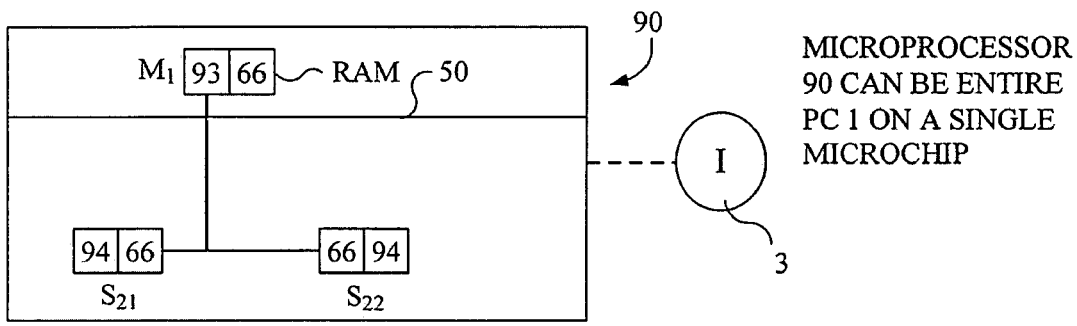
Figure 16V:
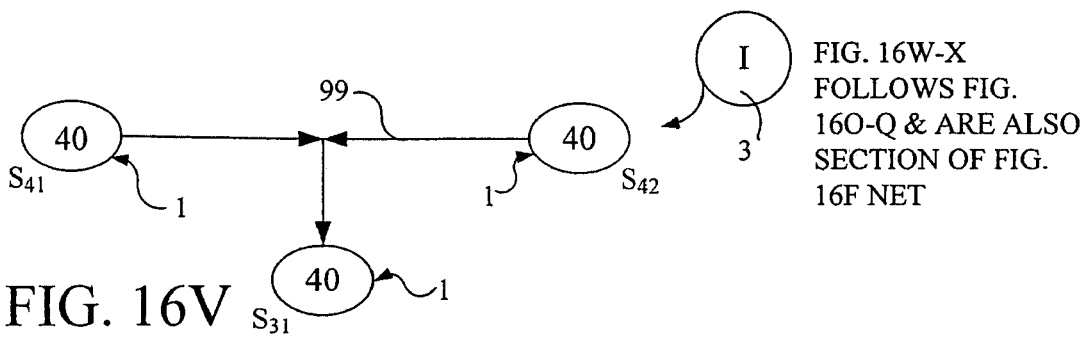
Figure 16W:
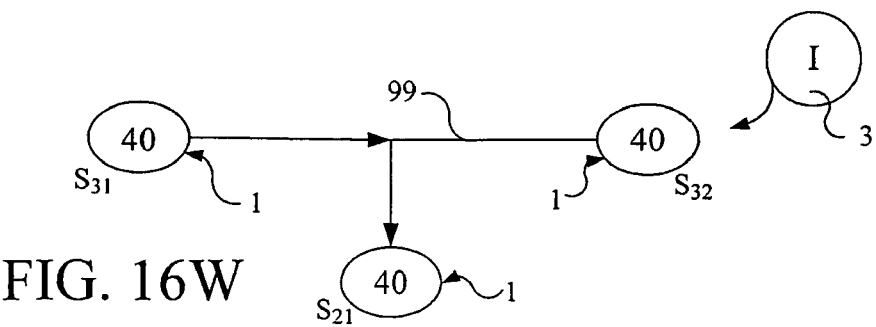
Figure 16X:
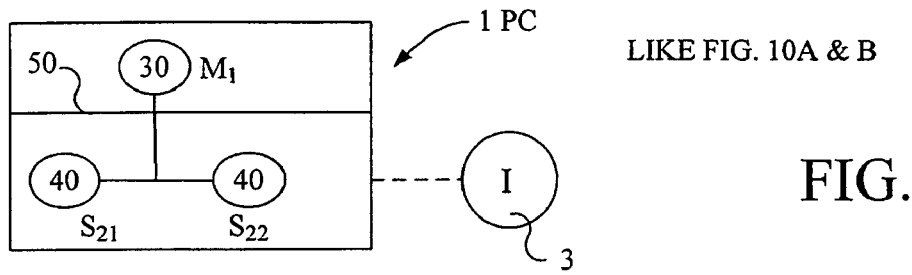
Figure 16Y:
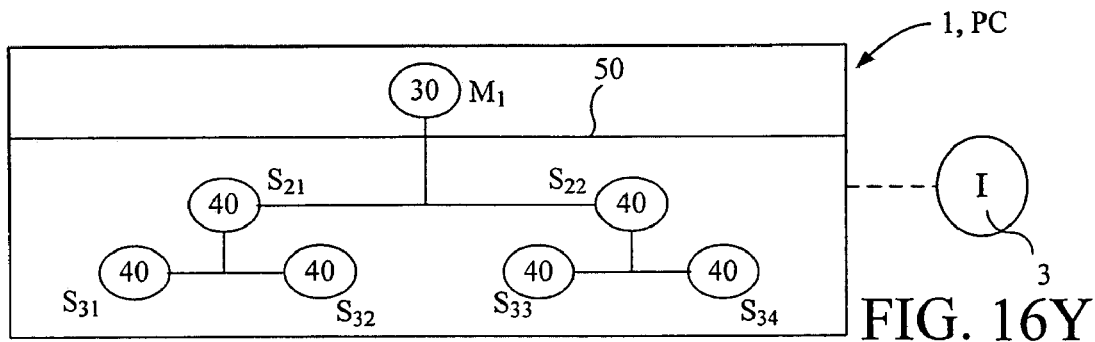
Figure 16Z:
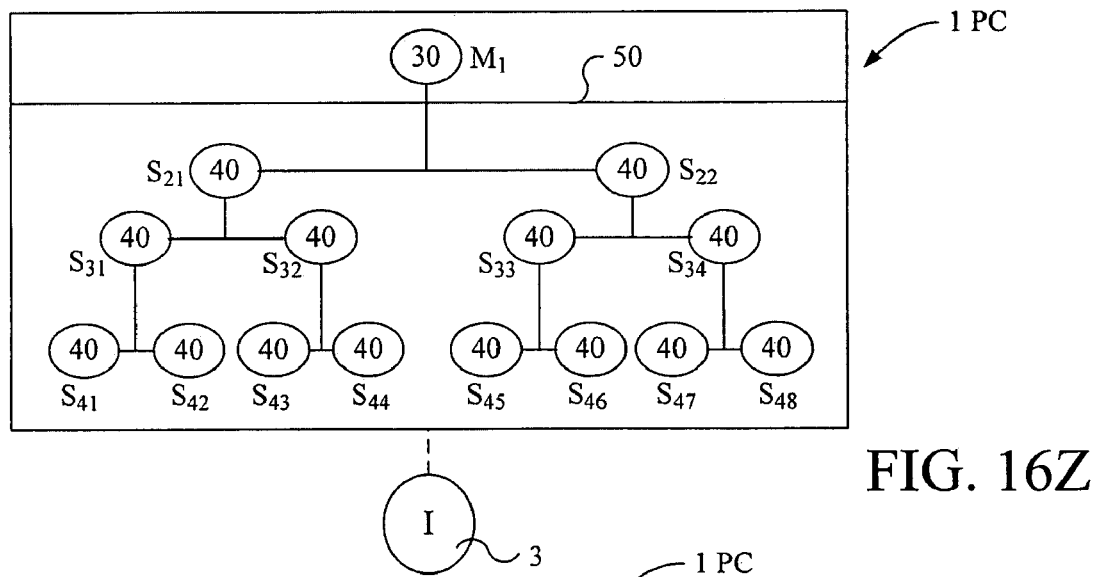
Figure 16A:
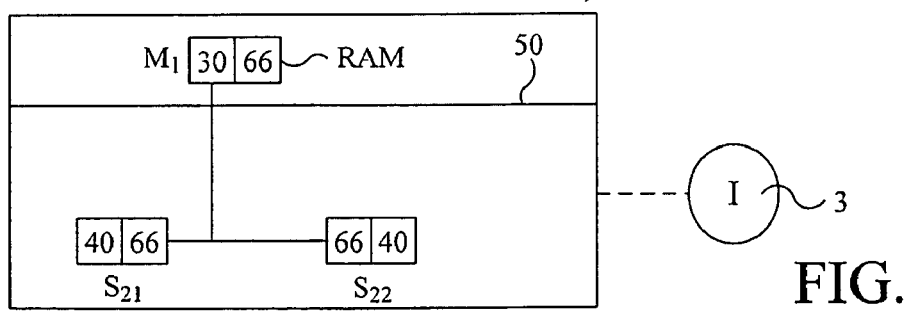

While the conventional approach to configuring a network of personal computers PC 1 for parallel processing is simply to string them together serially, as shown previously in FIG. 9, new FIGS. 16A-16Z and 16AA show a new hierarchial network topology.

Although the FIG. 9 network structure is simple and produces reasonable results in loosely coupled problems like geographic searches described earlier, as a general approach it has at least three important problems.

First, a great deal of complex pre-operation planning and custom tailoring-type programming at the master PC 1 level is require to establish a means for allocating portions of the operation among some number of available personal computers PC 1'.

Second, operations results coming back from personal computers PC 1' are not synchronized, so that PC 1 frequently alternates between being idle and being overwhelmed. When the number of personal computers PC 1' is very large, both problems can be significant.

Third, generally there is no means established for personal computers PC 1' to communicate or cooperate with each other during operations, so sharing operational results during processing between personal computers PC 1' is not feasible. Consequently, closely coupled problems are generally not amenable to solution by conventional parallel processing by computers.

The new hierarchical network topology shown in FIG. 16A is a simple subdivision step whereby a personal computer PC 1 (or microprocessor 30) acting as a master $M_1$ divides a given operation into two parts (for example, two halfs), then sending that one half part to each to two connected available slave personal computers PC 1 (or microprocessor 40), as shown one level down as $S_{21}$ and $S_{22}$.

FIG. 16B shows that slave personal computer PC 1 (or microprocessor 30) located at $S_{21}$ has temporarily adopted the same functional role as a master to repeat the same subdivision of the given operation. Therefore, the given operation already divided in half is further subdivided into quarters (for example) by $S_{21}$, which then sends one quarter to each of two additional available personal computers PC 1 (or microprocessors 40) located at $S_{31}$ and $S_{32}$.

FIG. 16C shows personal computers PC 1 (or microprocessors 40) at $S_{31}$ and $S_{32}$ sending operation results back to $S_{21}$, instead of repeating again the subdivision process. That action by $S_{31}$ and $S_{32}$ can be dictated by pre-established program criteria, such as automatically defaulting to operational processing at the $S_3$ level after two subdivision processes, so that the operation would be processed in parallel by four slave personal computers PC 1 (or microprocessors 40). Alternately, as another example, the criteria can be a user preference command over-riding an otherwise automatic default to level three processing.

Similarly, in FIG. 16A above, the personal computer PC 1 (or microprocessor 40) acting as master $M_1$ also initiates the parallel processing operation (or, alternatively, a multi-tasking operation) on the basis of a preset program parameters through software, hardware, or firmware or other means, parameter examples again being automatic default or user preference.

Like FIG. 16C, FIG. 16D shows operation results being passed back to the next higher level, this time from slave personal computers (or microprocessors 40) $S_{21}$ and $S_{22}$ to master $M_1$.

FIG. 16G shows master personal computer (or microprocessor 30) $M_1$ offloading the entire parallel processing operation to an available slave personal computer (or microprocessor 40) PC 1 that temporarily functions as $S_1$ in the place of $M_1$ on the first level for the duration of the operation, the first step of which is shown in FIG. 16H.

FIG. 16I shows a personal computer (or microprocessor 40) PC 1 that is executing a command to function in the role of $S_{21}$ for a given operation but has become unavailable or was unavailable initially (due, for example, to interruption for other higher, priority use or malfunction), when results of the given operation from a lower parallel processing level are passed to $S_{21}$ $S_{21}$ simply offloads those results to another personal computer PC 1 (or microprocessor 30 or 40) that is available which becomes $S_{21}$ and takes over the role of $S_{21}$ in the given operation.

As shown in FIG. 16J, $S_{21}$ then completes the parallel processing operation by passing the operation results to $M_1$.

The offloading capability of functional roles of master and slave personal computers PC 1 (and microprocessors 30 and 40) from unavailable to available PC 1, 30 and 40 as shown in FIGS. 16G-16J can also be used in previous figures in this application.

FIG. 16E shows the multi-processing network topology in a larger scale embodiment, including all personal computers PC 1 (or microprocessors 30 or 40) that are participating in a given operation, including one at level one; two at level two;

four at level three; and eight at level four. The network topology is completely scalar in that any practical number of additional processing levels or personal computers PC 1 (or microprocessors 30 or 40) can be added to those shown (and topologies limited to just two levels are also possible).

More specifically, FIG. 16E shows the distribution of a parallel processing (or multi-tasking) operation as routed through a four level virtual network, beginning at $M_1$. "Virtual" as used here means temporary, since in the next parallel operation originating at $M_1$ it might be the case that many of the personal computers PC 1 (or microprocessors 30 or 40) that had been available for a previous operation would not still be available for the next operation.

FIG. 16F shows the processing slave personal computers PC 1 (or microprocessors 40) at the fourth level, where $S_{41}$ through $S_{48}$ process the operation to produce results which are then routed back through the virtual network to $M_1$. FIG. 16F shows an inverted view of FIG. 16E.

In the routing of operation results shown in FIG. 16F, each slave personal computer PC 1 (or microprocessor 40) has the capability to either simply pass through those results or, alternatively, to consolidate those results sent from the personal computers PC 1 (or microprocessors 40) at a lower level.

Such consolidation could eliminate duplicative data from a search or other duplicative results and also serve to buffer the originating master $M_1$ from overloading caused by many sets of results arriving in an uncoordinated fashion from what might be a large number of slave personal computers PC 1 (or microprocessors 40). Such a consolidation role for personal computers PC 1 (or microprocessors 40) would substantially reduce or eliminate the excessive custom pre-planning and synchronization problems of the conventional FIG. 9 network topology discussed above.

FIG. 16K shows examples of the extremely complicated network structures that can result from a given operation in which the complexity of data involved is not uniform. In this case, pre-set program splitting criteria can be employed that balances the processing load of each slave personal computer PC 1 (or microprocessor 40). With this approach, the difficult portions of a given operation can automatically draw greater resources in the form of additional splitting of that difficult portion of the problem, so that additional levels of parallel processing slave personal computers PC 1 (or microprocessors 40) can be brought into the virtual network to process the operation.

FIGS. 16L and 16M show examples of other possible subdivision parallel processing methods, such as routing to three slave personal computers PC 1 (or microprocessors 40) at the next level down, as shown in FIG. 16L, or routing to four slave personal computers PC 1 (or microprocessors 40), as shown in FIG. 16M. Routing to any practical number of slave personal computers PC 1 (or microprocessors 40) between levels can be done.

Such routing splits can also vary between levels or even within the same level, as shown in FIG. 16N; such variations can result from pre-set program criteria that balance operation loads, like those shown previously in FIG. 16K. The means for subdividing problems for parallel processing can also vary, within a range of methods in the computer and mathematical art.

FIG. 16O shows slave personal computer PC 1 (or microprocessor 40) $S_{41}$ sending operation results to a higher level $S_{31}$, which can then function as a router, passing through unaltered the results back down to the original level to personal computer PC 1 (or microprocessor 40) $S_{42}$, as shown in FIG. 16P. FIG. 16Q demonstrates the capability for any two pair of slave personal computers PC 1 (or microprocessors 40) like $S_{41}$ and $S_{42}$ to communicate directly between each other, such as wirelessly as shown. FIGS. 16O-16Q shown the same subsection of the network topology shown in FIG. 16F (the left uppermost portion).

A higher level personal computer PC 1 (or microprocessor 30 or 40) such as $S_{31}$ can process results as well as route them, as shown in FIG. 16V, in which $S_{31}$ receives results from $S_{41}$ and $S_{42}$ at a lower processing level and then processes that data before sending its processing results to a higher level to $S_{21}$, as shown in FIG. 16W.

Together, FIGS. 16V-16W and 16O-16Q show the capability of any personal computer PC 1 (or microprocessor 30 or 40) of the FIG. 16F (and 16E) network structural and functional invention to communicate with any other personal computer PC 1 (or microprocessor 30 or 40) participating in a given parallel processing (or multi-tasking) operation. That communication can take the form of simple pass-through of unmodified results or of modification of those results by processing at any level.

FIGS. 16X-16Z show the applicant's new hierarchical network structure and function applied to the design of a personal computer PC 1, as discussed previously in FIGS. 10A and 10B. FIG. 16X shows the simplest general design, with a master $M_1$ microprocessor 30 and two slave $S_{21}$ and $S_{22}$ microprocessors 40. FIG. 16Y shows the same network structure with an additional level of slave microprocessors 40, $S_{31}$ through $S_{34}$, while FIG. 16Z shows the same network structure as FIG. 16Y with an additional level of slave microprocessors 40, $S_{41}$ through $S_{48}$. As shown, this network structure is completely scalar, including any practical number of slave microprocessors 40 on any practical number of processing levels.

FIG. 16AA shows a useful embodiment in which each microprocessor 30 and 40 has its own random access memory. The design can also incorporate (or substitute) conventional shared memory (i.e. memory used by all, or some, of the microprocessors 30 or 40 of the PC 1).

FIGS. 16R-16T are parallel to FIGS. 16X-16Z above, but show microprocessor 90 architecture rather than PC 1 architecture. FIG. 16U is like FIG. 16AA, also except for showing microprocessor 90 architecture.

FIGS. 16R-16U show a different and improved basic chip architecture from than currently used to implement a superscalar approach in microprocessors to execute multiple instructions during each clock cycle. The FIGS. 16R-16U architecture is much simpler and, by integrating memory with microprocessor, reduces memory bottlenecks. FIGS. 16X-16Z and 16AA, by using the same architecture for PC 1 networks, import the same advantage of improved chip superscalar performance to parallel processing in PC 1 networks.

Figure 17A:
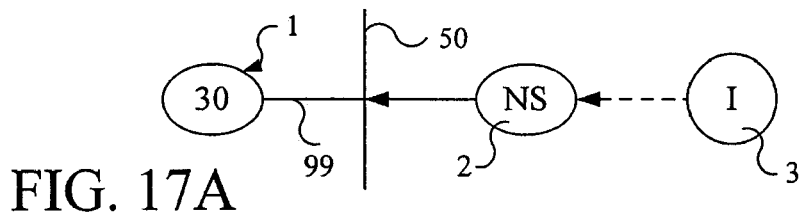
FIGS. 17A-17D show a firewall 50 with a dual function, including that of protecting Internet users (and/or other network users sharing use) of one or more slave personal computers PC 1 or microprocessors 40 from unauthorized surveillance or intervention by an owner/operator of those slave processors.
Figure 17B:
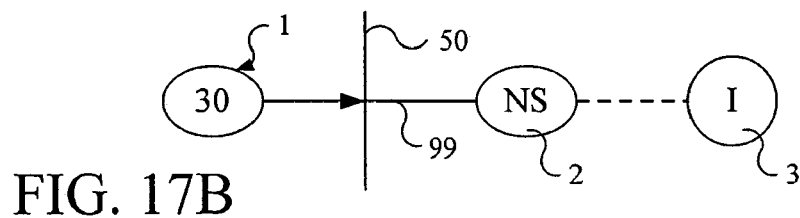

FIG. 17A shows a firewall 50 performing its conventional function of keeping out intruders such as hackers from the Internet 3. FIG. 17B shows that, since Internet users can, as enabled by the applicant's network structure invention, use one or more of the slave microprocessors 40 of another's PC 1 for parallel processing (or multi-tasking), the firewall 50 has a dual function in also protecting Internet use (or other shared use on a network) from unauthorized surveillance or intervention by a PC 1 owner/user. To maintain the privacy necessary to operate such a cooperatively shared network arrangement, unauthorized surveillance or intervention must be carefully prevented.

Figure 17C:
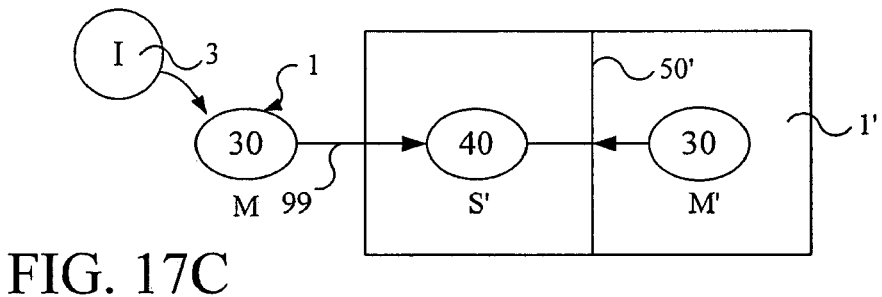

FIG. 17C therefore shows master M personal computer PC 1 using the slave microprocessor 40 of a different personal computer, PC 1', which is available for Internet (or other net) shared use, while firewall 50' blocks unauthorized access by PC 1 (although PC 1' owner/user can always interrupt a shared operation and take back control and use of slave S' microprocessor 40).

Figure 17D:
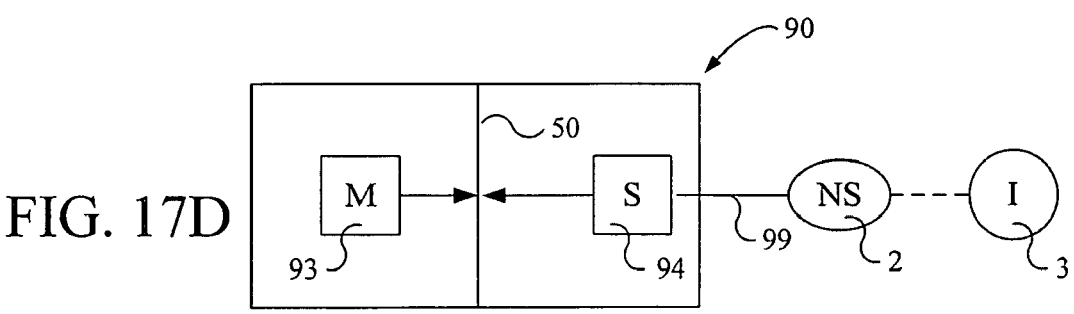

FIG. 17D shows a figure similar to FIG. 17C, but showing a microprocessor 90 with a slave microprocessor 94 being used by Internet users (or other net), so that firewall 50 serves both to deny access by master M microprocessor 93 to an Internet parallel processing (or multi-tasking) operation on slave S microprocessor 94 and to deny access to master M microprocessor 93 by Internet (or other net) users of slave S microprocessor 94.

Figure 18A:
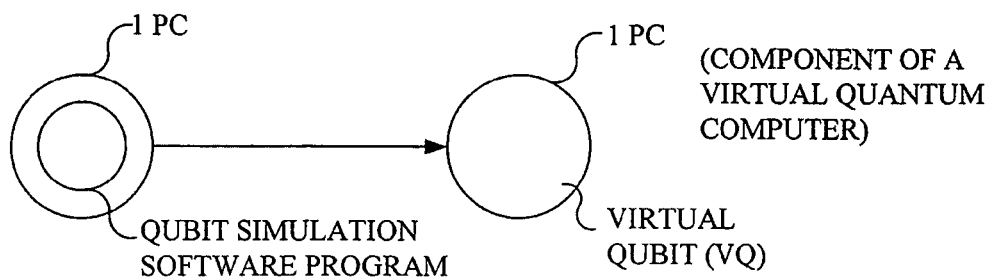
FIGS. 18A-18D show designs for one or more virtual quantum computers integrated into one or more digital computers.
Figure 18B:
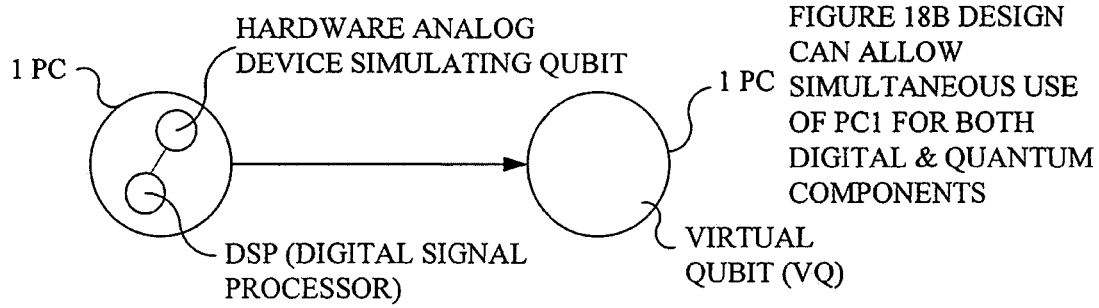

FIGS. 18A-18D show designs for a virtual quantum computer or computers. FIG. 18A shows personal computer PC 1 with a software program simulating a "qubit" for a quantum computer or computers. FIG. 18B shows a personal computer PC 1 with a digital signal processor (DSP) connected to a hardware analog device simulating a qubit, with the PC 1 monitoring the qubit through the DSP; this arrangement would allow the option of simultaneous use of the PC 1 through multi-tasking for both digital and quantum computing.

Figure 18C:
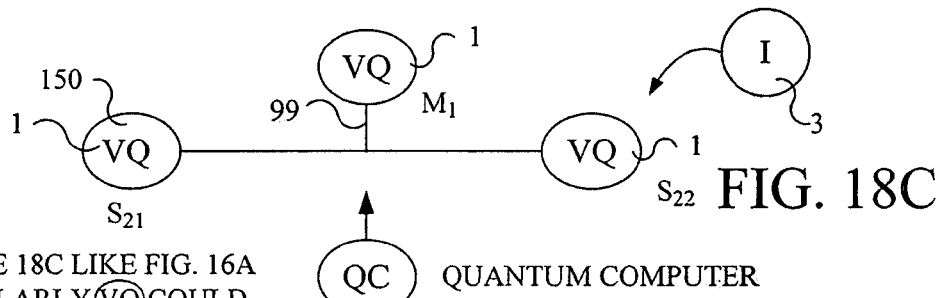

FIG. 18C is like FIG. 16A, but incorporating a virtual qubit in PC 1, so that a virtual quantum computer can have any network architecture like those shown in FIGS. 16A-16Z and 16AA, as well as other figures of this application.

Figure 18D:
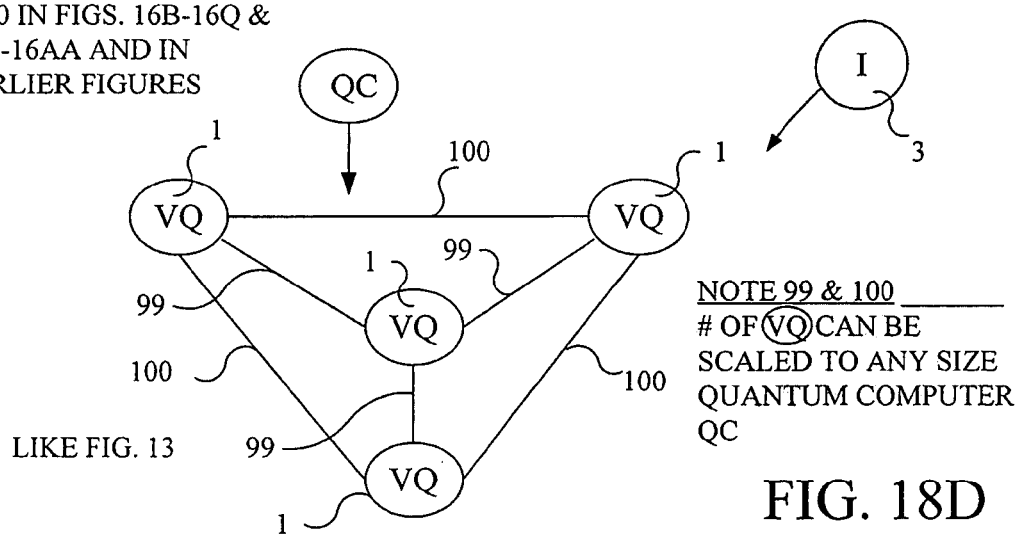
Figure 19:
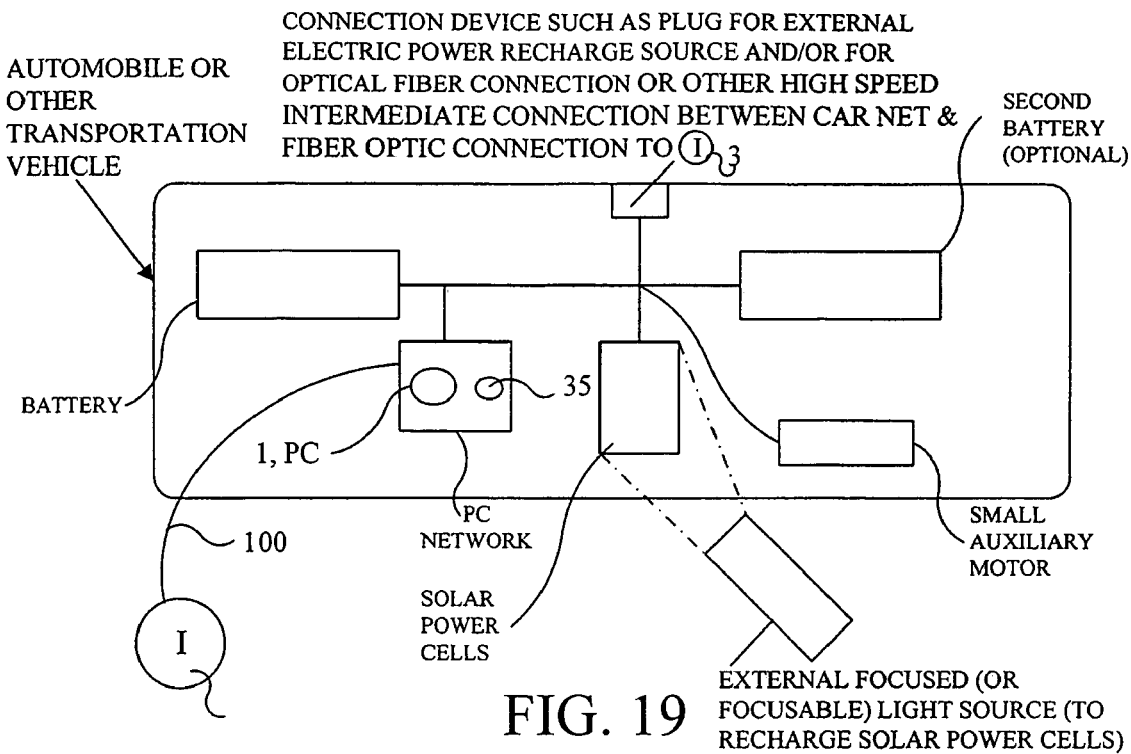
FIG. 19 shows special adaptations to allow the use of idle automobile computers to be powered and connected to the Internet (or other net) for parallel or multi-tasking processing.

As shown in FIG. 18D, for example, a virtual qubits (VC) network can provide complete interconnectivity, like FIG. 13. Virtual qubits VC like those described in FIGS. 18A & 18B can be added to or substituted for microprocessors 30 and 40 in prior figures of this application. As shown in those prior applications, the number of qubits is limited only to whatever is practical at any given time; in terms of development that means as few as a single qubit in one or more networked personal computers PC 1 to begin, but the number of qubits can become potentially extremely large, as indicated in previous figures.

Like personal computers located in the home or office, personal computers PC 1 in automobiles (including other transportation vehicles or other conveyances) are in actual use only a very small percentage of the time, with the average dormant period of non-use totaling as much as 90 percent or more. Personal computers PC 1 are now being added to some automobiles and will likely soon become standard equipment. In addition, automobiles already have a very large number of computers onboard in the form of specialized microprocessors which are likely to become general parallel processors in future designs, as discussed earlier in this application.

Automobiles therefore form a potentially large and otherwise unused resource for massive parallel processing through the Internet 3 and other networks, as described in earlier figures. However, when idle and thus generally available for network use, automobiles lack their usual power source, the engine, which of course is then off, since it is too large to efficiently provide electrical power to onboard computers. The car engine has a controller (hardware, software or firmware or combination in the PC 1, for example) to automatically start in order to recharge the car battery when the battery is low (and before the battery is too low to start the engine), but the engine additionally needs to be controlled not to expend all available fuel automatically.

Two solutions, not mutually exclusive, to alleviate (but not solve) the problem are adding an additional car battery for network use (at least primarily) or using a single battery but adding a controller in the PC 1 for example that prevents the existing battery from being discharged to a level below that which is needed to start the automobile.

In addition, one or more solar power generating cells or cell arrays can be incorporated in an automobile's outer surface, with generally the most effective placement being on a portion of the upper horizontal surface, such as a portion of the roof, hood, or trunk. For charging the automobile battery when sunlight is not available, such as at night or in a garage, a focused or focusable light source can provide external power to the solar panel.

Alternately, a connection device such as a plug for an external electrical power source can be installed on or near the outer surface of the automobile. In addition, or independently, a connection device for an optical fiber (or other wired) external connection to the Internet 3 or other net. Alternately, a wireless receiver located near where the automobile is parked, such as in a garage, can provide connection from the automobile's personal computers PC 1 to a network (and the Internet 3) in a home or business. This application encompasses all new apparatus and methods required to operate the above described network computer system or systems, including any associated computer or network hardware, software, or firmware (or other component), both apparatus and methods. Specifically included, but not limited to, are (in their present or future forms, equivalents, or successors): all enabling PC and network software and firmware operating systems, user interfaces and application programs; all enabling PC and network hardware design and system architecture, including all PC and other computers, network computers such as servers, microprocessors, nodes, gateways, bridges, routers, switches, and all other components; all enabling financial and legal transactions, arrangements and entities for network providers, PC users, and/or others, including purchase and sale of any items or services on the network or any other interactions or transactions between any such buyers and sellers; and all services by third parties, including to select, procure, set up, implement, integrate, operate and perform maintenance, for any or all parts of the foregoing for PC users, network providers, and/or others.

The combinations of the many elements the applicant's invention introduced in the preceding figures are shown because those embodiments are considered to be at least among the most useful possible, but many other useful combination embodiments are not shown simply because of the impossiblity of showing them all while maintaining a reasonable brevity in an unavoidably long description caused by the inherently highly interconnected nature of the inventions shown herein, which can operate all as part of one system or independently.

The forgoing embodiments meet the objectives of this invention as stated above. However, it will be clearly understood by those skilled in the art that the foregoing description has been made in terms of the preferred embodiments and that various changes and modifications may be made without departing from the scope of the present invention, which is to be defined by the appended claims.

Figure 20A:
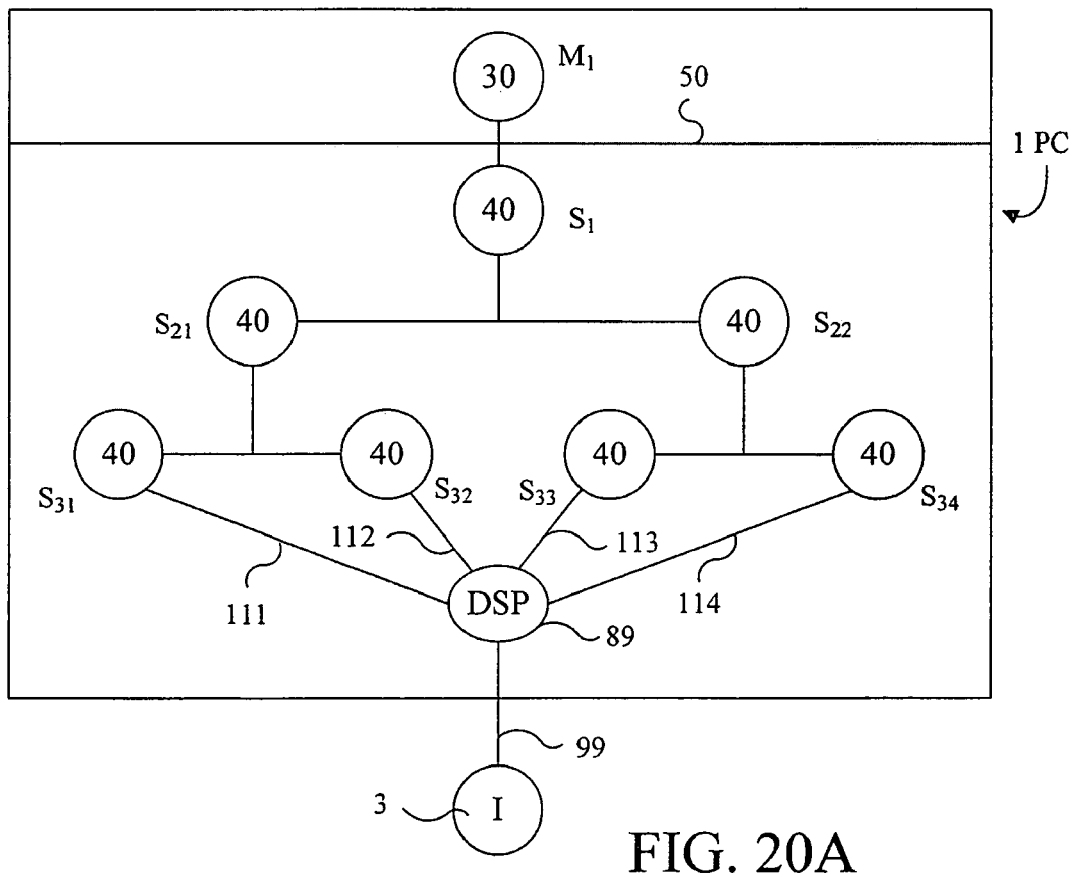

FIG. 20A is like FIG. 16Y, but also shows a slave microprocessor 40 functioning as $S_1$, the function of master having been temporarily or permanently offloaded by $M_1$ microprocessor 30. In addition, FIG. 20A shows the processing level of slave microprocessors 40, $S_{31}$ through $S_{34}$, each with a separate output link to a digital signal processor 89, the transmission linkages shown as 111, 112, 113, and 114. The DSP is connected to wired 99 link (preferably fiber optic) to the Internet (or other net), although non-fiber optic can be used (and probably would not require a DSP 89).

Figure 20B:
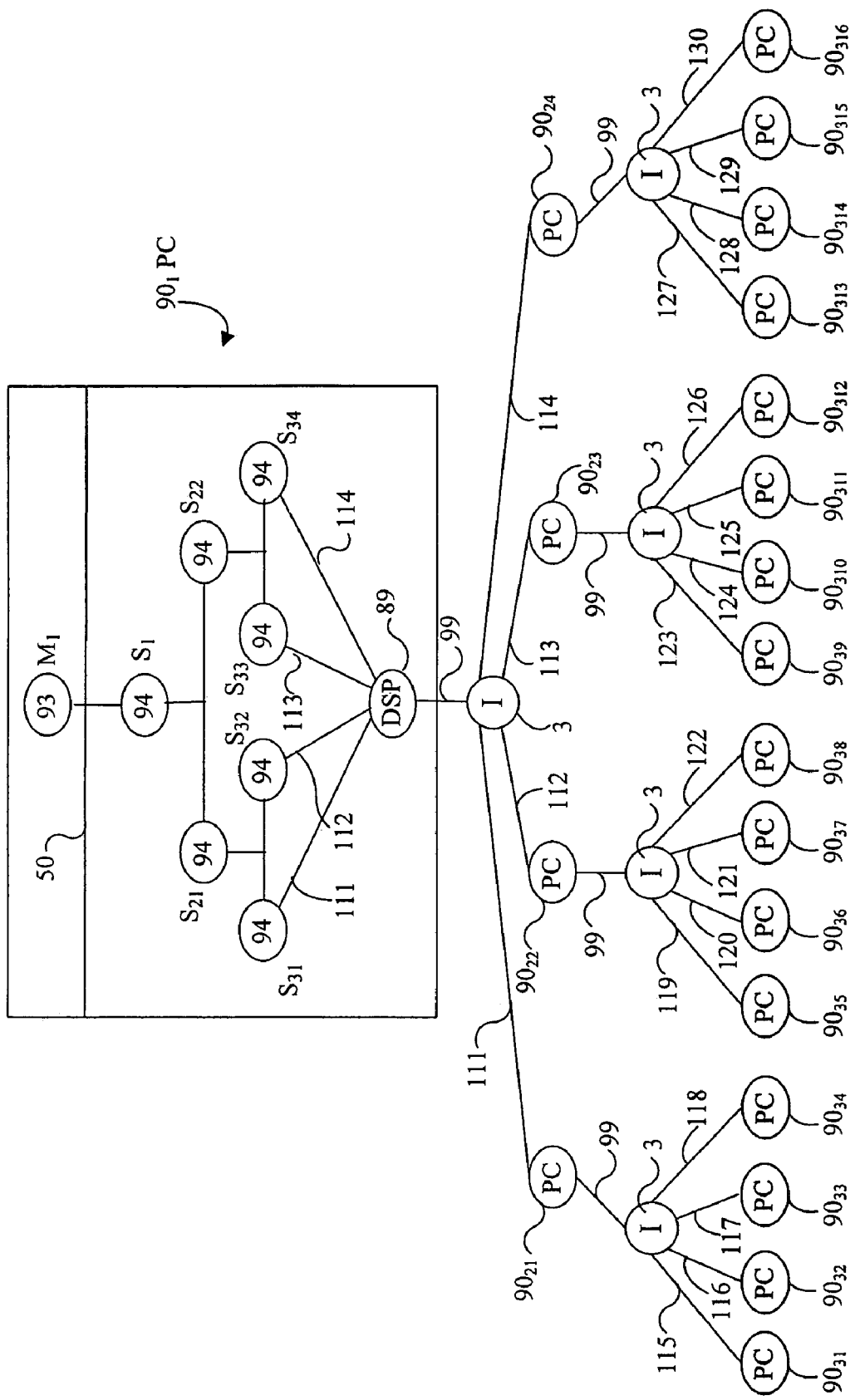

FIG. 20B is like FIG. 16S, but with the same new additions as FIG. 20A. FIG. 20B shows additionally two more level of parallel processing by personal computer on a chip-type microprocessors 90, consisting of a second level with microprocessors $90_{21}$ through $90_{24}$ and a third level with microprocessors $90_{31}$ through $90_{316}$ consisting of 16 microprocessors 90. Each of the three processing levels is separated by an intermediate direct connection to the Internet 3 (or other net) and by four output lines from the higher processing level. Microprocessors $90_{21}$ through $90_{24}$ are shown receiving respectively the outputs 111 through 114 from slave microprocessors 94, $S_{31}$ through $S_{34}$. (Note that microprocessor $90_1$ is shown in detail including all slave microprocessors 94, while other PC microprocessors at the second and third levels do not.) FIG. 20B shows that between each processing level the output links from every PC microprocessor 90 can be transmitted from slave microprocessors 94 directly to PC microprocessors 90 below, such as from PC microprocessor $90_{21}$ to PC microprocessors $90_{31}$ through $90_{34}$, via the Internet 3 or other net. Each of the transmission links from slave processing microprocessors 94, $S_{31}$ through $S_{34}$, shown as 111, 112, 113, and 114 for PC microprocessor $90_1$, can be transmitted on a different channel on a fiber optic direct connection to the PC microprocessor chip 90 through the digital signal processor 89, of which there may be one or more.

I claim:

1. A system, comprising:
   at least one personal computer, said at least one personal computer configured to operate with at least one other computer connected to at least one network of computers;
   said at least one personal computer including at least one microchip having at least one microprocessor with at least one control unit and at least two processing units, said at least one control unit configured to allow at least one user of said at least one personal computer to control said at least two processing units, and said at least one microchip including at least one power management component;
   said at least one personal computer including at least one internal firewall, said at least one internal firewall configured to allow and/or deny access to portions of said at least one microchip both to said at least one user of said at least one personal computer and to at least one user of said at least one microchip from said at least one network of computers during at least one shared use of said at least one microchip; and said at least one internal firewall being configured to deny access to portions of said at least one microchip from said at least one network of computers.

2. The system of claim 1, wherein said at least one personal computer includes at least one camera component.

3. The system of claim 1 wherein said at least one personal computer includes at least one videocam component.

4. The system of claim 1, wherein said at least one personal computer includes at least one radio component.

5. The system of claim 1, wherein said at least one personal computer includes at least one television component.

6. The system of claim 1, wherein said at least one personal computer includes at least one Flash memory.

7. The system of claim 1, wherein said at least one personal computer includes at least one hard drive.

8. The system of claim 1, wherein said at least one personal computer includes at least one digital signal processor.

9. The system of claim 1, wherein said at least one network includes the World Wide Web which is utilized to provide shared computer processing resources.

10. The system of claim 1, wherein there is at least one direct optical fiber network connection to said at least one personal computer.

11. The system of claim 1, wherein there is at least one direct wireless connection from said at least one personal computer to said at least one other computer connected to said at least one network.

12. The system of claim 1, wherein said at least one personal computer is equipment of an automobile or other transportation vehicle or other conveyance.

13. The system of claim 1, wherein said at least one microchip includes:
   at least one digital signal processor; or
   at least one network communications component; or
   both.

14. The system of claim 1, wherein said at least one shared use includes:
   parallel processing; or
   multi-processing; or
   multi-tasking; or
   any combination thereof.

15. The system of claim 1, wherein said at least one personal computer is configured so that said at least one user of said at least one personal computer retains preemptive control of all components of said at least one personal computer.

16. The system of claim 1, wherein said at least one microchip includes:
   at least four processing units; or
   at least eight processing units; or
   at least 16 processing units; or
   at least 32 processing units; or
   at least 64 processing units; or
   at least 128 processing units; or
   at least 256 processing units; or
   at least 512 processing units; or
   at least 1024 processing units.

17. The system of claim 1, wherein said at least one personal computer includes random access memory (RAM), said RAM being located on said at least one microchip.

18. The system of claim 1, wherein said at least one microchip includes:
   at least one graphics component; or
   at least one audio component; or
   at least one video processing component; or
   at least one flash BIOS; or
   any combination thereof.

19. The system of claim 1, wherein said at least one personal computer is configured to operate wirelessly with said at least one other computer in a client/server or a peer-to-peer network architecture.

20. The system of claim 1, wherein said at least one microprocessor of said at least one personal computer is controlled by said at least one user of said at least one personal computer through said at least one user's operation of at least one wireless controller.

21. The system of claim 1, wherein said at least one microchip has at least one internal firewall configured to allow and/or deny access to portions of said at least one microchip both to said at least one user of said at least one personal computer and to any other users from said at least one network of computers.

22. The system of claim 1, wherein:
   said at least one internal firewall is configured to deny access to said at least one control unit by said at least one other computer during said at least one shared use involving said at least one personal computer and said at least one other computer of said at least one network of computers; and said at least one internal firewall is further configured to allow access to at least one of said at least two processing units by said at least one other computer of said at least one network of computers during said at least one shared use.

23. The system of claim 22, wherein said at least one internal firewall is configured to deny access to said at least one control unit by said at least one network of computers during said at least one shared use involving said at least one personal computer and said at least one network of computers.

24. The system of claim 23, wherein said at least one internal firewall is at least one hardware firewall, at least one software firewall, at least one firmware firewall, or at least one other component firewall, or any combination thereof.

25. The system of claim 22, wherein said at least one internal firewall is configured to allow access to said at least one of said at least two processing units by said at least one network of computers during said at least one shared use.

26. The system of claim 25, wherein said at least one internal firewall is configured to deny access to at least one of said at least two processing units by said at least one user of said at least one personal computer during said at least one shared use.

27. The system of claim 22, wherein said at least one firewall is configured to protect network use from unauthorized surveillance of said at least one of said at least two processing units by said at least one user of said at least one personal computer during said at least one shared use.

28. The system of claim 22, wherein said at least one internal firewall is configured to protect network use from intervention in said at least one of said at least two processing units by said at least one user of said at least one personal computer during said at least one shared use.

29. The system of claim 1, wherein the internal firewall encloses only a portion of the resources of said at least one personal computer.

30. The system of claim 1, wherein said at least one personal computer includes at least one telephone component.

31. The system of claim 1, wherein:
at least one server computer is connected to the Internet;
at least two personal computers are connected to the at least one server computer through said at least one network;
said at least one server computer is configured to function during at least one shared use involving said at least two personal computers; and
said at least one personal computer is configured to operate with at least one other personal computer connected to said at least one network utilizing a peer to peer wireless network connection configured to directly couple said at least one personal computer to said at least one other personal computer via the wireless network connection without connecting to said at least one server computer.

32. The system of claim 1, wherein said at least one user of said at least one personal computer is an owner of said at least one personal computer.

33. The system of claim 1, wherein said at least one network comprises the Internet and/or an intranet.

34. The system of claim 1, wherein said at least one internal firewall is configured to permanently deny access to portions of said microchip from said at least one network of computers.

35. The system of claim 1, wherein said at least one shared use includes at least one unauthorized shared use, including intrusion by hackers from outside said at least one personal computer.

36. A system, comprising:
at least one personal computer, said at least one personal computer configured to be directly coupled to at least one other personal computer and/or at least one server computer by at least one network;
said at least one personal computer including at least one microchip having at least one microprocessor with at least one control unit and at least two processing units, said at least one control unit configured to allow at least one user of said at least one personal computer to control the at least two processing units;
said at least one personal computer including at least one internal firewall configured to allow and/or deny access to portions of said at least one microchip both to said at least one user of said at least one personal computer and at least one user of said at least one microchip from at least one network of computers during at least one shared use of said at least one microchip; wherein said at least one internal firewall is at least one hardware firewall; and
said at least one internal firewall being configured to deny access to portions of said at least one microchip from said at least one network of computers.

37. The system of claim 36, wherein there is at least one direct optical fiber network connection to said at least one personal computer.

38. The system of claim 36, wherein there is at least one wireless connection from said at least one personal computer to said at least one network of computers.

39. The system of claim 36, wherein said at least one personal computer is equipment of an automobile or other transportation vehicle or other conveyance.

40. The system of claim 36, wherein said at least one microchip includes:
at least one digital signal processor; or
at least one network communications component; or both.

41. The system of claim 36, wherein said at least one personal computer is configured so that said at least one other user of said at least one personal computer retains preemptive control of all components of said at least one personal computer.

42. The system of claim 36, wherein said at least one microchip includes:
at least four processing units; or
at least eight processing units; or
at least 16 processing units; or
at least 32 processing units; or
at least 64 processing units; or
at least 128 processing units; or
at least 256 processing units; or
at least 512 processing units; or
at least 1024 processing units.

43. The system of claim 36, wherein said at least one personal computer includes random access memory (RAM), said RAM being located on said at least one microchip.

44. The system of claim 36, wherein said at least one microchip includes:
at least one graphics component; or
at least one audio component; or
at least one video processing component; or
at least one flash BIOS component; or
any combination thereof.

45. The system of claim 36, wherein said at least one microprocessor of said at least one personal computer is controlled by said at least one other user of said at least one personal computer through said at least one other user's operation of at least one wireless controller.

46. The system of claim 36, wherein said at least one microchip has at least one internal firewall configured to allow and deny access to portions of said at least one microchip both to said at least one other user of said at least one personal computer and to any other users from said at least one network of computers.

47. The system of claim 36, wherein:
said at least one internal firewall is further configured to deny access to at least one of said at least two processing units by said at least one other computer during said at least one shared use involving said at least one personal computer and said at least one other computer of said at least one network of computers; and
said at least one internal firewall is further configured to allow access to at least one of said at least two processing units by said at least one other computer of said at least one network of computers during said at least one shared use.

48. The system of claim 47, wherein said at least one internal firewall is configured to deny access to said at least one control unit by said at least one network of computers during said at least one shared use involving said at least one personal computer and said at least one network of computers.

49. The system of claim 47, wherein said at least one internal firewall is configured to allow access to said at least one control unit by said at least one network of computers during said at least one shared use.

50. The system of claim 49, wherein said at least one internal firewall is configured to deny access to at least one of said at least two processing units by said at least one user of said at least one personal computer during said at least one shared use.

51. The system of claim 50, wherein said at least one firewall includes hardware or software or firmware or any combination thereof.

52. The system of claim 47, wherein said at least one internal firewall is configured to protect network use from unauthorized surveillance of said at least one of said at least two processing units by said at least one user of said at least one personal computer during said at least one shared use.

53. The system of claim 47, wherein said at least one internal firewall is configured to protect network use from intervention in said at least one of said at least two processing units of said at least one personal computer by said at least one user of said at least one personal computer during said at least one shared use.

54. The system of claim 36, wherein a peer to peer wireless network connection couples said at least one personal computer to at least one other personal computer via the wireless network connection.

55. The system of claim 36, wherein the internal firewall encloses only a portion of the resources of said at least one personal computer.

56. The system of claim 36, wherein said at least one user of said at least one personal computer is an owner of said at least one personal computer.

57. The system of claim 36, wherein said at least one network comprises the Internet and/or an intranet.

58. The system of claim 36, wherein said at least one internal firewall is configured to permanently deny access to portions of said at least one microchip from said at least one network of computers.

59. The system of claim 36, wherein said at least one shared use includes at least one unauthorized shared use, including intrusion by hackers from outside said at least one personal computer.

60. A system, comprising:
at least one server computer configured to operate with at least one other computer connected by a network;
said at least one server computer including at least one microchip having at least one microprocessor with at least one control unit and at least two or four or eight or 16 or 32 or 64 or 128 or 256 or 512 or 1024 processing units, said at least one control unit configured to allow at least one user of said at least one server computer to control said at least two or four or eight or 16 or 32 or 64 or 128 or 256 or 512 or 1024 processing units, said at least one microchip including at least one power management component;
and said at least one server computer including at least one internal firewall, said at least one internal firewall configured to allow and/or deny access to portions of said at least one microchip both to said at least one user of said at least one server computer and to at least one user of said at least one microchip from said at least one network of computers during at least one shared use of said at least one microchip; and said at least one internal firewall being configured to deny access to portions of said at least one microchip from said at least one network of computers.

61. The system of claim 60, wherein said at least one user of said at least one personal computer is an owner of said at least one personal computer.

62. The system of claim 60, wherein said at least one network comprises the Internet and/or an intranet.

63. The system of claim 60, wherein said at least one microchip has at least one internal firewall configured to allow and deny access to portions of said at least one microchip both to said at least one user of said at least one server computer and to any other users from said at least one network of computers, and said firewall is a hardware firewall.

64. The system of claim 63, wherein:
said at least one internal firewall is further configured to deny access to said at least one control unit by said at least one other computer during said at least one shared use involving said at least one server computer and said at least one other computer of said at least one network of computers; and
said at least one internal firewall is further configured to allow access to at least one of said at least two processing units of said at least one server computer by said at least one other computer of said at least one network of computers during said at least one shared use.

65. The system of claim 64, wherein said at least one internal firewall is configured to deny access to said at least one control unit by said at least one network of computers during said at least one shared use involving said at least one server computer and said at least one network of computers.

66. The system of claim 65, wherein said at least one internal firewall is configured to allow access to said at least one of said at least two processing units by said at least one network of computers during said at least one shared use.

67. The system of claim 66, wherein said at least one internal firewall is configured to deny access to said at least one of said at least two processing units by said at least one user of said at least one server computer during said at least one shared use.

68. The system of claim 66, wherein said at least one internal firewall is configured to protect network use from unauthorized surveillance of said at least one of said at least two processing units of said at least one server computer by said at least one user of said at least one server computer during said at least one shared use.

69. The system of claim 66, wherein said at least one internal firewall is configured to protect network use from intervention in said at least one of said at least two processing units of said at least one server computer by said at least one user of said at least one server computer during said at least one shared use.

70. The system of claim 60, wherein said at least one firewall includes hardware or software or firmware or any combination thereof.

71. The system of claim 60, wherein said at least one server computer is configured so that said at least one user of said at least one server computer retains preemptive control of all components of said at least one server computer, thereby preempting any server users from said at least one network of computers.

72. The system of claim 60, wherein said at least one internal firewall is configured to permanently deny access to portions of said at least one microchip from said at least one network of computers.

73. The system of claim 60, wherein said at least one shared use includes at least one unauthorized shared use, including intrusion by hackers from outside said at least one personal computer.

\* \* \* \* \*